United States Patent
Mohassel et al.

(10) Patent No.: US 11,722,305 B2
(45) Date of Patent: *Aug. 8, 2023

(54) PASSWORD BASED THRESHOLD TOKEN GENERATION

(71) Applicant: Visa International Service Association, San Francisco, CA (US)

(72) Inventors: Payman Mohassel, Foster City, CA (US); Shashank Agrawal, Sunnyvale, CA (US); Pratyay Mukherjee, Santa Clara, CA (US); Peihan Miao, Berkeley, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,304

(22) Filed: Sep. 28, 2022

(65) Prior Publication Data

US 2023/0074927 A1 Mar. 9, 2023

Related U.S. Application Data

(63) Continuation of application No. 17/053,022, filed as application No. PCT/US2018/055947 on Oct. 15, 2018, now Pat. No. 11,509,478.

(60) Provisional application No. 62/668,725, filed on May 8, 2018.

(51) Int. Cl.
*H04L 29/06* (2006.01)
*G06F 21/00* (2013.01)
*H04L 9/32* (2006.01)
*H04L 9/08* (2006.01)

(52) U.S. Cl.
CPC ............ *H04L 9/3226* (2013.01); *H04L 9/085* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 5,491,752 A * | 2/1996 | Kaufman | H04L 9/3226 380/30 |
| 2007/0044143 A1* | 2/2007 | Zhu | G06F 21/33 726/8 |
| 2013/0054808 A1* | 2/2013 | Hildebrand | H04L 67/148 709/226 |
| 2016/0105414 A1* | 4/2016 | Bringer | H04L 9/3247 713/168 |
| 2017/0104745 A1* | 4/2017 | Camenisch | H04L 9/085 |

(Continued)

OTHER PUBLICATIONS

Application No. EP18796562.9, Office Action, dated Nov. 8, 2021, 6 pages.

(Continued)

*Primary Examiner* — Lisa C Lewis
(74) *Attorney, Agent, or Firm* — Kilpatrick Townsend & Stockton LLP

(57) ABSTRACT

Embodiments disclosed herein are directed to methods and systems of password-based threshold authentication, which distributes the role of an authentication server among multiple servers. Any t servers can collectively verify passwords and generate authentication tokens, while no t−1 servers can forge a valid token or mount offline dictionary attacks.

20 Claims, 18 Drawing Sheets

(56) References Cited

U.S. PATENT DOCUMENTS

2021/0089676 A1* 3/2021 Ford .................... H04L 9/0825

OTHER PUBLICATIONS

Application No. PCT/US2018/055947, International Search Report and Written Opinion, dated Jan. 17, 2019, 12 pages.
Application No. SG11202010960Y, Written Opinion, dated Sep. 5, 2022, 8 pages.
Camenisch et al. "Virtual Smart Cards: How to Sign with a Password and a Server,", SCN 16, vol. 9841 of LNCS, Springer, Heidelberg, Aug. / Sep. 2016, pp. 353-371.
Jarecki et al. "TOPPSS: Cost-minimal Password-Protected Secret Sharing based on Threshold OPRF,"., ACNS 17, vol. 10355 of Springer, Heidelberg, Jul. 2017, LNCS, pp. 1-39.

* cited by examiner

Encoded

202 eyJhbGci0iJIUzI1NiIsInR5cCI
6IkpXVCJ9.eyJzdWIi0iIxMjm
0NTY3ODkwIiwibmFtZSI6Ikp
vaG4gRG91IiwiaWF0IjoxNT
E2MjM5MDIyfQ.Sf1KxwRJS
MeKKF2QT4fwpMeJf36POk6
yJV_adQssw5c

Decoded

HEADER — 204

{
   "alg":   'HS256',
   "typ":   'JWT'
}

PAYLOAD

{
   "sub":   '1234567890',
   "name":   'John Doe',
   "iat":   '1516239022'
}

206

VERIFY SIGNATURE

HMACSHA256{
  base64UrlEncode(header) + "." +
  base64UrlEncode(payload),
  your-256-bit-secret
}     secret base64 encoded

One-More$_{AMK}(1^\kappa, r, t, n, N)$:
1. $(p, g, \mathbb{G}) \leftarrow \text{GroupGen}(1^\kappa)$
2. $g_1, \ldots, g_N \leftarrow_\$ \mathbb{G}$
3. $(((i, \alpha_i))_{i \in \mathcal{U}}, st) \leftarrow \text{Adv}(p, g, \mathbb{G}, g_1, \ldots, g_N)$, where $\mathcal{U} \subseteq [n]$, $|\mathcal{U}| = r$
4. $(k_1, k_2, \ldots, k_n) \leftarrow \text{GenShare}(p, n, t, \{(i, \alpha_i)\}_{i \in \mathcal{U}})$
5. $q_1, \ldots, q_n := 0$
6. $((g_1^*, h_1^*), \ldots, (g_{\ell}^*, h_{\ell}^*)) \leftarrow \text{Adv}^{\mathcal{O}_i \mathcal{O}_j}(st)$
7. output 1 iff
   - $\ell > \text{MAX}_{r',t}(q_1, \ldots, q_n)$ and
   - $\forall i \in [\ell], g_i^* \in \{g_1, \ldots, g_N\}$ and $h_i^* = g_i^{*k_0}$.

$\mathcal{O}_i(i, x)$:
- require: $i \in [n] \setminus \mathcal{U}, x \in \mathbb{G}$
- increment $q_i$ by 1
- return $x^{k_i}$ $\mathcal{O}_{ddh}(g_1, g_2, h_1, h_2)$:
- require: $g_1, g_2, h_1, h_2 \in \mathbb{G}$
- return 1 iff $\exists a \in \mathbb{Z}_p$ s.t. $g_2 = g_1^a$ and $h_2 = h_1^a$

FIG. 4

$\underline{\text{Unpredictability}_{\text{TOP},\text{Adv}}(1^\kappa, n, t)}$:
- $(\{sk_i\}, pp) \leftarrow \text{Setup}(1^\kappa, n, t)$
- $\mathcal{U} \leftarrow \text{Adv}(pp)$
- $\hat{x} \leftarrow_\$ X$
- $q_1, \ldots, q_n = 0$
- $h^* \leftarrow \text{Adv}^{\mathcal{O}}(\{sk_i\}_{i \in \mathcal{U}})$
- output 1 iff $\text{TOP}(sk, \hat{x}) = h^*$ $\underline{\mathcal{O}_{\text{enc\&eval}}()}$:
- $c := \text{Encode}(\hat{x}, \rho)$ for $\rho \leftarrow_\$ \mathcal{R}$
- for $i \in [n] \setminus \mathcal{U}$, $z_i \leftarrow \text{Eval}(sk_i, c)$
- return $c, \{z_i\}_{i \in [n]}$ $\underline{\mathcal{O}_{\text{eval}}(i, c)}$:
- require: $i \in [n] \setminus \mathcal{U}$
- increment $q_i$ by 1
- return $\text{Eval}(sk_i, c)$ $\underline{\mathcal{O}_{\text{check}}(h)}$:
- return 1 if $h = \text{TOP}(sk, \hat{x})$; else return 0

FIG. 5

Obliviousness$_{\mathsf{TOP},\mathsf{Adv}}(1^\kappa, n, t)$:
- $(\{sk_i\}, pp) \leftarrow \mathsf{Setup}(1^\kappa, n, t)$
- $\mathcal{U} \leftarrow \mathsf{Adv}(pp)$
- $\bar{x} \leftarrow_\$ X$
- $q_1, \ldots, q_n := 0$
- $x^* \leftarrow \mathsf{Adv}^{\{\mathcal{O}\}}(\{sk_i\}_{i \in \mathcal{U}})$
- output 1 iff $x^* = \bar{x}$ $\mathcal{O}_{enc\&eval}()$:
- $c := \mathsf{Encode}(\bar{x}, \rho)$ for $\rho \leftarrow_\$ \mathcal{R}$
- for $i \in [n]$, $z_i \leftarrow \mathsf{Eval}(sk_i, c)$
- $h := \mathsf{Combine}(\bar{x}, \{(i, z_i)\}_{i \in [n]}, \rho)$
- return $c, \{z_i\}_{i \in [n] \setminus \mathcal{U}}, h$ $\mathcal{O}_{eval}(i, c)$:
- require: $i \in [n] \setminus \mathcal{U}$
- increment $q_i$ by 1
- return $\mathsf{Eval}(sk_i, c)$

*FIG. 6*

```
SecGame_{II,Adv}(1^κ, n, t, P):
  - ({sk}, vk, pp, (SK_1, ..., SK_n)) ← GlobalSetup(1^κ, n, t, P)
  - (U, C*, st_adv) ← Adv(pp)     # U: corrupt servers, C*: targeted client
  - V = ∅                          # set of corrupt clients
  - PwdList = ∅                    # list of (C, pwd) pairs, indexed by C
  - ReqList_{C,i} = ∅ for i ∈ [n]  # token requests C makes to S_i
  - ct = 0, LiveSessions = {}      # LiveSessions is indexed by ct
  - TokList = ∅                    # list of tokens generated through O_final
  - Q_{C,i} = 0 for all C and i ∈ [n]
  - Q_{C,x} = 0 for all C and x
  - out ← Adv^O({sk_i}_{i∈U}, {SK_i}_{i∈U}, st_adv)

O_corrupt(C):
  - V = V ∪ {C}
  - if (C, *) ∈ PwdList, return PwdList(C)

O_SignUp(C):
  - require: PwdList(C) = ⊥
  - pwd ←_$ P
  - add (C, pwd) to PwdList
  - return SignUp(C, pwd)

O_Req(C, x, T):
  - require: PwdList(C) ≠ ⊥
  - (st, {req_i}_{i∈T}) ← Request(C, PwdList(C))
  - LiveSessions[ct] = st
  - add req_i to ReqList_{C,i} for i ∈ T
  - increment ct by 1
  - return {req_i}_{i∈T}

O_server(i, inst, m):
  - require: i ∈ [n] \ U
  - if inst = store:
      - parse m as (C, msg_i)
      - rec_{i,C} = Store(SK_i, C, msg_i)
      - update aux_i with (C, rec_{i,C}) if no record for C exists
  - else if inst = respond:
      - parse m as (C, x, req_i)
      - res_i ← Respond(sk_i, aux_i, C, x, req_i)
      - increment Q_{C,x} by 1
      - if req_i ∉ ReqList_{C,i}, increment Q_{C,i} by 1
      - return res_i O_final(ct, {res_i}_{i∈S}):
  - st = LiveSessions[ct]
  - tk = Finalize(st, {res_i}_{i∈S})
  - add tk to TokList
  - return tk O_Verify(vk, C, x, tk):
  - return Verify(vk, C, x, tk)
```

FIG. 7

Ingredients.
- A threshold authentication scheme TA := (TA.Setup, TA.PartEval, TA.Combine, TA.Verify).
- A threshold oblivious PRF TOP := (TOP.Setup, TOP.Encode, TOP.Eval, TOP.Combine).
- A CPA secure symmetric-key encryption scheme SKE := (SKE.Encrypt, SKE.Decrypt).
- An IND-CCA2 secure public-key encryption scheme PKE := (PKE.KeyGen, PKE.Encrypt, PKE.Decrypt).
- A hash function $\mathcal{H}$.

GlobalSetup($1^\kappa$, n, t, P) → ($\{sk_i\}$, vk, pp, ($SK_1, \ldots, SK_n$)).
- Run TA.Setup($1^\kappa$, n, t) to get ($\{tsk_i\}$, tpp).
- Run PKE.KeyGen($1^\kappa$) n times to get ($PK_1, SK_1$), ..., ($PK_n, SK_n$).
- Set $sk_i := tsk_i$ for all $i \in [n]$ and pp := ($\kappa$, n, t, P, {$PK_1, \ldots, PK_n$}, tpp).

SignUp(C, pwd) → (($C, msg_1$), ..., ($C, msg_n$)).
- Run TOP.Setup($1^\kappa$, n, t) to get ($\{k_i\}$, opp).
- Compute h := TOP(k, C||pwd) and $h_i$ := $\mathcal{H}$(h||i) for $i \in [n]$.
- Set $msg_i$ := PKE.Encrypt($PK_i, k_i || h_i$) for $i \in [n]$.

Store($SK_i$, C, $msg_i$) := $rec_{i,C}$.
- Run PKE.Decrypt($SK_i, msg_i$) to get $k_i, h_i$.
- Set $rec_{i,C}$ := ($k_i, h_i$)

Output ⊥ if decryption fails.

Request(C, pwd, x, $\mathcal{T}$) → ({($C, x, req_i$)}$_{i \in \mathcal{T}}$, st).
- If $|\mathcal{T}| < t$, output ⊥.
- Pick a $\rho$ at random. Run TOP.Encode(C||pwd, $\rho$) to get c.
- Set $req_i$ := c for all $i \in [n]$ and st := (C, pwd, $\rho$, $\mathcal{T}$).

Respond($sk_i$, $rec_i$, C, x, $req_i$) → $res_i$.
- If $rec_{i,C} \notin rec_i$, output ⊥. Else, parse $rec_{i,C}$ as ($k_i, h_i$).
- Run TOP.Eval($k_i, req_i$) to get $z_i$.
- Run TA.PartEval($tsk_i$, x) to get $y_i$.
- Set $res_i$ := ($z_i$, SKE.Encrypt($h_i, y_i$)).

Finalize(st, {$res_i$}$_{i \in S}$) → tk.
- Parse $res_i$ as ($z_i$, $ctxt_i$) and st as (C, pwd, $\rho$, $\mathcal{T}$).
- If $S \neq \mathcal{T}$, output ⊥.
- Run TOP.Combine(C||pwd, {($i, z_i$)}$_{i \in \mathcal{T}}$, $\rho$) to get h.
- For all $i \in \mathcal{T}$, compute $h_i$ := $\mathcal{H}$(h||i) and $y_i$ := SKE.Decrypt($h_i, ctxt_i$).
- Finally, set tk to be TA.Combine({$i, y_i$}$_{i \in \mathcal{T}}$).

(If any of TOP.Combine, SKE.Decrypt or TA.Combine fail, ⊥ is output.)

Verify(pp, sk, x, tk) → {0, 1}.
- Output TA.Verify(tpp, tsk, x, tk).

FIG. 8

Ingredients.
- An IND-CCA2 public-key encryption scheme PKE := (PKE.KeyGen, PKE.Encrypt, PKE.Decrypt).

$\underline{\text{GlobalSetup}(1^\kappa, n, t, P) \to (\llbracket sk \rrbracket, vk, pp, (SK_1, \ldots, SK_n)).}$
- Run $\overline{\text{GlobalSetup}}(1^\kappa, n, t, P) \to (\llbracket sk \rrbracket, vk, \overline{pp})$.
- Run PKE.KeyGen($1^\kappa$) $n$ times to get $(PK_1, SK_1), \ldots, (PK_n, SK_n)$.
- Set pp := $(\overline{pp}, \{PK_1, \ldots, PK_n\})$.

$\underline{\text{SignUp}(C, \text{pwd}) \to ((C, \text{msg}_1), \ldots, (C, \text{msg}_n)).}$
- Run $\overline{\text{SignUp}}(C, \text{pwd}) \to (m_1, \ldots, m_n)$.
- Set $\text{msg}_i := \text{PKE.Encrypt}(PK_i, m_i)$.

$\underline{\text{Store}(SK_i, C, \text{msg}_i) =: \text{rec}_{i,C}.}$
- Run PKE.Decrypt($SK_i, \text{msg}_i$) to get $m_i$.
- Set $\text{rec}_{i,C} := m_i$.

$\underline{\text{Request}(C, \text{pwd}, x, \mathcal{T}) \to (((C, x, \text{req}_i))_{i \in \mathcal{T}}, \text{st}).}$
- Run $\overline{\text{Request}}(C, \text{pwd}, x, \mathcal{T}) \to (((C, x, \text{req}_i))_{i \in \mathcal{T}}, \text{st})$.

$\underline{\text{Respond}(sk_i, \text{REC}_i, C, x, \text{req}_i) \to \text{res}_i.}$
- Run $\overline{\text{Respond}}(sk_i, \text{REC}_i, C, x, \text{req}_i) \to \text{res}_i$.

$\underline{\text{Finalize}(\text{st}, \{\text{res}_i\}_{i \in \mathcal{T}}) \to \text{tk}.}$
- Run $\overline{\text{Finalize}}(\text{st}, \{\text{res}_i\}_{i \in \mathcal{T}}) \to \text{tk}$.

$\underline{\text{Verify}(pp, sk, x, tk) \to \{0, 1\}.}$
- Output $\overline{\text{Verify}}(\overline{pp}, sk, x, tk)$.

*FIG. 14*

Let the password space be $P := \{pwd\}$, set $n := 2, t := 2$, let $\mathcal{T}$ be the set of all servers in $\Pi_{sym}$, and set $x := 0$.

1. $P_2$ executes the following:
   - Run GlobalSetup$(1^\kappa, n, t, P) \rightarrow (\llbracket sk \rrbracket, vk, \widetilde{pp})$.
   - Run SignUp$(C, pwd) \rightarrow (m_1, \ldots, m_n)$.
   - Set $rec_{i,C} := m_i$.
   - Send $(\widetilde{pp}, C)$ to $P_1$.
2. On receiving the first message from $P_2$, $P_1$ does the following:
   - Run Request$(C, pwd, x, \mathcal{T}) \rightarrow (\{(C, x, req_i)\}_{i \in \mathcal{T}}, st)$.
   - Send $\{req_i\}_{i \in \mathcal{T}}$ to $P_2$.
3. On receiving the message from $P_1$, $P_2$ does the following:
   - Run Respond$(sk_i, REC_i, C, x, req_i) \rightarrow res_i$ for $i \in \mathcal{T}$.
   - Send $\{res_i\}_{i \in \mathcal{T}}$ to $P_1$.
   - Emulate the protocol:
      a. Request$(C, pwd, x, \mathcal{T}) \rightarrow (\{(C, x, req'_i)\}_{i \in \mathcal{T}}, st')$.
      b. Respond$(sk_i, REC_i, C, x, req'_i) \rightarrow res'_i$ for $i \in \mathcal{T}$.
      c. Finalize$(st', \{res'_i\}_{i \in \mathcal{T}}) \rightarrow tk'$.
   - Output $tk'$.
4. On receiving the second message from $P_2$, $P_1$ executes the following:
   - Run Finalize$(st, \{res_i\}_{i \in \mathcal{T}}) \rightarrow tk$.
   - Output $tk$.

*FIG. 15*

PASSWORD BASED THRESHOLD TOKEN GENERATION

CROSS-REFERENCES TO RELATED APPLICATIONS

This application is a continuation of U.S. patent application Ser. No. 17/053,022, which is a 371 National Stage of International Application No. PCT/US2018/055947, filed Oct. 15, 2018, which claims the benefit of the filing date of U.S. Provisional Application No. 62/668,725, filed May 8, 2018, the disclosures of which are incorporated by reference herein in their entireties.

BACKGROUND

Token-based authentication is frequently used to protect and obtain authorized access to resources, services, and applications on the internet and on enterprise networks. There are many ways to perform token-based authentication, with password-based techniques being among the most common.

For example, there exist widely-used open standards such as JSON Web token (JWT) and Security Assertion Markup Language (SAML), which facilitate single sign-on authentication by allowing users to initially authenticate using a standard mechanism, such as username/password verification. In return, the users obtain and locally store an authentication token in a cookie or in other local storage of their computing device. Until this token expires, the token may be presented to gain accesses to various applications without any user involvement.

Other open standards for token-based authentication, such as Open Authorization (OAuth) and OpenID, utilize a similar mechanism for authentication. Access tokens are issued to users by an authentication server with the approval of the owner of the protected resource. The user may provide the access token to the resource server in order to obtain access to the protected resource without needing any passwords or credentials associated with the resource server. Many companies utilize these open standards to enable their users to share information about their accounts with third party applications or websites without the users having to reveal their passwords.

There are also network authentication protocols, such as Kerberos, which take advantage of token-based authentication. These protocols are used by enterprises (e.g. Active Directory in Windows Servers) to periodically, but infrequently, authenticate users with their credentials and issue them a ticket-granting ticket (TGT) that the users can use to request access to various services on the enterprise network, such as printers, internal websites, and more.

The typical process flow for token-based authentication may involve a user initially registering a username/password with an authentication server (e.g., by sending a hash of their password to an authentication server). The authentication server stores each user's hashed password and credentials, while also issuing an authentication token for the user based on a master secret key. This token may be generated by computing a digital signature or a message authentication code (MAC) on a message. The user's computing device may receive and store the token, which can be furnished to obtain access to a protected resource.

However, the authentication server serves as single point of failure. A malicious attacker that breaches the authentication server may recover the master secret key and forge authentication tokens to gain access to protected resources and information. Furthermore, the attacker may obtain the stored hashed passwords to use as part of an offline dictionary attack to recover user credentials. Although techniques, such as salting and new memory-hard hash functions, exist to deter attackers, such techniques only make it more resource-intensive or difficult for the attackers without fundamentally addressing the problem of having a single point of failure.

Accordingly, there exists a need for an approach to token-based authentication that addresses this issue, such that keys and user credentials cannot be compromised (e.g., by an attacker that gains entry to the authentication server).

BRIEF SUMMARY

The present disclosure contemplates methods and computing systems for password-based threshold token generation and authentication, which can be used to protect and authorize access to secure resources, services, and applications in a manner that is secure against server breaches that could compromise long-term keys and user credentials. Embodiments can use a password-based threshold authentication, which distributes a role of an authentication server among multiple servers.

In some embodiments, a registration process can establish a hash portion at each server, where the hash portions are generated via messages between the servers and the client. For example, a server can encrypt a blinded hash of a user credential using a secret share, and the client can deblind the encrypted blinded hash to generate the hash portion to be saved at the server. To obtain a token, a client can send a newly generated blinded hash using a newly received user credential, which can again be encrypted by the servers using a respective secret share. A token share encrypted with hash portion can be decrypted by the client using a newly generated hash portion when it matches the hash portions saved at the servers, which would be the case when the initial user credential matches the newly received user credential.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 2 illustrates the example contents of an authentication token.

FIG. 4 illustrates definitions associated with a Threshold One-More Diffie-Hellman (TOMDH) game.

FIG. 5 illustrates definitions associated with an Unpredictability, a property associated with threshold oblivious pseudo-random functions.

FIG. 6 illustrates definitions associated with Obliviousness, a property associated with threshold oblivious pseudo-random functions.

FIG. 7 illustrates definitions associated with a Security game for PbTA.

FIG. 8 illustrates a set of definitions and requirements associated with PASsword-based Threshold Authentication (PASTA).

FIG. 14 illustrates definitions associated with a symmetric-key PbTA scheme.

FIG. 15 illustrates definitions associated with a secure two-party key agreement protocol.

TERMS

Figure 1:
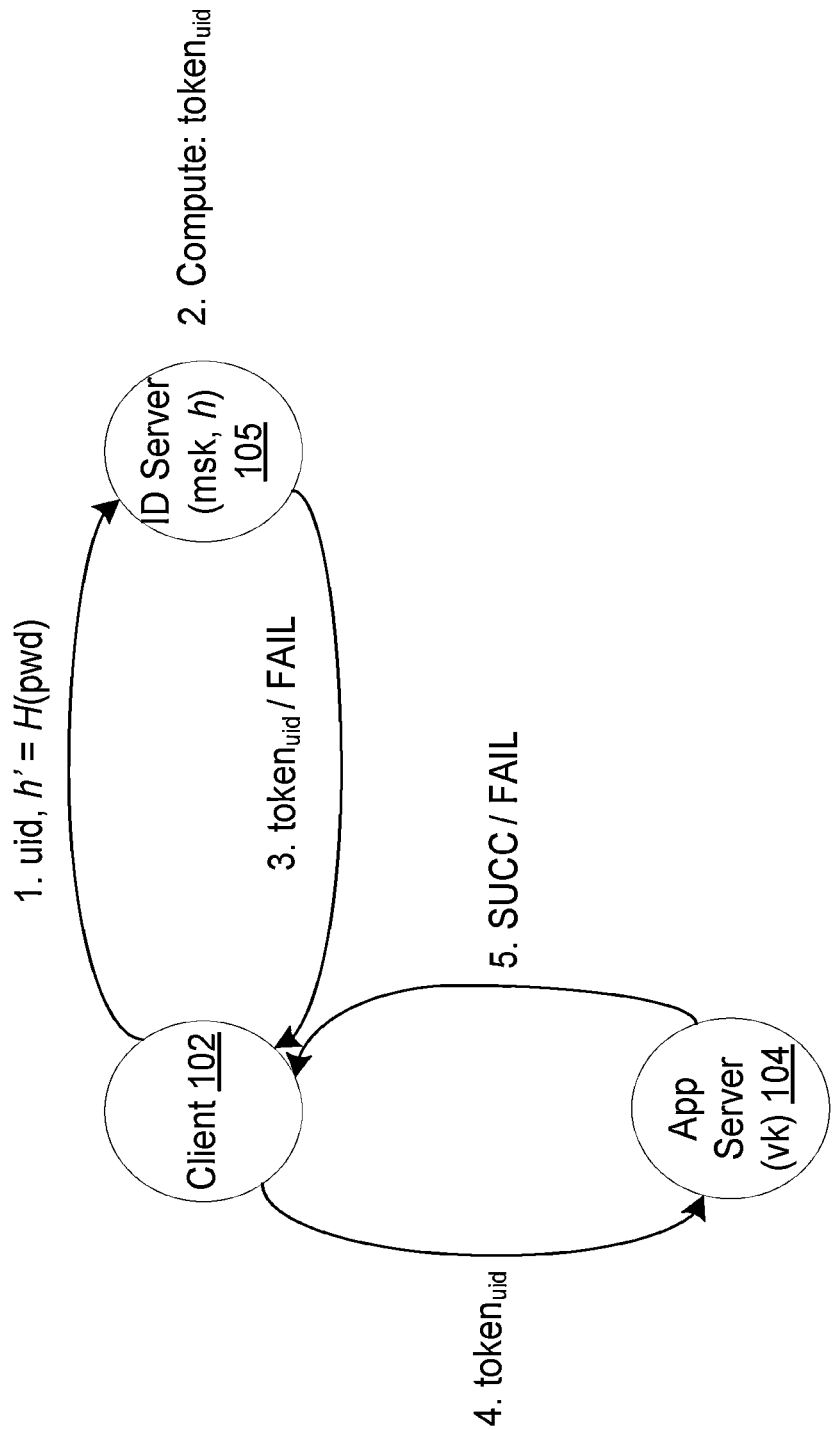
FIG. 1 illustrates a flow diagram portraying existing software-based secret management protocols.

In the present disclosure, methods and computing systems are proposed for password-based threshold token generation and authentication, which can be used to protect and authorize access to secure resources, services, and applications in a manner that is secure against server breaches that could compromise long-term keys and user credentials. Prior to discussing the details of embodiments of these methods and systems, description of some terms may be helpful in understanding the various embodiments.

A "processor" may include any suitable data computation device or devices. A processor may include one or more microprocessors working together to accomplish a desired function. The processor may include CPU includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

"Token-based authentication" may refer to any process used to enable a single sign-on experience on the web, in mobile applications and on enterprise networks using a wide range of open standards and network authentication protocols: Traditionally with token-based authentication schemes, clients would initially authenticate to authentication server using their username/password to obtain a cryptographic token generated with a master secret key and store the token for future accesses to various services and applications. However, the authentication server presented a single point of failure that, if breached, enabled attackers to forge arbitrary tokens or mount offline dictionary attacks to recover client credentials.

"Password-based token generation" may refer to a plain password-based token generation protocol, which is often the traditional manner for generating the tokens used in token-based authentication. In general, there is an initial registration phase during which a client registers with their username/password by storing its username and hashed password h= $\mathcal{H}$ (password) on the identity server. In the sign-on phase, client sends its username and hashed password h' to the server; the server checks if h'=h for the username. If the check passes, the server then uses a master secret key msk to compute a token $auth_{msk}(x)$ and sends it to client, where auth is either a MAC or a digital signature and x is the data to be signed. In this approach, both the master secret key msk and the hashed password h are compromised if the server is breached. Hence clients' passwords could be recovered using offline dictionary attacks.

"Password-based threshold token generation" may refer to a process for generating an authentication token (e.g., issued to a user to obtain access to a protected resource) that includes built-in restrictions on token generation or recovery when a certain resource threshold is either met or unmet. For example, there may be multiple authentication servers that collectively work together to generate the authentication token, such that long-term keys and user credentials associated with the token generation cannot be obtained unless a threshold number of the authentication servers have been compromised.

"Password-based threshold authentication" may generally refer to any approach to token-based authentication that involves password-based threshold token generation, or depending on the casing of the letters in the term, the term may specifically refer to Password-based Threshold Authentication (abbreviated herein as PbTA).

"Password-based Threshold Authentication", or PbTA, is a protocol established with the specific goal of making password-based token generation secure against server breaches that could compromise both long-term keys and user credentials. PbTA establishes necessary security requirements of token unforgeability and password-safety in presence of an adversary who may breach a subset of the identity servers. In order to achieve this unforgeability and password-safety, PbTA may specifically distribute the role of the identity provider (e.g., the authentication server) among n servers which collectively verify clients' passwords and generate authentication tokens for them. PbTA enables any t(2≤t≤n) servers to authenticate the client and generate valid tokens while any attacker who compromises at most t−1 servers cannot forge valid tokens or mount offline dictionary attacks.

"PASsword-based Threshold Authentication", or PASTA, is a general framework for token-based authentication that involves a threshold oblivious pseudorandom function (TO-PRF) and any threshold token generation (TTG) scheme (i.e., a threshold MAC or digital signature). PASTA may adhere to the PbTA protocol and meet the security requirements of token unforgeability and password-safety.

A "message authentication code" (MAC), sometimes known as a tag, is a short piece of information used to authenticate a message and confirm that the message has not been changed and came from the stated sender. Thus, a MAC may protect both a message's data integrity as well as its authenticity, by allowing verifiers to detect any changes to the message content. A MAC may function similar to a cryptographic hash function and must resist existential forgery under chosen-plaintext attacks. A MAC differs from a digital signature, in that a MAC is both generated and verified using the same secret key. Thus, the sender and receiver of a MAC must agree on the same secret key prior to initiating communications (e.g., symmetric encryption).

A "threshold oblivious pseudorandom function (TOPRF)" may be a function that satisfies two properties, unpredictability (in function output) and obliviousness. A function meets the unpredictability property if it is difficult to predict the function's output when the function is applied to a random input value. A function meets the obliviousness property if the input value is difficult to guess when the output (e.g., the result of applying the function to the input value) is available.

A "threshold token generation (TTG) scheme" is a way of generating tokens for use in token-based authentication, in which the task of generating tokens for authentication is distributed among a set of n servers, such that at least a threshold t number of servers must be contacted to compute a token. TTG provides a strong unforgeability guarantee: even if t'<t of the servers are corrupt, any time a token on some new value x is needed, at least t-t' servers must be contacted.

DETAILED DESCRIPTION

Within this section, an overview of token-based authentication is first provided, followed by preliminary, formal definitions of certain notation used herein. This is followed by discussion of Password-based Threshold Authentication (PbTA) protocol and embodiments of methods of systems of token authentication adhering to PbTA, which can be used to protect and authorize access to secure resources, services, and applications in a manner that is secure against server breaches that could compromise long-term keys and user credentials. In particular, the role of the authentication server may be distributed among multiple server computers, which must collectively operate together to perform token generation or authentication. Any t servers may be able to collectively verify passwords and generate authentication tokens, which t–1 servers are unable to do. Thus, if t–1 servers are compromised by an attacker, the attacker will be unable to forge a valid token or mount offline dictionary attacks.

Discussion of PbTA is followed by an explanation of PASsword-based Threshold Authentication (PASTA), a general framework for building PbTA schemes, which allows for different methods of password-based threshold token generation to be utilized while still retaining common features of PbTA, such as strong password-safety and unforgeability. Some exemplary threshold token generation schemes adhering to PASTA are provided and their performance results are compared to the performance results typical of token-based authentication. Various proofs are presented towards the end.

I. Overview of Token-Based Authentication

Typical token-based authentication approaches utilize a plain password-based token generation protocol for generating authentication tokens, which is insecure against authentication server breaches. FIG. 1 illustrates a flow diagram portraying an example token-generation phase commonly implemented in many token-based authentication schemes.

It should be noted that the token-generation phase displayed in FIG. 1 is preceded by a one-time initial registration phase (not shown), during which the client 102 registers with their username/password and the client 102 stores their username and hashed password, h=H(password) on the ID server 105 (a type of server computer). More specifically, client 102 may register h=$\mathcal{H}$(username||password) where His a collision-resistant hash function (which may be implemented in a browser), with the ID server 105 as part of a registration phase. The registration step is executed once per client-password pair. After the registration step, the ID server 105 may have possession of a master secret key (msk) and the client's hashed password (h).

At step 1, in a sign-on phase, the client 102 sends their username (uid) and hashed password h' to the ID server 105. Since the ID server 105 is in possession of the hashed password, h, from the registration phase, the ID server 105 checks to see if h'=h (e.g., the value it recorded for the username during registration).

At step 2, if the check passes, the ID server 105 then uses the master secret key msk to compute a token $auth_{msk}(x)$ for the username, where auth is either a MAC or a digital signature and x is the data to be signed (e.g., the username or other data provided in the authentication request).

At step 3, the ID server 105 may send the token to the client 102, which may store the token to be used to gain access to a protected resource, such as the app server 104. When the client 102 seeks to sign-on to the app server 104, then at step 4, the client 102 can furnish the token to the app server 104. The app server 104 may have a verification key (vk) to check that the signed token (i.e., signed with the master secret key msk) is valid for the data to be signed. At step 5, the app server 104 may either grant or deny the client 102 access to the protected resource.

FIG. 2 illustrates the example contents of a typical authentication token used in these existing token-based authentication schemes, which utilize a plain password-based token generation protocol for generating authentication tokens. In particular, it illustrates the contents of a sample JSONWeb Token that uses hash message authentication code (HMAC).

In FIG. 2, the contents of the base64 encoded token is shown on the left panel 202. This is what is sent and stored. The decoded contents are shown on the right, in the right panels 204, 206, and 208. When the contents are decoded, the token contains a header with algorithm and token type (shown in panel 204), a payload that includes various attributes (shown in panel 206), and a HMAC of the header/payload (shown in panel 208).

With reference back now to FIG. 1. from FIG. 1 it can be seen that in the typical token-based authentication scheme, both the master secret key msk and the hashed password h are compromised if the ID server 105 is breached. Despite being hashed, client passwords could be recovered using offline dictionary attacks. In a dictionary attack, the attacker can try different passwords and hash them to see whether they match an entry for a particular username. A dictionary can be used for selecting passwords to try. Such an attack can reveal the password corresponding to a particular hash, where the password can be used with other servers, as users often re-use passwords. Since the attacker has the list of hashes and usernames, the attacker would already be able to gain access for this particular service. Offline dictionary attacks against hashed passwords can be slowed down using salting (e.g., to add some level of randomness to a username) or the use of memory hard functions but they do not fundamentally address the problems.

Various features and modifications to these traditional token-based authentication approaches are now contemplated for achieving the specific goal of fixing these problems. In some embodiments of the token-based authentication systems described herein, the master secret key (msk) may be protected against breaches by distributing it among multiple authentication servers. In particular, it may be distributed among n servers, such that any t of them can together use a threshold authentication (TA) scheme (i.e., a threshold MAC or signature) to generate tokens. However, without the necessary threshold of t servers (e.g., t−1 or less), the servers are unable to forge valid tokens or recover the msk.

In order to protect user hashed passwords from being recovered, in some embodiments, the hashing function (H) can be replaced with a pseudorandom function F. Each client may generate and use their own secret key k, with their secret key k stored at the authentication server (e.g., ID server 105). For this to work, an oblivious pseudorandom function (OPRF) protocol can allow a client to obtain $h=F_k(pw)$ without having to remember/obtain k or having to reveal any information about their password (pw) to servers. This protects against password recovery from eavesdroppers, but a compromised server can still mount dictionary attacks since it knows k and hence can compute $F_k(pw')$ for different passwords.

To take away the possibility of dictionary attacks, in some embodiments, a threshold oblivious pseudorandom function (TOPRF) can be used instead as the hashing function, and each client's secret key k can be shared among the servers, such that any t of them can collectively compute $F_k(pw)$ but no t−1 can. However, the resulting sign-on protocol would require at least four messages: client and servers perform the TOPRF protocol (which requires at least two messages for the client to calculate h), which the client then sends back to the servers as a third message to verify, and the servers responding with token shares of the token authentication scheme as a fourth message.

Thus, to reduce the number of back-and-forth messages and interactions, in some embodiments, the servers can store $h=F_k(pw)$ (from the registration phase), send back an encryption of their message of the token authentication scheme (e.g., their share of token) encrypted under a key derived from h (i.e., $E_h(\cdot)$ where E is a symmetric-key encryption scheme). This message is sent along with the second message of the TOPRF. If the client has used the correct password in the first message of the TOPRF, it can calculate h and decrypt the ciphertexts to obtain t token shares and combine them to recover the final token that can be used to obtain access to the secure resource. However, there may still be a subtle security issue with the possibility of client impersonation attacks. In particular, an attacker may compromise a single server and retrieve h, and then impersonate the client to which h belongs even without knowing its password. The attacker can then participate in a sign-on protocol to obtain a token; since the attacker knows h, it can decrypt the ciphertexts sent by the servers and combine the token shares to obtain a valid token without ever knowing the client's password.

To eliminate the possibility of a client impersonation attack, in some embodiments, the registration phase may be modified such that a client which computes h in the registration phase only sends $h_i=H'(h, i)$ to server i, where H' is assumed to be a random oracle. In other words, h is never revealed to or stored by any server, and each server only learns its corresponding $h_i$. Thus, the client impersonation attack no longer works since compromising up to t−1 servers only reveals t−1 of the $h_i$s to the attacker, who would remain one share short of generating a valid token.

Finally, there is the issue of an attacker being able to obtain all the PRF values $h=PRF_k(password)$ for all possible passwords and then leveraging an online attack against one client against another client. In particular, the attacker impersonates another client by participating in a single sign-on protocol with the servers. Since the attacker already knows all possible PRF values, it could try decrypting the ciphertexts sent from servers using the collected dictionary of PRF values (offline) to find the correct value and hence recover the password. Note that including client username as part of the input to the PRF does not solve the problem either since servers have no way of checking what username the attacker incorporates in the TOPRF protocol without adding expensive zero-knowledge proofs to this effect to the construction.

One natural solution is to have a distinct TOPRF key for every client, so that PRF values learned from one client would be useless for any other client. This means that servers need to generate a sufficiently large number of TOPRF keys in the global setup phase, which is not practical. However, every client could generate its own TOPRF key and secret shares it distributes between servers in the registration phase. Thus, in some embodiments, each client generates its own unique TOPRF key and unique set of secret shares that may be distributed among the servers. In some embodiments, the client may not have to persistently store the unique TOPRF key or secret shares, since the client may be able to generate an authentication token without them.

These modifications and features are contemplated in the Password-based Threshold Authentication (PbTA) protocol, which will be further described after the following preliminary, formal definitions of certain notation and terms used herein.

II. Preliminaries

A. Notation

This section defines and describes some notation that will appear throughout the disclosure.

Let κ denote the security parameter. Let Z denote the set of all integers and $Z_n$ denote the set $\{0, 1, 2, \ldots, n-1\}$. $Z_n^*$ is the same as $Z_n$ but with 0 removed. Let [a, b] for a, b∈, a≤b, to denote the set $\{a, a+1, \ldots, b-1, b\}$. [b] denotes the set [1, b]. N denotes the set of natural numbers.

Let x←$ S denote that x is sampled uniformly at random from a set S. Let PPT be shorthand for probabilistic polynomial time and negl to denote negligible functions.

Let [[α]] serve as a shorthand for $(\alpha, \alpha_1, \ldots, \alpha_n)$, where $\alpha_1, \ldots, \alpha_n$ are shares of α. A concrete scheme will specify how the shares will be generated. The value of n will be clear from context.

Let any 'require' statement in the description of an oracle be associated with enforcing some checks on the inputs. If any of the checks fail, the oracle outputs ⊥.

In any security game (e.g., such as the one associated with FIG. 7), let <O> denote the collection of all the oracles defined in the game. For example, if a game defines oracles $\mathcal{O}_1, \ldots, \mathcal{O}_\ell$, then for an adversary, Adv, $\text{Adv}^{<\mathcal{O}>}$ denotes that Adv has access to the collection $\langle \mathcal{O} \rangle := (\mathcal{O}_1, \ldots, \mathcal{O}l)$.

B. Secret Sharing and Secret Shares

This disclosure makes reference to shares, such as secret shares. In such cases, a secret (e.g., token or key) may be separated into shares that can be distributed without directly revealing the secret. Having possession of the sufficient amount of shares may enable the secret to be reconstructed from the shares.

Shamir's secret sharing can refer to a way to generate shares of a secret so that a threshold of the shares are sufficient to reconstruct the secret, while any smaller number hides it completely. For instance, let GenShare be an algorithm that takes inputs p,n, t, $\{(i, \alpha_i)\}_{i \in S}$ s. t. $t \le n < p$, p is prime, $S \subseteq [0,n]$ and $|S| < t$. It picks a random polynomial f of degree $t-1$ over $Z_p$ s. t. $f(i) = \alpha_i$ for all $i \in S$, and outputs $f(0)$, $f(1), \ldots, f(n)$.

To generate a (t,n)-Shamir sharing of a secret $s \in Zp$, GenShare is given p,n, t and (0, s) as inputs to produce shares $s_0, s_1, \ldots, sn$. Using the shorthand defined above, one can write the output compactly as $[\![ s ]\!]$. Given any t or more of the shares, say $\{s_j\}_{j \in T}$ for $|T| \ge t$, one can efficiently find coefficients $\{\lambda_j\}_{j \in T}$ such that $s = f(0) = \Sigma_{j \in T} \lambda_j \cdot sj$. However, knowledge of up to $t-1$ shares reveals no information about s if it is chosen at random from $Z_p$.

This disclosure also references cyclic group generators. Let GroupGen be a PPT algorithm that on input $1^\kappa$ outputs (p,g,G) where $p = \Theta(\kappa)$, p is prime, G is a group of order p, and д is a generator of G. Multiplication is used to denote the group operation.

C. Hardness Assumption

This disclosure makes reference to threshold oblivious pseudorandom function (TOPRF). A function that is considered a TOPRF may be assumed to satisfy certain properties that have been proven to be associated with TOPRF. For instance, a threshold oblivious PRF (TOPRF) may be assumed to be UC-secure under the Gap Threshold One-More Diffie-Hellman (Gap-TOMDH) assumption in the random oracle model. The Gap-TOMDH may be hard in the generic group model.

In particular, for $q_1, \ldots, q_n \in \mathbb{N}$ and $t', t \in \mathbb{N}$ where $t' < t \le n$, define $\text{MAX}_{t',t}(q_1, \ldots, q_n)$ to be the largest value of $\ell$ such that there exists binary vectors $u_1, \ldots, \mathbf{u}_\ell \in \{0,1\}^n$ such that each $u_i$ has $t-t'$ number of 1's in it and $(q_1, \ldots, q_n) \ge \Sigma_{i \in [\ell]} u_i$. (All operations on vectors are component-wise integer operations.) Looking ahead, t and t' will be the parameters in the security definition of TOPRF and PbTA (t will be the threshold and t' the number of corrupted parties).

Thus, a cyclic group generator GroupGen satisfies the Gap Threshold One-More Diffie-Hellman (Gap-TOMDH) assumption if for all t', t, n, N such that $t' \le t \le n$ and for all PPT adversary Adv, there exists a negligible function negl s.t. One—More$_{Adv}(1^\kappa,$ t', t, n, N) outputs 1 with probability at most negl($\kappa$). One—More$_{Adv}(1^\kappa,$ t', t, n, N) is defined below:

---

One - More$_{Adv}(1^\kappa,$ t', t, n, N):
1. (p,g,$\mathbb{G}$) ← GroupGen($1^\kappa$)
2. $g_1, \ldots, g_N \leftarrow_\$ \mathbb{G}$
3. $(\{i, ai\}_{i \in \mathcal{U}},$st) ← Adv(p, g,$\mathbb{G}$, $g_1, \ldots, g_N$), where $\mathcal{U} \subseteq$ [n], $|U| = t'$
4. $(k_0, k_1, \ldots, k_n)$ ← GenShare(p, n, t, $\{(i, a_i)\}_{i \in \mathcal{U}}$)
5. $q_1, \ldots, q_n := 0$
6. $((g'1, h1), \ldots, (g'_\ell, h_\ell))$ ← $\text{Adv}^{\langle \mathcal{O} \rangle}$(st)
7. output 1 iff
- $\ell > \text{MAX}_{t',t}(q_1, \ldots, q_n),$

- $\forall$ i $\in [\ell]$, g'$_i \in \{g_1, \ldots, g_N\}$ and $h_i = g'^{k_0}_i$, and
- $\forall$ i, j $\in [\ell]$ s.t. i $\ne$ j, g'$_i \ne$ g'$_j$.

$\mathcal{Q}$(i, x):
- require: i $\in$ [n]\$\mathcal{U}$, x $\in$ G
- increment $q_i$ by 1
- return $x^{k_i}$ $\mathcal{O}$ DDH ($g_1, g_2, h_1, h_2$)
- require: $g_1, g_2, h_1, h_2 \in \mathbb{G}$
- return 1 iff $\exists \alpha \in \mathbb{Z}_p$ s.t. $g_2 = g_1^\alpha$ and $h_2 = h_1^\alpha$

---

One—More$_{Adv}(1^\kappa,$ t', t, n, N) is further shown in FIG. 4, but has been reproduced here for the sake of convenience.

It may be discussed in reference to a Gap-TOMDH game, in which a random polynomial of degree $t-1$ is picked but Adv gets to choose its value at t' points (steps 3 and 4). Adv gets access to two oracles:

$\mathcal{O}$ allows it to compute $x^{k_i}$, where $k_i$ is the value of the randomly chosen polynomial at i, for $k_i$ that it does not know. A counter $q_i$ is incremented for every such call.

$\mathcal{O}_{DDH}$ allows it to check if the discrete log of $g_2$ w.r.t. $g_1$ is the same as the discrete log of $h_2$ w.r.t. $h_1$.

Intuitively, to compute a pair of the form (g, $g^{k_0}$), Adv should somehow get access to $k_0$. It clearly knows $k_i$ for $i \in \mathcal{U}$, but shares outside $\mathcal{U}$ can only be obtained in the exponent, with the help of oracle $\mathcal{O}$. One option for Adv is to invoke $\mathcal{O}$ with (i, g) for at least $t-t'$ different values of i outside of $\mathcal{U}$, and then combine them together along with the $k_i$ it knows to obtain $g^{k_0}$.

If Adv sticks to this strategy, it would have to repeat it entirely to compute $h^{k_0}$ for a different base h. It could invoke $\mathcal{O}$ on different subsets of [n] for different basis, but $\text{MAX}_{t',t}(q_1, \ldots, q_n)$ will be the maximum number of pairs of type (x, $x^{k_0}$) it will be able to generate through this process.

Certainly, an adversary is not restricted to producing pairs in the way described above. However, Gap-TOMDH assumes that no matter what strategy a PPT adversary takes, it can effectively do no better than this.

D. Threshold Token Generation

As previously mentioned, a threshold token generation (TTG) scheme, or alternatively a threshold authentication (TA) scheme, distributes the task of generating tokens for authentication among a set of n servers, such that at least a threshold t number of servers must be contacted to compute a token. TTG provides a strong unforgeability guarantee: even if t'<t of the servers are corrupt, any time a token on some new value x is needed, at least $t-t'$ servers must be contacted.

These TTG schemes may be further defined, formally, as a tuple of four PPT algorithms (Setup, PartEval, Combine, Verify):

Setup($1^\kappa$, n, t)→($[\![ sk ]\!]$, vk, pp). This algorithm generates a secret key sk, shares $sk_1, sk_2, \ldots sk_n$ of the key, a verification key vk, and public parameters pp. Share $sk_i$ is given to party i. (pp will be an implicit input in the algorithms below.)

PartEval($sk_i$, x)→yi. This algorithm generates shares of token for an input. Party i computes the i-th share $y_i$ for x by running PartEval with $sk_i$ and x.

Combine($\{i, yi\}i \in S$)=: tk/⊥. This algorithm combines the shares received from parties in the set S to generate a token tk. If the algorithm fails, its output is denoted by ⊥.

Verify (vk, tk)=: 1/0. This algorithm verifies whether token tk is valid or not using the verification key vk. (An output of 1 denotes validity.))

To check for consistency, for all $\kappa \in \mathbb{N}$, any n, $t \in \mathbb{N}$ such that $t \leq n$, all ($[\![$ sk $]\!]$, vk, pp) generated by Setup($1^\kappa$, n, t), any value x, and any set $S \subseteq [n]$ of size at least t, if $y_i \leftarrow$ PartEval (sk$_i$, x) for $i \in S$, then Verify(vk, Combine($\{(i, y_i)\}_{i \in S}$))=1.

TTG schemes also adhere to and satisfy the unforgeability property, which can be formally defined as, for all PPT adversaries Adv, there exists a negligible function negl such the probability that the following Unforgeability game outputs 1 is at most negl($\kappa$):

Unforgeability$_{TOP,Adv}(1^\kappa$, n, t):

Initialize. Run Setup($1^\kappa$, n, t) to get (sk, vk, pp). Give pp to Adv.

Corrupt. Receive the set of corrupt parties $\mathcal{U}$ from Adv, where $t':=|\mathcal{U}|<t$.

Give $\{sk_i\}_{i \in \mathcal{U}}$ to Adv.

Evaluate. In response to Adv's query (Eval, x, i) for $i \in [n] \backslash \mathcal{U}$, return $y_i :=$ PartEval(sk$_i$, x). Repeat this step as many times as Adv desires.

Challenge. Adv outputs ($x^{\hat{a}}$, $tk^{\hat{a}}$). Check if
$|\{i|$ Advmadeaquery(Eval, $x^{\hat{a}}$, i)$\}|<t-t'$ and
Verify(vk, $x^{\hat{a}}$, $tk^{\hat{a}}$)=1.

Output 1 if and only if both checks succeed.

Thus a TTG scheme may be confirmed to be unforgeable by first running Setup ($1^\kappa$, n, t) to get ($[\![$ sk $]\!]$, vk, pp). The public parameters (pp) are given to an adversary, Adv. Then a set of corrupt parties B is obtained from Adv, where t': $|B|<t$. The secret key shares, $\{sk_i\}_{i \in B}$, are given to Adv. In response to Adv's query, (Eval, x, i) for $i \in [n] \backslash B$, calculate and return $y_i$ PartEval (sk$_i$, x). This step can be repeated as many times as Adv desires. Adv will then use those answers to output ($x^*$, $tk^*$). These values are used to check for unforgeability; if Adv's query (Eval, $x^*$, i)$\}|<t-t'$ AND the value of Verify (vk, $tk^*$)=1, then the TTG scheme is unforgeable. The unforgeability property captures the requirement that it must not be possible to generate a valid token on some value if less than $t-t'$ servers are contacted with that value.

This disclosure now proceeds to discuss the Password-based Threshold Authentication (PbTA) protocol as contemplated herein, which introduces modifications and features over traditional token-based authentication schemes for increased security.

III. Password-Based Threshold Authentication

A. Introduction to PbTA

Under the Password-based Threshold Authentication (PbTA) protocol, the role of the identity provider (e.g., the authentication server) is distributed among n servers which collectively verify clients' passwords and generate authentication tokens for them. PbTA enables any t($2 \leq t \leq n$) servers to authenticate the client and generate valid tokens while any attacker who compromises at most $t-1$ servers cannot forge valid tokens or mount offline dictionary attacks.

More specifically, in a password-based threshold authentication (PbTA) system, there are n servers and any number of clients. PbTA is naturally split in to four phases: (i) a global set-up phase; (ii) a registration phase; (iii) a sign-on phase; and (iv) a verification phase. During a global set-up phase, a master secret key is shared among the servers, which they later use to generate authentication tokens. In the registration phase, a client C computes signup messages (one fore each server) based on its username and password and sends them to the servers, and each server processes the message it receives and stores a unique record for that client. In the sign-on phase, a client initiates authentication by sending a request message that incorporates its username/password and additional information to be included in the token. Each server computes a response using its record for the users. This response contains shares of the authentication token the client eventually wants to obtain. If client's password is a match the client is able to combine and finalize the token shares into a single valid token for future accesses. During the verification phase, the finalized token can be verified using a verification algorithm that takes a public or private (depending on the token type) verification key to validate that the token was generated using the unique master secret key. The verification process can also be distributed among multiple servers (may be required in the MAC-based tokens).

Under PbTA, the identity of servers may be fixed and public. In particular, clients may be able to use a public key $PK_i$ to encrypt to the i-th server. In some embodiments, public keys are needed only in the registration process and not during token generation. Clients do not need to store any persistent secret information. The only secret they need is their password which would not be stored anywhere. The device(s) a client uses for registration and sign-on can store certain public parameters of the system (e.g. the public keys of the servers).

A PbTA scheme Π may be formally defined as a tuple of seven PPT algorithms (GlobalSetup, SignUp, Store, Request, Respond, Finalize, Verify) that satisfies the correctness requirement.

The GlobalSetup($1^\kappa$, n, t, P)→(sk, vk, pp, ($SK_1$, . . . , $SK_n$)) algorithm takes the security parameter, number of servers n, a threshold t and the space of passwords P as inputs. For token generation, it outputs a secret key sk, shares $sk_1$, $sk_2$, . . . , $sk_n$ of the key, and a verification key vk. For secure communication to the servers, it generates IND-CCA2 public-key encryption key-pairs ($PK_1$, $SK_1$), . . . , ($PK_n$, $SK_n$). The public parameters pp include all the inputs to GlobalSetup, public keys $PK_1$, . . . , $PK_n$, and other information. (pp will be an implicit input in the algorithms below.) The n servers will be denoted by $S_1$, . . . , $S_n$. $S_i$ receives ($sk_i$, $SK_i$, pp) and initializes a set of records $rec_i := \emptyset$, for $i \in [n]$.

During the registration phase, the SignUp(C, pwd)→$\{$(C, msg$_i$)$\}_{i \in [n]}$. algorithm takes as inputs a client id C and a password pwd $\in$ P, and outputs a message for each server. The Store($SK_i$, C, msg$_i$)=: $rec_{i,C}$. algorithm takes as input the secret key $SK_i$, a client id C and a message msg, and outputs a record $rec_{i,C}$. $S_i$ stores (C, $rec_{i,C}$) in its list of records $rec_i$ if no record for C exists; otherwise, it does nothing.

During the sign-on phase, the Request(C, pwd, x, $\mathcal{T}$)→(st, $\{$(C, x, req$_i$)$\}_{i \in \mathcal{T}}$). algorithm takes as inputs a client id C, a password pwd, a value x, and a set $\mathcal{T} \subseteq \mathcal{S}$, and outputs a secret state st and request messages $\{req_i\}_{i \in \mathcal{T}}$. For $i \in \mathcal{T}$, $req_i$ is sent to $S_i$. The Respond($sk_i$, $rec_i$, C, x, $req_i$)→$res_i$. algorithm takes as inputs the secret key share $sk_i$, the record set $rec_i$, a client id C, a value x and a request message $req_i$, and outputs a response message $res_i$. The Finalize(st, $\{res_i\}_{i \in \mathcal{T}}$)=: tk. algoirthm takes as input a secret state st and response messages $\{res_i\}_{i \in \mathcal{T}}$, and outputs a token tk.

During the verification phase, the Verify(vk, C, x, tk)→$\{0,1\}$. algorithm takes as inputs the verification key vk, a client id C, a value x and a token tk, and outputs 1 (denotes validity) or 0.

Correctness is satisfied for all $\kappa \in \mathbb{N}$, any n, $t \in \mathbb{N}$ such that $t \leq n$, all $\{PK_i\}_{i \in [n]}$ and P, all (sk, vk, pp) generated by Setup($1^\kappa$, n, t, $\{PK_i\}_{i \in [n]}$, P), any client id C, any password pwd$\in$P, any value x, and any $\mathcal{T} \subseteq [n]$ of size at least t, if:

((C, msg$_1$), . . . , (C, msg$_n$))←SignUp(C, pwd),
$rec_{i,C}$:=Store($SK_i$, C, msg$_i$) for $i \in [n]$,
(st, $\{$(C, x, req$_i$)$\}_{i \in \mathcal{T}}$)←Request(C, pwd, x, $\mathcal{T}$),
$res_i$←Respond($sk_i$, $rec_i$, C, x, $req_i$) for $i \in \mathcal{T}$, tk:=Finalize(st, $\{res_i\}_{i \in \mathcal{T}}$),
then Verify(vk, C, x, tk)=1.

Figure 3A:
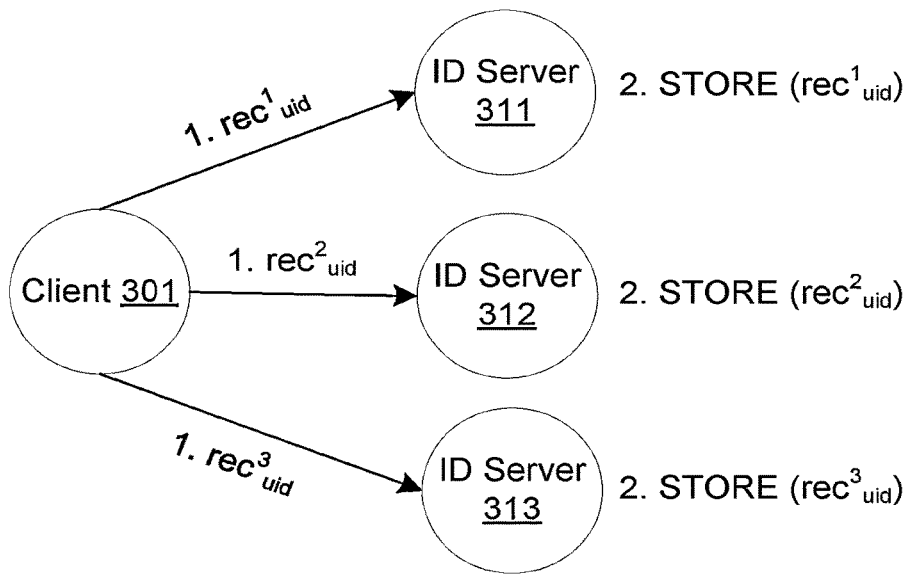
FIG. 3A illustrates a flow diagram of registration under a Password-based Threshold Authentication (PbTA) protocol.
Figure 3B:
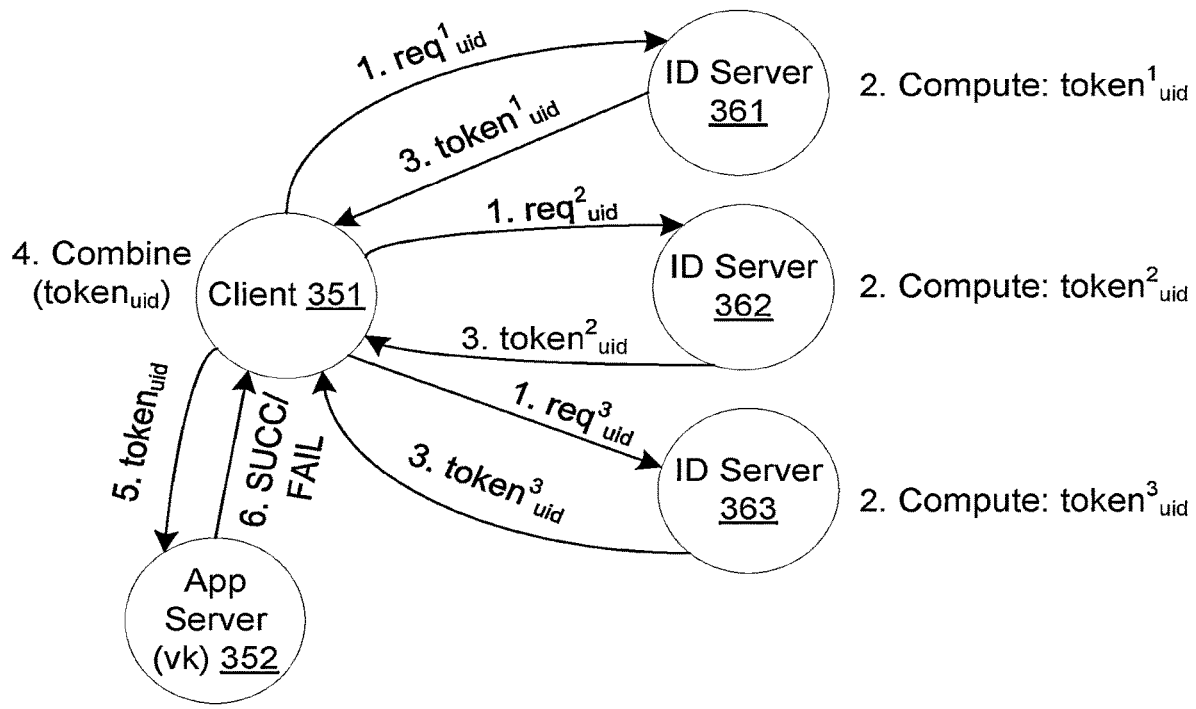
FIG. 3B illustrates a flow diagram of sign-on under a Password-based Threshold Authentication (PbTA) protocol.

In order to provide a better understanding of how PbTA schemes operate, the registration and sign-on phases under the PbTA protocol are shown in FIG. 3A and FIG. 3B, respectively.

In particular, FIG. 3A illustrates a flow diagram of registration under a Password-based Threshold Authentication (PbTA) protocol.

There may be two or more authentication servers in a PbTA scheme. In the embodiment shown in the figure, three servers are shown: ID server 311, ID server 312, and ID server 313.

In some embodiments, each authentication server may possess and utilize a different secret share that is shared with and known by the client 301. These secret shares may be generated during an initial setup phase.

However, in other embodiments, the client 301 may generate a set of secret shares and distribute them among the authentication servers. There may be a different secret share for each authentication server in the system. Such embodiments are discussed in more detail below.

During the registration process, client 301 receives a user identifier (e.g., username) and password credential from the user. In some embodiments, the client 301 may compute a hash (h) of the password.

Instead of the client 301 sending this unique hashed password (h) to each of the available servers, the client 301 may create a blinded hash of the password with randomness that only the client knows. The blinded hash may be sent each of the servers.

In some embodiments, the client 301 may also generate a set of secret shares ($sk_i$) from the hashed password (h), which acts as the master secret key. Thus, the secret shares will be derived from h and the number of them will correspond to the number of authentication servers.

At step 1, client 301 sends the blinded hash of the password$_i$, the corresponding secret share, and the user identifier, to each of the three ID servers: ID server 311, ID server 312, and ID server 313. In some embodiments, as shown in the figure, the client 301 may generate a message, $rec_{uid}$, for each server, which may contain the username or user identifier (uid), the blinded hash, and/or corresponding secret share for that server derived from h.

In some embodiments, the client 301 may also generate a hash portion for each server by applying the server's corresponding secret share to the blinded hash. The client 301 may send that hash portion within the message or in a separate communication. Each hash portion may be referred to as $h_i$, where $h_i$=H'(h, i) to server i, and H' is assumed to be a random oracle. In the figure, three servers are shown, so client 301 provides three hash portions, $h_1$, $h_2$, and $h_3$ to the respective servers. This is described in additional detail with regards to FIGS. 10 and 11.

At step 2, each ID server may store the record or information it receives, such as the secret share corresponding to the particular user identifier in the message, as well as the corresponding hash portion (e.g., from client 301) which is also saved based on the user identifier.

In some embodiments, the client 301 does not have to continue store the hashed password (h), the generated secret shares, or the hashed portions since the client 301 may be able to indirectly retrieve that information from the authentication servers when the client 301 requests the token shares for generating the authentication token.

FIG. 3B illustrates a flow diagram of sign-on under a Password-based Threshold Authentication (PbTA) protocol, which follows after registration.

At step 1, client 351 sends a request message to each of the three ID servers: ID server 361, ID server 362, and ID server 363. Each request message is indicated in the figure as $req_{uid}$. The client 351 is requesting from each server an encrypted token share (e.g., their encryption of their message of the token authentication scheme). In each message, the client 351 may furnish a user identifier that the authentication server can use to retrieve the secret share, $sk_i$, tied to that user identifier (which was stored during the registration process). The token share may be encrypted under a key derived from that server's hash portion for the user, $h_i$ (i.e., using $E_{h_i}(\cdot)$ where E is a symmetric-key encryption scheme), that was saved during the registration process.

At step 2, each ID server computes their encrypted share of the token, indicated in the figure as token$^i_{uid}$. Each server provides a token share that is encrypted based on that server's hash portion for the user, $h_i$, for the user associated with client 351. For example, ID server 361 may use $h_1$ for the encryption key, ID server 361 may use $h_2$ for the encryption key, and so forth.

At step 3, each ID server sends their encrypted share of the token to the client 351 in a response message. The encrypted token shares are labeled as token$^i_{uid}$.

At step 4, the client 351 can decrypt all the encrypted token shares in the response messages to obtain all the token shares (three, in this instance). The client 351 can decrypt each encrypted token share since the client 351 initially generated all the hash portions $h_i$ that were distributed to the authentication servers during the registration process, and the client 351 may use the corresponding hash portion for each server to decrypt the encrypted token share received from that server. Alternatively (e.g., if the client 351 did not locally save the hash portions), the client 351 may receive partial hash responses from the servers that can be used to determine the hash portions. This approach is described further in regards to FIGS. 10 and 11. With all the token shares, the client 351 may combine them to recover the final token that can be used to obtain access to the secure resource (e.g., app server 352). The final token is labeled as token$_{uid}$.

At step 5, the client 351 will send the full token to app server 352, which has verification key (vk) that can be used to verify the token. At step 6, the app server 352 will inform the client 351 if it was successful or not (e.g., whether the token is valid).

In some embodiments, the client 351 may not locally store the secret shares or hash portions $h_i$ that were distributed to the authentication servers during registration, which means the client 351 may require additional information from the authentication servers in order to decrypt the encrypted token shares. Such embodiments are discussed in further detail in regards to FIGS. 10-11.

With the basic operation of a PbTA scheme now understood, further discussion is now provided on an important feature found in PbTA schemes.

B. Threshold Oblivious Pseudo-Random Function (TO-PRF)

One of the features of PbTA is the use of a threshold oblivious pseudo-random function (TOPRF). A pseudo-random function (PRF) family is a keyed family of deterministic functions. A function chosen at random from the family is indistinguishable from a random function. Oblivious PRF (OPRF) is an extension of PRF to a two-party setting where a server S holds the key and a party P holds an input. S can help P in computing the PRF value on the input but in doing so P should not get any other information and S should not learn P's input. A threshold oblivious pseudo-random function (TOPRF) is a further extension on this, which naturally satisfies the two properties of obliviousness and unpredictability.

In particular, a TOPRF may be referred to as an $(\chi, \mathcal{R})$-threshold oblivious pseudo-random function (TOPRF) TOP, which is a tuple of four PPT algorithms, (Setup, Encode, Eval, Combine):

Setup($1^\kappa$, n, t)→(sk, pp). This algorithm generates n secret key shares $sk_1, sk_2, \ldots, sk_n$ and public parameters pp. Share $sk_i$ is given to party i.

Encode(x, ρ):=c. This algorithm generates an encoding c of $x \in \chi$ using randomness $\rho \in \mathcal{R}$.

Eval($sk_i$, c)→$z_i$. This algorithm generates shares of TOPRF value from an encoding. Party i computes the i-th share $z_i$ from c by running Eval with $sk_i$ and c.

Combine(x, $\{(i, z_i)\}_{i \in S}$, ρ):=h/⊥. This algorithm combines the shares received from parties in the set S using randomness ρ to generate a value h. If the algorithm fails, its output is denoted by ⊥.

With a TOPRF, irrespective of the randomness used to encode an x and the set of parties whose shares are combined, the output of the Combine algorithm does not change (as long as the Combine algorithm is given the same randomness used for encoding). More specifically, for all $\kappa \in \mathbb{N}$, any n, t ∈ $\mathbb{N}$ such that t≤n, all (sk, pp) generated by Setup($1^\kappa$, n, t), any value $x \in \chi$, any randomness ρ, $\rho' \in \mathcal{R}$, and any two sets S, S' ⊆ [n] of size at least t, if c:=Encode(x, ρ), c':=Encode(x, ρ'), $z_i$←Eval($sk_i$, c) for i ∈ S, and $z'_j$←Eval($sk_j$, c') for j ∈ S', then Combine(x, $\{(i, z_i)\}_{i \in S}$, ρ)=Combine(x, $\{(j, z'_j)\}_{j \in S'}$, ρ')≠⊥.

This feature enables the token shares to be combined into a token, and the output of the Combine algorithm may be referred to as the output of the TOPRF on x, and denoted by TOP(sk, x).

The Combine algorithm could be broken into two separate algorithms, PubCombine and Decode. PubCombine can be run by anyone with access to just the partial evaluations $z_i$; it outputs an encoded PRF value z'. Decode can either be the same as Combine or it could take (x, z', ρ) as inputs. Since any $x \in \chi$, $\rho \in \mathcal{R}$, S ⊆ [n] of size at least t, if c:=Encode(x, ρ) and $z_i$←Eval($sk_i$, c) for i ∈ S, then PubCombine($\{(i, z_i)\}_{i \in S}$)≠PubCombine($\{(i, z'_i)\}_{i \in S}$) if $z'_i \neq z_i$ for any i. This means that if any of the partial evaluations are tampered with, then PubCombine may be used to detect that.

A TOPRF protocol may be UC-secure under the Gap Threshold One-More Diffie-Hellman (Gap-TOMDH) assumption in the random oracle model and that Gap-TOMDH is hard in the generic group model.

This hardness can be assumed. Let U be the set of binary vectors of length n. The weight of a vector u ∈ U is the number of 1s in it. Let t', t ∈ N s.t. t'<t≤n. Define $MAXX_{t',t}$ ($q_1, \ldots, q_n$) to be the largest value of ℓ s.t. $\exists u_1, \ldots, u_\ell \in U$ of weight t−t' s.t. $(q_1, \ldots, q_n) - \Sigma_{i \in [\ell]} u_i \geq 0$. (All operations on vectors are defined component-wise.)

FIG. 4 illustrates further assumptions associated with a Gap Threshold One-More Diffie-Hellman (Gap-TOMDH) game.

Under what is shown in FIG. 4, a cyclic group generator GroupGen satisfies the (t', t,n, N)-Threshold One More Diffie-Hellman (TOMDH) assumption for t'<t≤n if for all PPT adversary Adv, there exists a negligible function negl s.t. One-More$_{Adv}$ ($1^\kappa$, t', t,n, N) outputs 1 with probability at most negl(κ).

A TOPRF scheme may also have two properties, unpredictability and obliviousness. Unpredictability means that it must be difficult to predict TOPRF output on a random value, and obliviousness means that the random value itself is hard to guess even if the TOPRF output is available.

FIG. 5 illustrates assumptions and definitions associated with Unpredictability, a property associated with TOPRF.

Thus, a TOPRF [$(\chi, \mathcal{R})$-TOPRF TOP:=(Setup, Encode, Eval, Combine)] is considered unpredictable if, for all n, t ∈ $\mathbb{N}$, t≤n, and all PPT adversaries Adv, there exists a negligible function negl s.t.

$$Pr[\text{Unpredictability}_{TOP,Adv}(1^\kappa, n, t) = 1] \leq \frac{MAX_{|B|,t}(q_1, \ldots, q_n)}{|\mathcal{X}|} + negl(\kappa),$$

where the term Unpredictability is defined as in FIG. 5.

FIG. 6 illustrates assumptions and definitions associated with Obliviousness, a property associated with TOPRF.

Thus, a TOPRF [$(\chi, \mathcal{R})$-TOPRF TOP:=(Setup, Encode, Eval, Combine)] is oblivious if for all n, t ∈ $\mathbb{N}$, t≤n, and all PPT adversaries Adv, there exists a negligible function negl s.t.

$$Pr[\text{Obliviousness}_{TOP,Adv}(1^\kappa, n, t) = 1] \leq \frac{MAX_{|B|,t}(q_1, \ldots, q_n) + 1}{|\mathcal{X}|} + negl(\kappa),$$

where the term Obliviousness is defined in FIG. 6.

A TOPRF, TOP, can be described based on the TOMDH assumption for an input space $\chi$ as follows: [topsep=0 pt]

Setup($1^\kappa$, n, t). Run GroupGen($1^\kappa$) to get (p, g, $\mathbb{G}$). Pick an sk at random from $\mathbb{Z}_p$. Let sk←GenShare(p, n, t, (0, sk)) be a (t, n)-Shamir sharing of sk. Let $\mathcal{H}_1: \chi \times \mathbb{G} \to \{0,1\}^\kappa$ and $\mathcal{H}_2: \chi \to \mathbb{G}$ be hash functions. Output sk and pp:=(p, g, $\mathbb{G}$, n, t, $\mathcal{H}_1$, $\mathcal{H}_2$).

Encode (x, ρ). Output $\mathcal{H}_2(x)^\rho$.

Eval($sk_i$, c). Output $c^{sk_i}$.

Combine(x, $\{(i, z_i)\}_{i \in S}$, ρ). If |S|<t−1, output ⊥. Else, use S to find coefficients $\{\lambda_i\}_{i \in S}$ and output $\mathcal{H}_1(x\|z^{\rho^{-1}})$.

It is easy to see that TOP is a consistent $(\chi, \mathbb{Z}*_p)$-TOPRF scheme.

One can define PubCombine($\{(i, z_i)\}_{i \in S}$) to output z, the intermediate value in Combine. Given x,z and ρ, the output of Combine is fixed. So, if an arbitrary set of partial evaluations produces the same z, Combine would output the same thing. Moreover, if PubCombine produces a $z^a$ different from z, then $z^{a\pi^{-1}} \neq z^{\rho^{-1}}$, and output of Combine will be different with high probability (assuming that $\mathcal{H}_1$ is collision-resistant).

Other than a TOPRF with unpredictability and obliviousness, PbTA sets forth some security requirements, such as password safety and token unforgeability. These two properties can be better understood within the context of a security game.

FIG. 7 illustrates the assumptions associated with a Security game for PbTA. The security game was previously detailed in the preliminaries section. Within this context, the two security properties (password safety and token unforgeability) of PbTA are formally defined. Formal proofs of these security properties are located towards the end of the disclosure.

A PbTA scheme Π is password safe if for all n, t ∈ $\mathbb{N}$, t≤n, all password space P and all PPT adversary Adv that output ($C^a$, $pwd^a$) for $C^a \notin v$ in SecGame$_{\Pi,Adv}$($1^\kappa$, n, t, P) (FIG. 7), there exists a negligible function negl s.t.

$$Pr\left[pwd^{\mathring{a}} = PwdList\left(C^{\mathring{a}}\right)\right] \leq \frac{\text{MAX}_{|B|,t}\left(Q_{C^{\mathring{a}},1}, \ldots, Q_{C^{\mathring{a}},n}\right) + 1}{|P|} + negl(\kappa).$$

A PbTA scheme Π is unforgeable if for all n, t∈ ℕ, t<n, all password space P and all PPT adversary Adv that output ($C^{\mathring{a}}$, $x^{\mathring{a}}$, $tk^{\mathring{a}}$) in SecGame$_{\Pi,Adv}$($1^\kappa$, n, t, P) (FIG. 7), there exists a negligible function negl s.t.

if $Q_{c^{\mathring{a}},x^{\mathring{a}}} < t - |B|$, $$Pr\left[\text{Verify}\left(vk, C^{\mathring{a}}, x^{\mathring{a}}, tk^{\mathring{a}}\right) = 1\right] \leq negl(\kappa);$$

else if $C^{\mathring{a}} \notin \mathcal{V}$, $$Pr\left[\text{Verify}\left(vk, C^{\mathring{a}}, x^{\mathring{a}}, tk^{\mathring{a}}\right) = 1\right] \leq \frac{\text{MAX}_{|B|,t}\left(Q_{C^{\mathring{a}},1}, \ldots, Q_{C^{\mathring{a}},n}\right)}{|P|} + negl(\kappa).$$

IV. Pasta

A. Introduction to PASTA

These various concepts associated with PbTA can be taken into consideration and used to formulate PASsword-based Threshold Authentication (PASTA), a general framework for building PbTA schemes, which allows for different methods of password-based threshold token generation to be utilized. PASTA provides a way to combine any threshold token generation scheme (TTG), such as threshold MAC or digital signature, and any threshold oblivious pseudorandom function (TOPRF) in a black-box way to build a PbTA scheme that provides strong password-safety and unforgeability guarantees.

Thus, PASTA may work for both symmetric-key tokens (i.e. MAC) and public-key tokens (i.e. digital signature), while still adhering to the stringent security requirements for the PbTA protocol and meeting the requirements of token unforgeability and password-safety. Though the verification procedures for symmetric-key and public-key tokens are different in terms of being private or public, their token generation procedures are both private. Since PASTA focuses on generating tokens, it may work for both types of tokens.

In some embodiments, authentication schemes generated under PASTA may require minimal client interaction. In particular, after a one-time global setup to secret share a master secret key, servers need not communicate with each other, and clients can register their username/password via a single "sign up" message to the authentication servers. A registered client can sign-on using a two-message protocol that ensures if the client's password is correct, the client obtains a valid authentication token.

FIG. 8 illustrates a formal set of requirements and descriptions associated with PASsword-based Threshold Authentication (PASTA). For instance, it can be seen that the TTG scheme includes four algorithms (TTG. Setup, TTG.PartEval, TTG.Combine, and TTG. Verify) and the TOPRF also includes four algorithms (TOP. Setup, TOP.Encode, TOP.Eval, and TOP.Combine). PASTA may use these two main underlying primitives, TTG and TOPRF, in a fairly lightweight manner.

The sign-on phase, which may include three algorithms (Request, Respond and Finalize), does not add any public-key operations on top of what the primitives may have. When the Request algorithm is run, TOP.Encode is run once. Respond runs both TOP.Eval and TTG.PartEval, but only once each. Finalize runs TOP.Combine and TTG.Combine once each. Even though number of decryptions in Finalize is proportional to t, these operations are very fast symmetric-key operations. Thus, PASTA makes minimal use of the two primitives that it builds on and its performance is mainly governed by the efficiency of these primitives.

In some embodiments adhering to PASTA, a key-binding symmetric-key encryption scheme may be used so that, when a ciphertext is decrypted with a wrong key, decryption fails. Key-binding can be obtained very efficiently in the random oracle model (e.g., by appending a hash of the secret key to every ciphertext).

The PASTA framework may assume, during the sign-on phase, that the servers communicate to clients over authenticated channels so that an adversary cannot send arbitrary messages to a client on behalf of honest servers. PASTA does not assume that these channels provide any confidentiality. If there is an authenticated channel in the other direction, namely the servers can identify the sender of every message they receive, then passwords are not needed and a PbTA scheme is moot.

PASTA may provide a formal guarantee of strong password-safety and unforgeability associated with a typical PbTA scheme. If particular, if the TTG is an unforgeable threshold token generation scheme, the TOP is an unpredictable and oblivious TOPRF, and the symmetric-key encryption scheme (SKE) is a key-binding CPA-secure symmetric-key encryption scheme, then the PbTA scheme under PASTA is password-safe and unforgeable when H is modeled as a random oracle.

An important feature of PASTA, especially from the point of view of proving security, is that the use of the TOPRF and the TTG overlaps very slightly. The output of the TOPRF is used to encrypt the partial evaluations of the TTG but, apart from that, they operate independently. Thus, even if the TTG is broken in some manner, it would not affect the safety of clients' passwords. Furthermore, even if the TOPRF is broken, a threshold number of servers would still be needed to generate a token.

B. Example Operation of PASTA-based Schemes

These important features that are common to all schemes under PASTA are depicted and discussed with reference to FIGS. 9-11.

In general, as compared to the technique in FIG. 1, embodiments of authentication schemes under PASTA can use multiple servers, where a specified number (e.g., t) of servers are required to provide valid responses for a valid token to be generated. The servers can store different shares (e.g., secret shares) of the master key, so that if (t−1) servers are compromised, then the master key is not compromised. The value of t can be a variable parameter. But, such a solution does not prevent a dictionary attack if the list of usernames and hashes is still stored at each of the servers. And, it is desirable to not reconstruct the key, as that can allow it to be compromised. Accordingly, embodiments can have the servers provide t valid responses (e.g., token shares, which can be generated using a respective key share), and the client can reconstruct the token.

Figure 9:
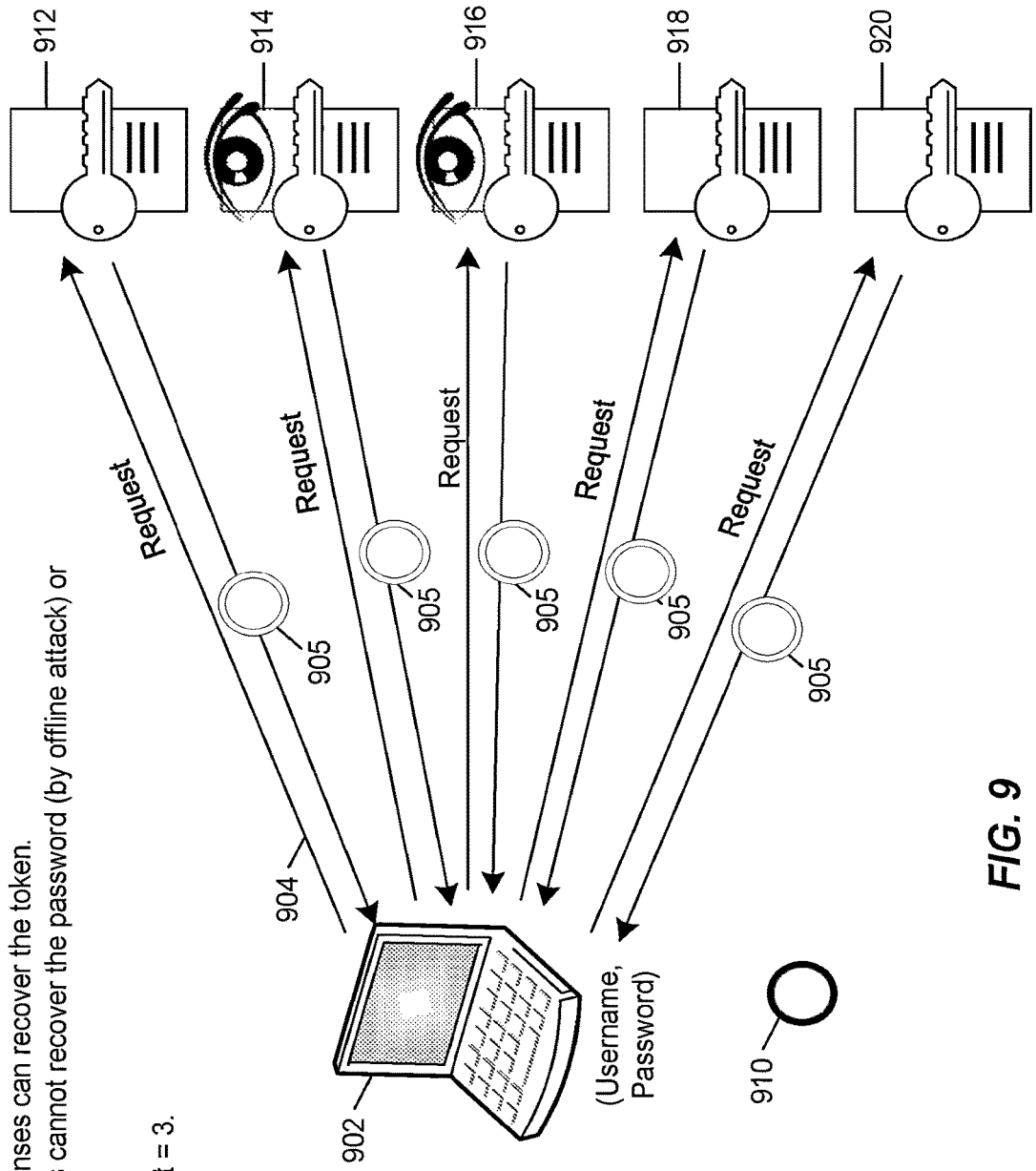
FIG. 9 illustrates a block diagram depicting generation of a token under PASTA, according to embodiments of the present invention.

FIG. 9 shows a generation of a complete token under PASTA, according to embodiments of the present invention. This figure is provided to show how a complete token may be generated by combining token shares, a concept that is expanded upon in FIGS. 10-11.

During the sign-on phase, a client 902 may obtain the user identifier along with a credential (e.g., password corresponding to the user identifier), such as from a user input. The client 902 then sends a request message 904 to each of the n servers, with each message containing the user identifier and additional data x to be added to the token, e.g., a time-stamp, validity period, access policy, and the like. In some embodiments, the request message 904 may also include a blinded hash of the credential that the user has provided. There may be a hashing engine associated with the client 902. In the figure shown, there are five servers: servers 912, 914, 916, 918, and 920.

Each server receives the request message and computes a response message using information it has stored for that user during the registration phase. The server may look up the secret share it has stored for that user identifier. In some embodiments, the server may look up a hash portion corresponding to the user identifier that was stored. In some embodiments, the secret share and the hash portion corresponding to the user identifier are different for every server.

Each server may generate a share 905 of the authentication token based on the user identifier and the secret share that corresponds to that user identifier. Each server may then encrypt this token share 905, and collectively, the servers may send the encrypted token shares 905 back to the client 902 in a response message. This token share 905 may be encrypted using a key derived from the stored hash portion corresponding to the user identifier.

The client 902 may be able to decrypt each encrypted token share 905. The client 902 can then reconstruct the authentication token 910 from all the token shares 905 from n response messages (e.g., as a result of authentication at each server). There may be a combination engine that combines the token shares 905 to generate the token 910, and a verify algorithm that verifies this token 910.

Thus, each server essentially provides a token share 905 (i.e., if the requests are validated) to the client 902, with the token shares being generated through a method such as Shamir's secret sharing that was previously described, such that having a sufficient threshold of the shares is sufficient to reconstruct the token 910. If for instance, as shown in the figure, servers 914 and 916 have been compromised, those two servers only have two of the five total token shares 905, which means the token 910 cannot be forged. Furthermore, servers 914 and 916 would be unable to determine the password, which is only possessed by client 902. Thus, all five responses from servers 912, 914, 916, 918, and 920 would need to be valid in order to recover the token. Any less than that would result in the inability to recover either the password possessed by client 902 or the token 910.

In various embodiments, the scheme may use various types of non-Interactive Threshold Token Generation (NITTG), such as symmetric key based MAC, public key based MAC, secret sharing (Shamir) RSA based digital signature, or pairing based digital signature. NITTG may allow for client 902 to send a message to all the servers, which can, without any further interaction from the client 902, generate their share of the token and send it back to the client 902.

In some embodiments, the combining engine can be performed using a threshold oblivious pseudorandom function (TOPRF), as described herein. To enable combining the token shares, the client 902 can hash the password (or other credential), but it would blind the hash and send a blinded hash of the password to the servers in the registration phase (described in FIG. 10). The servers would not receive any information about the password in that process due to the blinding. The client may generate a special key for each of the servers, with each of the special keys being sent to the respective server.

Figure 10:
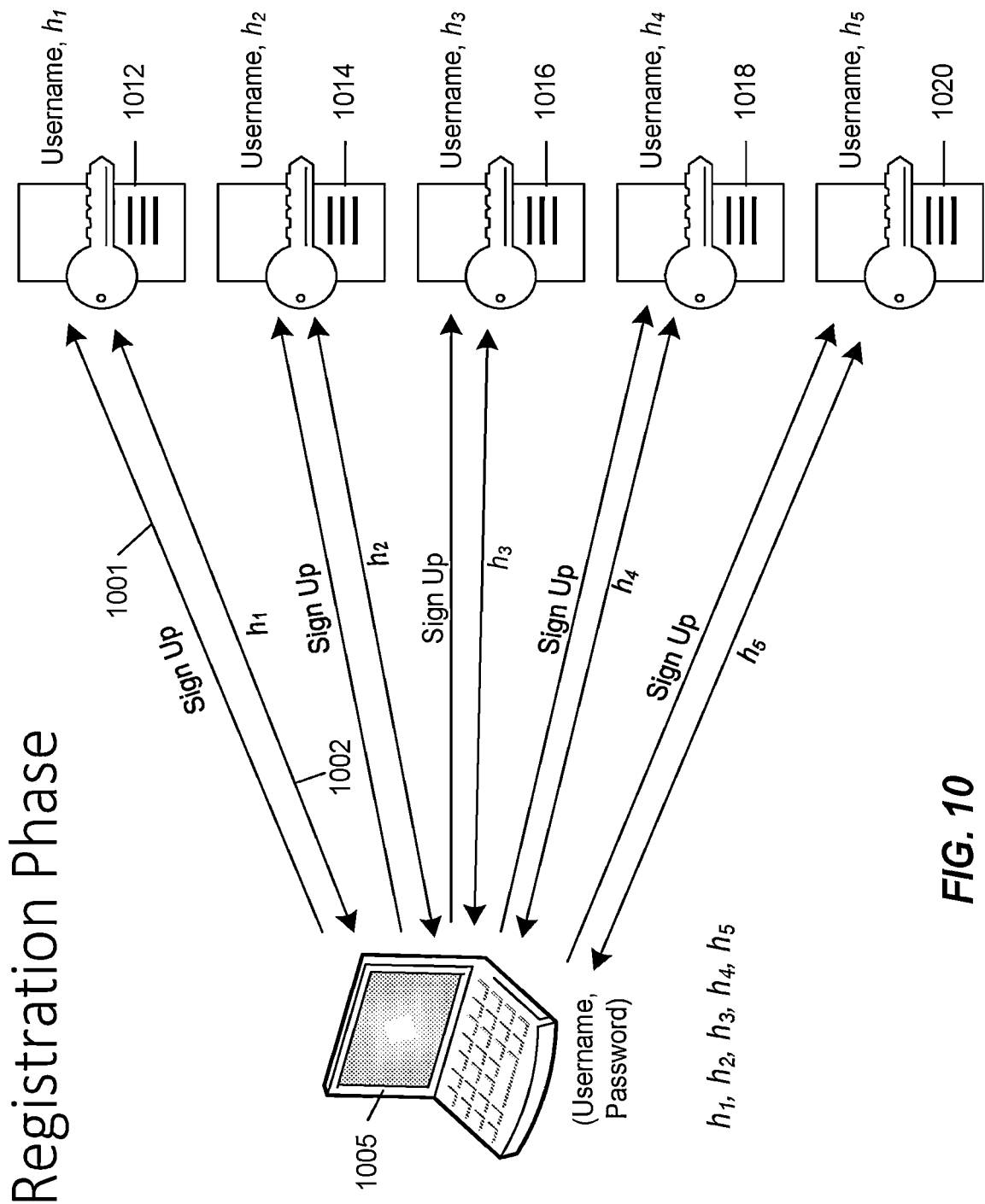
FIG. 10 illustrates a block diagram depicting a registration phase under PASTA, according to embodiments of the present invention.

FIG. 10 illustrates a registration phase under PASTA, according to embodiments of the present invention.

In a registration phase, a user of the client 1005 can sign up for the service. The use of multiple servers (in this case, there are 5 servers: servers 1012, 1014, 1016, 1018, and 1020) can be hidden from a user of the client 1005. However, the number of servers may be established and fixed, along with other security parameters such as the threshold t.

In some embodiments, the number of servers, threshold, and so forth may have been used to generate a globally-applicable secret key (sk), shares of the key (e.g., secret shares, $sk_1$, $sk_2$, and so forth), and verification key (vk). The number of secret shares will correspond to the number of servers and each secret share may be distributed to a different server. These secret shares may be shared with the client.

In some embodiments, each client (e.g., client 1005) may select or generate a unique secret key and a number of shares of the key (e.g., secret shares) corresponding to the number of servers. For example, secret shares can be generated based off a selected password or hashed password. These secret shares may be distributed one-to-one among the servers, and they may be unique to the client and/or the user. Thus, each server would receive and store a unique secret share corresponding to every client and/or user in the system. Such embodiments are described further in regards to FIGS. 10 and 11.

In such embodiments, the client 1005 may request a username and a password credential from the user when the user first signs up. The client 1005 may generate a hash (h) of the password. In some embodiments, the client 301 may hash the password using a TOPRF. In some embodiments, the client 1005 may blind the hashed password to create a blinded hash of the hashed password. For instance, the hash can be blinded by raising to a power of a random value R.

The client 1005 may send the user identifier, blinded hash of the hashed password, and/or corresponding secret share to each server. For instance, message 1001 to the first server 1012 may contain the user identifier and a blinded hash, and potentially a secret share $sk_1$. In some embodiments, each server may generate a unique record for the user based on the secret share it was issued, the user identifier, and/or the blinded hash of the password, and then store the unique record based on the user identifier.

In some embodiments, each server can use the secret share it has been provided to generate a partial answer (also referred to as a partial hash response) by applying the secret share to the blinded hash it received. For example, the blinded hash may be received by server 1012, which raises the blinded hash to server 1012 secret share, $sk_1$, thereby obtaining a result (referred to as a partial answer) that is the hashed password raised to the power of the quantity of R times $sk_1$. The partial hash response will be different for each server since the secret share is different for each server. In some embodiments, each server may send the partial answer back to the client 1005. For instance, server 1012 may send it via message 1002.

For each partial answer received, the client 1005 processes and deblinds the received partial answer, thereby obtaining a hash portion $h_i$, which may be sent back to the respective server. For example, for the partial answer received from server 1002, the client 1005 can remove R by raising the partial answer to the power of the inverse of R, thereby obtaining hash portion $h_1$ (the hash of the password raised to the power of $sk_1$). Each of the servers then stores the respective hash portion it received, with the hash portion being stored based on the user identifier.

In some embodiments, each server may use the secret share it was issued to generate a unique record for the user based on the secret share, the user identifier, and/or the blinded hash, and then store the unique record based on the user identifier.

In some embodiments, each server may send the partial answer back to the client 1005. For instance, server 1012 may send it via message 1002. For each server, the client then deblinds the received partial answer, thereby obtaining a hash portion $h_i$, which may be sent back to the respective server. Each of the servers then store a respective hash portion based on the user identifier.

Thus, for a particular user identifier, an authentication server will have a blinded hash of the password received during the registration process, a secret share, and a hash portion received during the registration process.

Following registration, a client may request for a token during the sign-on process.

Figure 11:
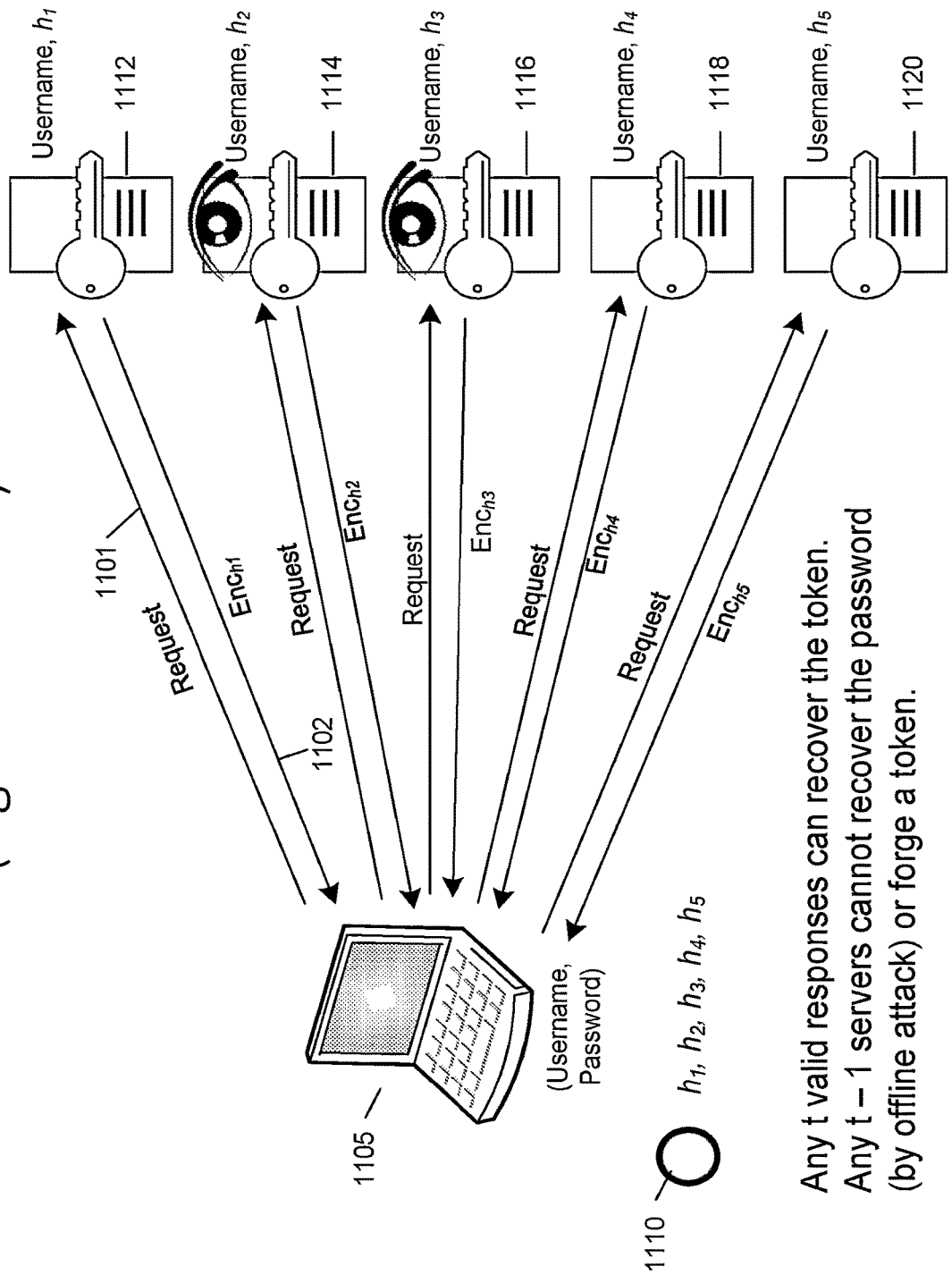
FIG. 11 illustrates a block diagram depicting a request for a token under PASTA, according to embodiments of the present invention.

FIG. 11 shows a request for a token under PASTA, according to embodiments of the present invention.

In a previous registration phase, each of n servers (5 in this example; servers 1112, 1114, 1116, 1118, and 1120), may have received and stored a secret share ($sk_i$) and a hash portion ($h_i$) that corresponds with a user identifier (e.g., username) from the registration phase. This may have been stored in a unique record associated with the user.

During the sign-on process, client 1105 may request a user identifier (e.g., username) and a password credential from the user attempting to access a protected resource. This password credential should be the same as the one used during the registration process. The client 1105 may generate a blinded hash of this password credential supplied by the user.

Client 1105 may then send a token request message 1101 to each of the multiple servers (there are five shown in the figure, including servers 1112, 1114, 1116, 1118, and 1120). Each request 1101 may include the blinded hash of the password, data x to be signed (e.g., the username, timestamp, validity period, and access policy), and username if not included in x. Each server may use the username to identify the hash portion, $h_i$, and secret share corresponding to the username that the server was issued during the registration process.

The server may generate a token share using the data x to be signed and the secret share. This token share can be encrypted using the stored hash portion, $h_i$, tied to the username that was received during the registration process. At the same time, the server may also compute a partial answer (e.g., partial hash response) using the server's secret share tied to the username and the blinded hash provided in the token request message 1101, using the same algorithm as was used in the registration phase. For example, if during the registration process, the blinded hash was raised to the power of the server's secret share, the partial answer will again be computed by raising the blinded hash provided in the token request message 1101 by the server's secret share.

Each server may then send a message 1102 back to the client 1105 that can include the partial answer and the encrypted token share that corresponding server has generated. Only a threshold number of responses are required, and thus responses are not needed for every server for which registration occurred.

The client 1105 can then generate the corresponding hash portion, $h_i$, for each server by deblinding the received partial answer. The blinding/deblinding process used in the registration phase can be different from the blinding/deblinding used in this request phase, as each deblinding would provide the hash portion. The hash portion obtained should be the same as the corresponding hash portion from the registration process if the passwords are the same. In other words, if the user used the right password in the request message, then client 1105 would be able to reconstruct all of the hash portions corresponding to all the servers (e.g., $h_1$, $h_2$, $h_3$, $h_4$, $h_5$). These hash portions can be used to decrypt all the corresponding encrypted token shares received from the servers (e.g., if a server used it's stored copy of $h_i$ to encrypt a token share, then the client can decrypt it using the reconstructed $h_i$ from the partial answer received in the same message as the encrypted token share). With all the token shares decrypted, the client 1105 may be able to combine them to generate token 1110, which can then be used to obtain access to a protected resource.

In this manner, the servers do not actually learn the hash of the password, as they only get the blinded hash. Furthermore, each server could even receive a different blinded hash. And, the blinded hash may change each time the client makes a request. And, each server stores a different hash portion, i.e., result of secret share and hash. Thus, even if an attacker compromises a server, they cannot perform a dictionary attack anymore because the secret is shared among the servers and not one of them knows the actual key. If for instance, as shown in the figure, servers 1114 and 1116 have been compromised, the attacker would only be able to obtain two partial answers (e.g., associated with hash portions $h_2$ and $h_3$) and only decrypt two of the five total token shares. All five servers 1112, 1114, 1116, 1118, and 1120 would need to compromised in order to produce the token 1110 or obtain the password through a dictionary attack.

V. Performance Evaluation

While FIGS. 9-11 depict some commonalities among schemes based on PASTA, one source of deviation may be the threshold token generation (TTG) scheme used. Various implementations for password-based token generation may exist, based on MACs or digital signatures. Four different examples of authentication schemes (based on different threshold token generation schemes) that adhere to PASTA are contemplated and reviewed herein, which include: (1) symmetric-key threshold MACs; (2) public-key threshold MACs; (3) threshold pairing-based signature; and (4) threshold RSA-based signature.

A. Implementation Details

Implementing PASTA for each of these four TTG schemes and observing the results reveals that each type of token may have its own advantages and disadvantages with regards to performance. This testing was performed using pseudorandom functions (PRFs) from AES-NI and hash functions from Blake2[2]; the elliptic curve operations, pairing operations, and RSA operations from the Relic library[12]. The key length in AES-NI is 128 bits. The cyclic group used in TOP and public-key based MAC is the group G_1 on 256-bit Barreto-Naehrig curves (BN-curves)[13]. Pairing is implemented on 256-bit BN-curves. The key length in RSA based signature is 2048 bits.

In order to evaluate the performance of these four schemes, experiments were run on a single server with 2×24-core 2.2 GHz CPUs and 64 GB of RAM. The parties were run on different cores of the same server, and network connections were simulated using the Linux tc command: a LAN setting with 10 Gbps network bandwidth and 0.1 ms round-trip latency; a WAN setting with 40 Mbps network bandwidth and a simulated 80 ms round-trip latency.

B. Token Generation Time

The following table (Table 1) illustrates the total runtime for a client to generate a single token in the sign-on phase after registration under PASTA. Results are shown for various types of tokens in the LAN and WAN settings and different values of (n, t) where n is the number of servers and t is the threshold. The reported time is an average of 10,000 token requests.

TABLE 1

The total runtime (in milliseconds) under PASTA for generating a single token for the number of servers n and threshold t in LAN and WAN settings.

|  | (n, t) | Sym-MAC | Public-MAC | Pairing-Sig | RSA-Sig |
|---|---|---|---|---|---|
| *LAN | (2, 2) | 1.3 | 1.7 | 1.7 | 14.5 |
|  | (3, 2) | 1.3 | 1.7 | 1.7 | 14.5 |
|  | (6, 2) | 1.3 | 1.7 | 1.7 | 14.5 |
|  | (10, 2) | 1.3 | 1.7 | 1.7 | 14.5 |
|  | (10, 3) | 1.6 | 2.1 | 2.1 | 15.1 |
|  | (10, 5) | 2.3 | 3.0 | 3.0 | 16.8 |
|  | (10, 7) | 3.0 | 3.9 | 3.9 | 19.1 |
|  | (10, 10) | 4.1 | 5.4 | 5.4 | 22.6 |
| *WAN | (2, 2) | 81.4 | 81.8 | 81.8 | 94.6 |
|  | (3, 2) | 81.4 | 81.8 | 81.8 | 94.6 |
|  | (6, 2) | 81.4 | 81.8 | 81.8 | 94.6 |
|  | (10, 2) | 81.4 | 81.9 | 81.9 | 94.6 |
|  | (10, 3) | 81.7 | 82.2 | 82.2 | 95.0 |
|  | (10, 5) | 82.4 | 83.1 | 83.1 | 96.9 |
|  | (10, 7) | 83.1 | 83.9 | 83.9 | 99.2 |
|  | (10, 10) | 84.2 | 85.4 | 85.4 | 102.8 |

Notice that for the same threshold t=2 and the same type of token, different values of n result in similar runtime. This is because for a threshold t, the client only needs to communicate with t servers, and the communication and computation cost for every server is the same, hence the total runtime should also be the same. Therefore, the total runtime is independent of n and only depends on the threshold t. For other values of threshold t, the runtime is reported only for n=10, but the runtime for other values of n would be roughly the same.

Also notice that for the same (n, t) and same type of token, the runtime in the WAN setting is roughly the runtime in the LAN setting plus 80 ms round-trip latency. This is because under PASTA, the client sends a request to t servers and receives their responses in parallel. The communication complexity is very small, hence the bulk of communication overhead is roughly the round-trip latency. It is worth noting that PASTA involves a minimal two rounds of interaction, and hence this overhead is inevitable in the WAN setting.

The runtime of public-key based MAC and pairing based signature are almost the same under the same setting. This is because schemes for public-key based MAC and pairing-based signature are both implemented on the 256-bit Barreto-Naehrig curves (BN-curves) [13] in group $\mathbb{G}_1$. This group supports Type-3 pairing operation and is believed to satisfy the Decisional Diffie-Hellman (DDH) assumption, hence a good fit for both primitives.

Finally, the table does not report the runtime for user registration because: (i) it is done only once for every user; and (ii) it is more efficient than obtaining a token.

C. Time Breakdown

The following table (Table 2) illustrates the runtime breakdown for three different (n, t) values in the LAN setting. For each value of (n, t) in the table, the first row is the total runtime, and the second and third rows are the computation time on the client side and on a single server, respectively.

TABLE 2

Runtime breakdown (in milliseconds) in the LAN setting.

|  | Sym-MAC | Public-MAC | Pairing-Sig | RSA-Sig |
|---|---|---|---|---|
| (10, 2) | 1.3 | 1.7 | 1.7 | 14.5 |
| Client | 1.0 | 1.2 | 1.2 | 2.8 |

TABLE 2-continued

Runtime breakdown (in milliseconds) in the LAN setting.

|  | Sym-MAC | Public-MAC | Pairing-Sig | RSA-Sig |
|---|---|---|---|---|
| Server | 0.2 | 0.4 | 0.4 | 11.4 |
| (10, 5) | 2.3 | 3.0 | 3.0 | 16.8 |
| Client | 1.9 | 2.4 | 2.4 | 5.2 |
| Server | 0.2 | 0.4 | 0.4 | 11.4 |
| (10, 10) | 4.1 | 5.4 | 5.4 | 22.6 |
| Client | 3.7 | 4.6 | 4.6 | 10.7 |
| Server | 0.2 | 0.4 | 0.4 | 11.5 |

As shown in the table, for the same token type, the computation time on a single server does not vary. On the other hand, the computation on the client grows with the threshold.

Figure 12:
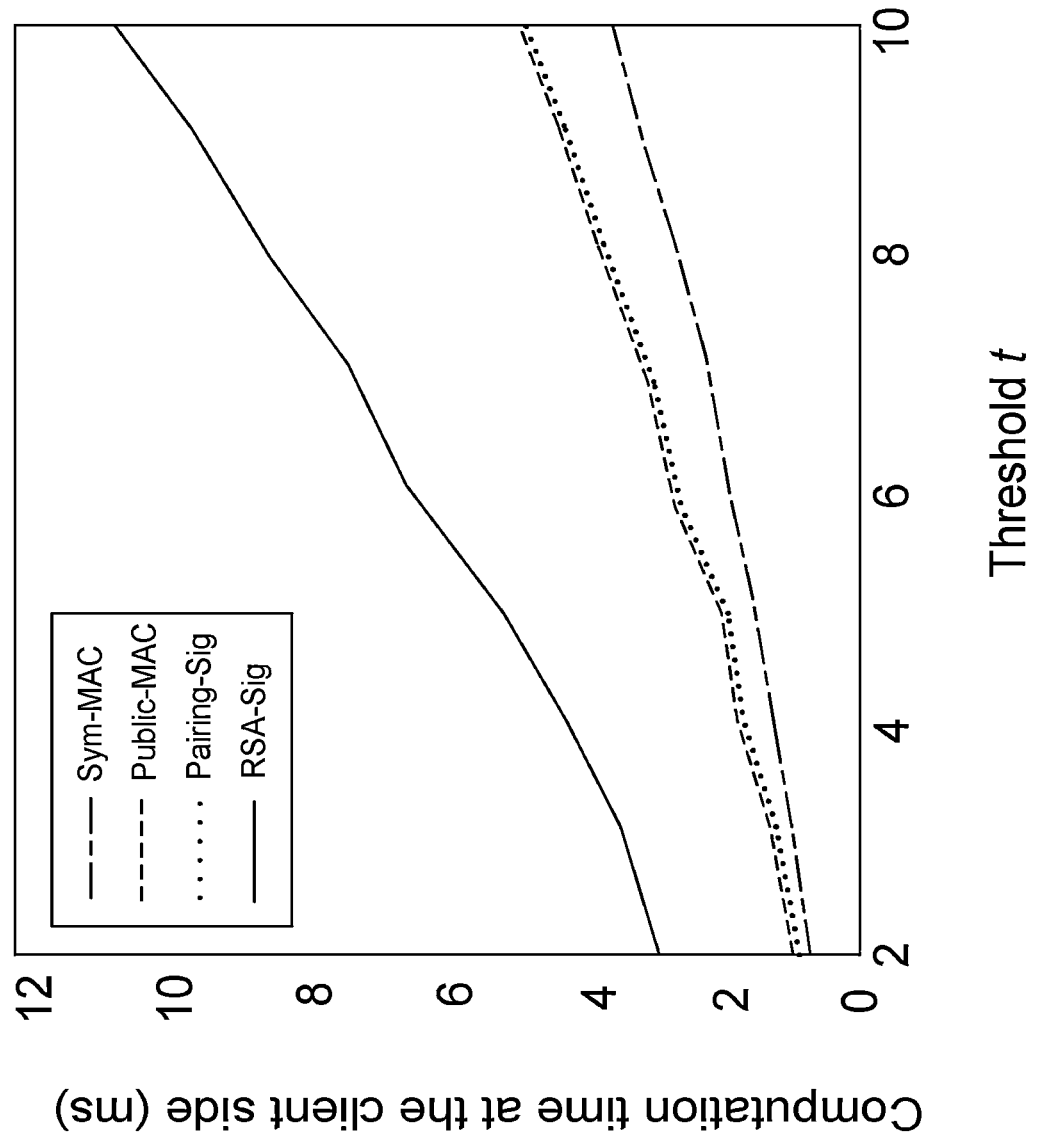
FIG. 12 illustrates a line graph demonstrating the dependence of the computation time at the client side on the threshold tin PASTA-based schemes.

FIG. 12 illustrates a line graph demonstrating this dependence of the computation time at the client side on the threshold t in PASTA-based schemes. In particular, for all four types of tokens, it can be seen that the computation time grows linearly in the threshold t.

D. Comparison with Naïve Solutions

The performance of these various PASTA-based schemes may also be compared to other token-based authentication schemes that do not adhere to PASTA (referred to as naïve solutions). Two naïve solutions are chosen, a plain solution and a threshold solution. Under the plain solution, the client authenticates to a single server with its username/password. The server verifies its credential and then issues an authentication token using a master secret key. Under the threshold solution, a threshold authentication scheme is utilized. The secret key shares $sk_1$, $sk_2$, . . . , $sk_n$ of the threshold authentication scheme are distributed among the n servers. The client authenticates with its username/password to t servers, where each server verifies its credential and then issues a share of the token. The client combines the shares received from the servers to generate the final token.

In the plain solution, a breached server would enable the attacker to: (i) recover the master secret key; and (ii) perform offline dictionary attacks to recover users' passwords. PASTA-based schemes, when compared to the plain solution, present the extra cost of protecting both the master secret key and users' passwords. In the threshold solution, if up to t–1 servers are breached, then the master secret key stays secure, but users' passwords are vulnerable to offline dictionary attacks. PASTA-based schemes, when compared to the threshold solution, present the extra cost of protecting users' passwords.

The following table (table 3) shows the total runtime for a client to generate a single token after registration using the plain solution and the threshold solution for different values of (n, t). The reported time is an average of 10,000 token requests in LAN and WAN settings. For the same setting and the same type of token, the runtime in the WAN network is roughly the runtime in the LAN network plus 80 ms round-trip latency, for the same reason discussed above for the PASTA protocol.

TABLE 3

The total runtime (in milliseconds) in generating a single token using naïve solutions for different settings in LAN and WAN networks.

| | | (n, t) | Sym-MAC | Public-MAC | Pairing-Sig | RSA-Sig |
|---|---|---|---|---|---|---|
| *LAN | Plain | | 0.1 | 0.4 | 0.4 | 11.3 |
| | 5*Threshold | (10, 2) | 0.1 | 0.6 | 0.6 | 13.2 |
| | | (10, 3) | 0.1 | 0.6 | 0.6 | 13.3 |
| | | (10, 5) | 0.2 | 0.9 | 0.9 | 14.4 |
| | | (10, 7) | 0.3 | 1.2 | 1.2 | 16.0 |
| | | (10, 10) | 0.4 | 1.5 | 1.5 | 18.6 |
| *WAN | Plain | | 80.2 | 80.5 | 80.5 | 91.4 |
| | 5*Threshold | (10, 2) | 80.2 | 80.7 | 80.7 | 93.3 |
| | | (10, 3) | 80.2 | 80.7 | 80.7 | 93.4 |
| | | (10, 5) | 80.3 | 81.0 | 81.0 | 94.5 |
| | | (10, 7) | 80.4 | 81.3 | 81.3 | 96.1 |
| | | (10, 10) | 80.5 | 81.6 | 81.6 | 98.8 |

Notice that in the threshold solution, the total runtime is independent of n and only depends on the threshold t. Hence only the runtime for the same n=10 and different thresholds is shown.

Figure 13:
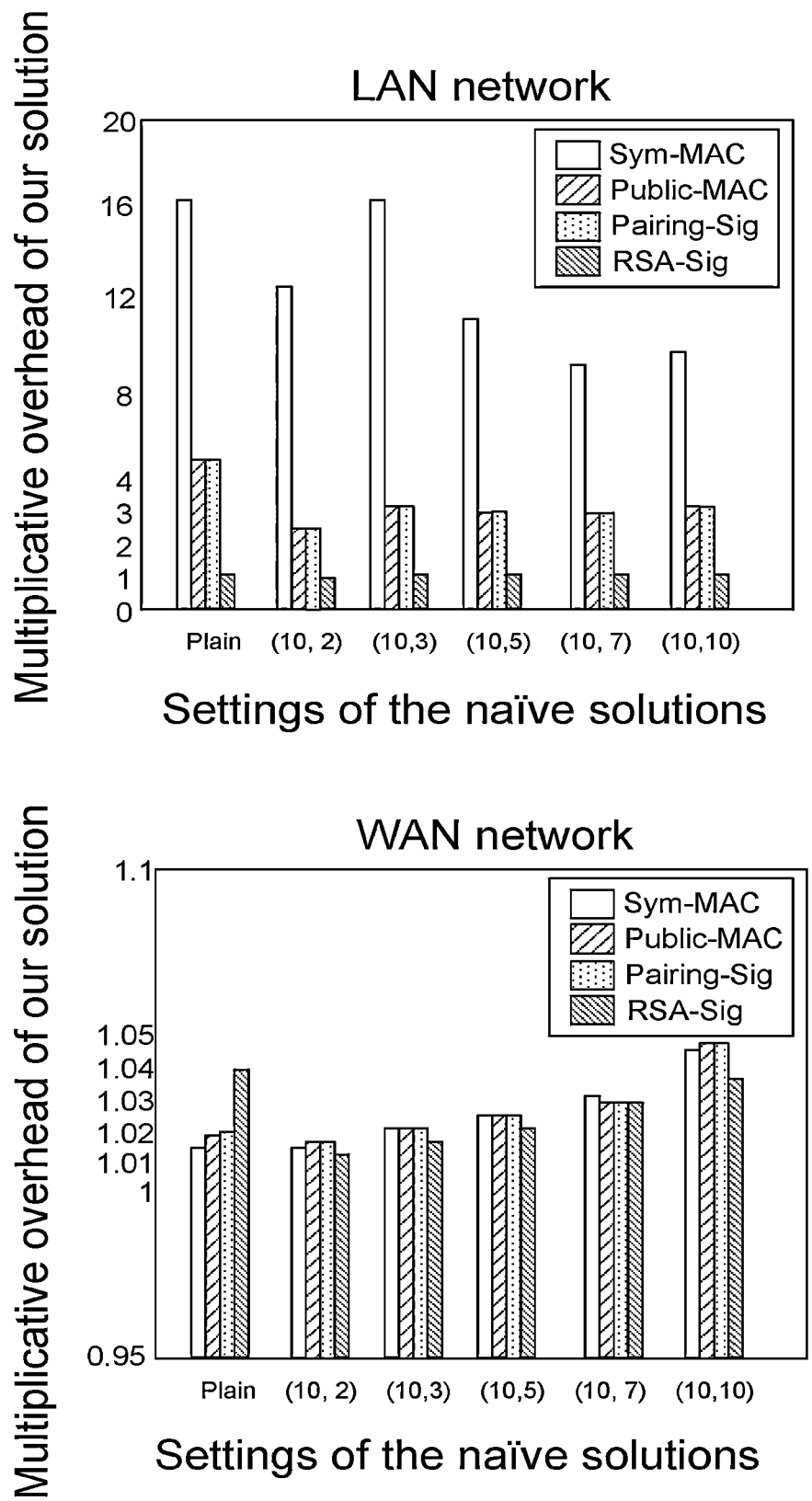
FIG. 13 illustrates bar graphs demonstrating multiplicative overhead of PASTA-based schemes in runtime compared to naïve solutions in LAN and WAN networks.

These results for the two naïve solutions are compared to the results obtained for the four PASTA-based schemes by way of FIG. 13. More specifically, FIG. 13 illustrates bar graphs demonstrating multiplicative overhead of PASTA-based schemes in runtime compared to naïve solutions in LAN and WAN networks.

The two charts represent the comparison in the LAN and WAN network, respectively. In each chart, the first set of four bars represent the overhead of all four PASTA-based schemes compared to the plain solution. Note that there is no notion of (n, t) in the plain solution, hence a setting (5,3) was selected for comparing with the plain solution. If comparing the plain solution with other (n, t) settings, the results would be slightly different. The remaining five sets of bars (each set having four bars) in each figure represent the overhead of all four PASTA-based schemes compared to the threshold solution for various values of (n, t). When comparing with those, the same (n, t) setting was used between the PASTA-based schemes and the theshold solution.

In the LAN network, notice that there is nearly no overhead for the RSA-based token generation. The overhead for public-key based MAC and pairing based signature is a small constant. There is a higher overhead for symmetric-key based MAC. This is because the naïve solutions only involve symmetric-key operations while our solution involves public-key operations, which is much more expensive. This overhead is necessary, since public-key operations are necessary to achieve a PbTA system.

In the WAN network, since the most time-consuming component is the network latency in PASTA-based schemes as well as the naïve solutions, the overhead of all the PASTA-based schemes compared with the naïve solutions is fairly small. In particular, the overhead is less than 5% in all the settings and all token types.

Accordingly, from these results, it can be seen that the overhead of obtaining security against server breaches using PASTA-based schemes, in the sign-on stage, is at most 6% compared to the naïve solution of using hashed passwords and a single-server token generation, in the most likely scenario where clients connect to servers over the internet (e.g., a WAN network). This is primarily due to the fact that, in this case, network latency dominates total running time for all token types.

PASTA-based schemes may have a larger overhead compared to the naïve single-server solution, for symmetric-key based tokens in the LAN setting, since public-key operations dominate PASTA's running time vs. the symmetric-key only operations for the naïve solution. However, the total runtime of sign-on (i.e. password verification+token generation) is still very fast, ranging from 1.3 ms for (n, t)=(3,2) with a symmetric-key MAC token to 22 ms for (n, t)=(10,10) with an RSA-based token, where n is the number of servers and t is the threshold.

Thus, the overhead of protecting secrets and credentials against breaches in PASTA-based schemes, as compared to a naïve single server solution, is extremely low (1-6%) in the most likely setting where client and servers communicate over the internet. The overhead is higher in case of MAC-based tokens over a LAN (though still only a few milliseconds) due to inherent cost of public-key vs. symmetric-key cryptography.

Among these exemplary PASTA-based schemes, the threshold MAC TTG provides a more efficient solution, but the tokens are not publicly verifiable since the verifier needs the secret key for verification. PASTA-based schemes involving threshold RSA and threshold pairing-based token generation are more expensive but are publicly verifiable. Among the signature-based PASTA-based schemes, the pairing-based one is faster since signing does not require pairings, but the RSA-based solution has the advantage of producing standard RSA signatures that are compatible with existing applications.

It is worth noting that there are other alternatives than the two naïve single server solutions presented for comparison purposes. However, even if efficient alternatives exist, such alternatives often fail to match up against the requirements of the PbTA protocol.

For instance, a straightforward composition of a threshold password-authenticated key exchange (T-PAKE) followed by a threshold signature/MAC meets neither the efficiency nor the security requirements for the PbTA protocol. For efficiency, minimal interaction is required; servers need not communicate with each other after a one-time setup procedure, and both the password verification and the token generation can be performed simultaneously in two (optimal) rounds (e.g., (1) the client sends a request message to a subset of the servers, and servers respond with messages of their own; and (2) if the client password is a match, the client can combine server responses to obtain a valid token or otherwise the client does not learn anything). In contrast, the most efficient T-PAKE schemes require at least three rounds of interaction between the client and servers, as well as additional communication among the servers (which could further increase when combined with threshold token generation). For security, it is unclear how to make such a composition meet the PbTA requirements of unforgeability and password-safety.

As another example of an unviable alternative, password-base secret sharing (PBSS) considers the related problem of sharing a secret among multiple servers where t servers can reconstruct the secret if client's password verifies. However, this does not keep the secret distributed at all times for use in a threshold authentication scheme. Moreover, PBSS is commonly studied in a single client setting where each client has its own unique secret, and the multi-client setting and the common master-key used for all clients introduces additional technical challenges.

In comparison to these alternatives, PASTA-based schemes will naturally meet the stringent PbTA requirements of unforgeability and password-safety. Furthermore, PASTA-based schemes serve as a secure two-party key agreement protocol that can be constructed based on black-box use of one-way functions. These key benefits of PASTA-based authentication schemes may be proven.

VI. Proofs

A. TOPRF—Unpredictability

Suppose there exists a PPT adversary Adv such that:

$$Pr[\text{Unpredictability}_{TOP,Adv}(1^\kappa, n, t) = 1] \geq$$

$$\frac{\text{MAX}_{|\mathcal{U}|,t}(q_1, \ldots, q_n)}{|\mathcal{X}|} + non-negl(\kappa).$$

Consider two cases of Adv. In the first case, there exists $k \in \mathbb{N}$ such that when Adv calls $\mathcal{H}_1$ with k distinct valid (x, y) pairs, $\text{MAX}_{|\mathcal{U}|,t}(g_1, \ldots, q_n) < k$. In this case, Adv can be used to break the gap TOMDH assumption. In the second case, for any $k \in \mathbb{N}$, when Adv calls $\mathcal{H}_1$ with k valid (x, y) pairs, $\text{MAX}_{|\mathcal{U}|,t}(q_1, \ldots, q_n) \geq k$. In this case, it can be proven information theoretically the above formula associated with the PPT adversary Adv does not hold.

On closer examination of the first case, an adversary B may be constructed that breaks the gap TOMDH assumption (e.g., such that there does not exist a negligible function negl s.t. One-More$_{Adv}(1^\kappa, t', t, n, N)$ outputs 1 with probability at most negl($\kappa$)). It first receives (p, g, $\mathbb{G}$, $g_1, \ldots, g_N$) from the TOMDH game, One—More$_B(1^\kappa, t', t, n, N)$, presents pp:=(p, g, $\mathbb{G}$, n, t, $\mathcal{H}_1, \mathcal{H}_1$) to Adv and gets back $\mathcal{U}$. It then generates $\{\alpha_i\}_{i \in \mathcal{U}}$ at random, sends $\{(i, \alpha_i)\}_{i \in \mathcal{U}}$ to the TOMDH game, and sends $\{a_i\}_{i \in} \mathcal{U}$ to Adv. It then samples $\tilde{x} \leftarrow_\$ \chi$, set $\mathcal{L} := [\ ]$, set LIST:=$\emptyset$, and set k:=0. This TOMDH game is defined in FIG. 4.

Then $\mathcal{B}$ computes $g_1^{\alpha_i}$ for $i \in \mathcal{U}$, calls $\mathcal{O}(i, g_1)$ to get $g_1^{\alpha_i}$ for all $i \in [n] \setminus \mathcal{U}$, and computes $y_1 := g_1^{sk}$. It adds $(g_1, y_1)$ to LIST, sets q=1, and handles Adv's oracle queries as follows:

On Adv's call to $\mathcal{O}_{enc\&eval}(\ )$: Pick an unused $g_j$ where $j \in [N]$, set $c := g_j$, compute $z_i \leftarrow \text{Eval}(sk_i, c)$ for $i \in \mathcal{U}$ and call $\mathcal{O}(i, c)$ to get $z_i$ for all $i \in [n] \setminus \mathcal{U}$. Use [n] to find coefficients $\{\lambda_i\}_{i \in [n]}$ and compute $y_j := \Pi_{i \in [n]} z_i^{\lambda_i}$. Add $(g_j, y_j)$ to LIST, and increment q by 1. Compute h:= $\mathcal{H}_1(\tilde{x}, y_j)$, and return $(c, \{z_i\}_{i \in [n] \setminus \mathcal{U}} h)$ to Adv.

On Adv's call to $\mathcal{O}_{eval}(i, c)$: Call $\mathcal{O}(i, c)$ in the TOMDH game and return the output to Adv.

On Adv's call to $\mathcal{H}_1(x, y)$: If $x \notin \mathcal{L}$, compute $\mathcal{H}_1(x, y)$ honestly and return to Adv. Otherwise, let $g_j := \mathcal{L}[x]$. If $\log_{g_1} y = \log_{g_1} y_1$ and $(g_j, \hat{a}) \notin \text{LIST}$ (i.e., $(g_j, y)$ is a new valid pair), increment k by 1, add$(g_j, y)$ to LIST, and output LIST in the TOMDH game if $\text{MAX}_{|\mathcal{U}|,t}(g_1, \ldots, q_n) < k$. Compute $\mathcal{H}_1(x, y)$ honestly and return to Adv.

On Adv's call to $\mathcal{H}_2(x)$: If $x \in \mathcal{L}$, return $\mathcal{L}[x]$; otherwise, pick an unused $g_j$ where $j \in [N]$, set $\mathcal{L}[x] := g_j$ and return $g_j$ to Adv.

Adv's view in the game Unpredictability$_{TOP,Adv}(1^\kappa, n, t)$ is information theoretically indistinguishable from the view simulated by B in the random oracle model. This can be proved via a hybrid argument:

Hyb$_0$: The first hybrid is Adv's view in the real-world game Unpredictability$_{TOP,Adv}(1^\kappa, n, t)$.

Hyb$_1$: This hybrid is the same as Hyb$_0$ except that in the response to $\mathcal{O}_{enc\&eval}(\ )$, c is randomly sampled as $c \leftarrow_\$ \mathbb{G}$. This hybrid is information theoretically indistinguishable from Hyb$_0$ because $\mathbb{G}$ is a cyclic group of prime order.

Hyb$_2$: This hybrid is the same as Hyb$_1$ except that the output of $\mathcal{H}_2(\cdot)$ is a truly random group element in $\mathbb{G}$. The indistinguishability of Hyb$_1$ and Hyb$_2$ follows from the random oracle model.

Hyb$_3$: This hybrid is Adv's view simulated by $\mathcal{B}$. It is the same as Hyb$_2$ except that the random group elements are replaced by $g_j$'s where $j \in [N]$. Since $g_j$'s are also randomly sampled from $\mathbb{G}$ in the TOMDH game, the two hybrids are indistinguishable.

From the construction of B, it is known that $\text{MAX}_{t',t}(q'_1, \ldots, q'_n) = \text{MAX}_{|\mathcal{U}|,t}(q_1, \ldots, q_n) + q$, where $\text{MAX}_{t',t}(q'_1, \ldots, q'_n)$ is from the TOMDH game, and $\text{MAX}_{|\mathcal{U}|,t}(q_1, \ldots, q_n)$ is from the unpredictability game. Since $\text{MAX}_{|\mathcal{U}|,t}(q_1, \ldots, q_n) < k$, the output of $\mathcal{B}$ has the following number of valid pairs:

|LIST|=$k+q$ $> \text{MAX}_{|\mathcal{U}|,t}(q_1, \ldots, q_n) + q$ $= \text{MAX}_{t',t}(q_1, \ldots, q_n)$.

Therefore, $\mathcal{B}$ breaks the gap TOMDH assumption.

In the second case, for any $k \in \mathbb{N}$, when Adv calls $\mathcal{H}_1$ with k valid (x, y) pairs, $\text{MAX}_{|\mathcal{U}|,t}(q_1, \ldots, q_n) \geq k$. For any PPT adversary Adv, there exists a negligible function negl s.t.

$$Pr[\text{Predicting}_{Adv}(1^\kappa) = 1] \leq \frac{k}{|\mathcal{X}|} + negl(\kappa).$$

Predicting$_{Adv}(1^\kappa)$ and a predicting game are formally defined below.

---

Predicting$_{Adv}(1^\kappa)$:
1. for every $x \in X$: $h \leftarrow_\$ \{0,1\}^\kappa, \mathcal{M}[x] := h$
2. $\tilde{x} \leftarrow_\$ X$, $\tilde{h} := \mathcal{M}[\tilde{x}]$
3. k:= 0
4. h3 $\leftarrow$ Adv$^{(\mathcal{O})}(1^\kappa)$
5. output 1 iff $h^{\hat{a}} = \tilde{h}$ $\mathcal{O}$ compute (x):
• increment k by 1

-continued

- return $\mathcal{M}$ [x]
$\mathcal{O}$ compare(h):
- return 1 if h = h̃; else return 0

An adversary $\mathcal{B}$ may be constructed that breaks the predicting game. The construction of $\mathcal{B}$ is the following. It first runs Setup($1^\kappa$, n, t) to generate (sk, pp), presents pp to Adv and gets back $\mathcal{U}$. It then gives $\{sk_i\}_{i\in \mathcal{U}}$ to Adv. It sets $\mathcal{L} :=[\ ]$, and then handles Adv's oracle queries as follows:

On Adv's call to $\mathcal{O}_{enc\&eval}(\ )$: Sample $c \leftarrow_\$ \mathbb{G}$, compute $z_i \leftarrow \text{Eval}(sk_i, c)$ for $i \in [n]$, and return (c, $\{z_i\}_{i\in [n]\setminus \mathcal{U}}$) to Adv.

On Adv's call to $\mathcal{O}_{eval}(i, c)$: Return Eval($sk_i$, c).

On Adv's call to $\mathcal{O}_{check}(h)$: Call $\mathcal{O}_{compare}(h)$ and return the output to Adv.

On Adv's call to $\mathcal{H}_1(x, y)$:

If $(x,y) \in \mathcal{L}$, let $h := \mathcal{L}[(x,y)]$.

If $(x, y) \notin \mathcal{L}$ and $y \neq \mathcal{H}_2(x)^{sk}$, then sample $h \leftarrow_\$ \{0,1\}^\kappa$ and set $\mathcal{L}[(x, y)]:=$ If $(x, y) \notin \mathcal{L}$ and $y = \mathcal{H}_2(x)^{sk}$ (i.e., (x, y) is a valid pair), call $\mathcal{O}_{compute}(x)$ to get h. Set $\mathcal{L}[(x, y)]:=h$.

Return h to Adv.

On Adv's call to $\mathcal{H}_2(x)$: Compute $\mathcal{H}_2(x)$ honestly and return the output.

Adv's view in the game Unpredictability$_{TOP,Adv}$($1^\kappa$, n, t) is information theoretically indistinguishable from the view simulated by $\mathcal{B}$ in the random oracle model. This can be proved via a hybrid argument:

Hyb$_0$: The first hybrid is Adv's view in the real-world game Unpredictability$_{TOP,Adv}$($1^\kappa$, n, t).

Hyb$_1$: This hybrid is the same as Hyb$_0$ except that in the response to $\mathcal{O}_{enc\&eval}(\ )$, c is randomly sampled as $c \leftarrow_\$ \mathbb{G}$. This hybrid is information theoretically indistinguishable from Hyb$_0$ because $\mathbb{G}$ is a cyclic group of prime order.

Hyb$_2$: This hybrid is the same as Hyb$_1$ except that the output of $\mathcal{H}_1(\cdot)$ is a truly random string. The indistinguishability of Hyb$_1$ and Hyb$_2$ follows from the random oracle model.

Hyb$_3$: This hybrid is Adv's view simulated by $\mathcal{B}$. It is the same as Hyb$_2$ except that x̃ is not sampled in the game, but sampled in the predicting game Predicting$_{\mathcal{B}}$($1^\kappa$), and that $\mathcal{H}_1(x, y)$ for valid (x, y) pairs are sampled in predicting game. Since these values are randomly sampled in both hybrids, they are indistinguishable.

Therefore, if Adv breaks the game Unpredictability$_{TOP,Adv}$($1^\kappa$, n, t), then $\mathcal{B}$ breaks the predicting game:

$$Pr[\text{Predicting}_{\mathcal{B}}(1^\kappa) = 1] \geq$$

$$\frac{\text{MAX}_{|\mathcal{U}|,t}(q_1,\ldots,q_n)}{|\mathcal{X}|} + non - negl(\kappa) \geq \frac{k}{|\mathcal{X}|} + non - negl(\kappa).$$

This is information theoretically impossible, leading to a contradiction, and hence concludes the proof.

B. TOPRF—Input Obliviousness

In this section, the input obliviousness of a TOPRF is proven. Suppose there exists a PPT adversary Adv such that $$Pr[\text{Obliviousness}_{TOP,Adv}(1^\kappa, n, t) = 1] \geq$$

$$\frac{\text{MAX}_{|\mathcal{U}|,t}(q_1,\ldots,q_n)+1}{|\mathcal{X}|} + non - negl(\kappa).$$

Consider the following two cases of Adv. In the first case there exists $k \in \mathbb{N}$ such that when Adv calls $\mathcal{H}_1$ with k distinct valid (x, y) pairs, $\text{MAX}_{|\mathcal{U}|,t}(q_1,\ldots,q_n) < k$. In this case, Adv can be used to break the gap TOMDH assumption. In the second case, for any $k \in \mathbb{N}$, when Adv calls $\mathcal{H}_1$ with k valid (x, y) pairs, $\text{MAX}_{|\mathcal{U}|,t}(q_1,\ldots,q_n) \geq k$. In this case, it can be proven that information theoretically, the above formula does not hold.

Turning to the first case, there exists $k \in \mathbb{N}$ such that when Adv calls $\mathcal{H}_1$ with k distinct valid (x, y) pairs, $\text{MAX}_{|\mathcal{U}|,t}(q_1,\ldots,q_n) < k$. An adversary $\mathcal{B}$ may be constructed that breaks the gap TOMDH assumption (e.g., such that there does not exist a negligible function negl s.t. One-More$_{Adv}$($1^\kappa$, t',t,n, N) outputs 1 with probability at most negl($\kappa$)). The proof is identical to the first case for unpredictability).

In the second case, whenever Adv calls $\mathcal{H}_1$ with a valid (x, y) pair for the k-th time, $\text{MAX}_{|\mathcal{U}|,t}(q_1,\ldots,q_n) \geq k$ at that time. For any PPT adversary Adv, there exists a negligible function negl s.t.

$$Pr[\text{Guessing}_{Adv}(1^\kappa) = 1] \leq \frac{k+1}{|\mathcal{X}|} + negl(\kappa).$$

Guessing$_{Adv}$($1^\kappa$) and a guessing game are formally defined below.

Guessing$_{Adv}$($1^\kappa$):
1. x̃ $\leftarrow_\$$ X
2. k: = 0
3. $x^{\tilde{a}} \leftarrow \text{Adv}^{(\mathcal{O})}(1^\kappa)$
4. output 1 iff $x^{\tilde{a}} = \tilde{x}$ $\mathcal{O}_{guess}(x)$:
- increment k by 1
- return 1 if x = x̃; else return 0

An adversary $\mathcal{B}$ may be constructed that breaks the guessing game. The construction of $\mathcal{B}$ is the following. It first runs Setup($1^\kappa$, n, t) to generate (sk, pp), presents pp to Adv and gets back to $\mathcal{U}$. It then gives $\{sk_i\}_{i \in \mathcal{U}}$ to Adv. It samples $h \leftarrow_\$ \{0,1\}^\kappa$, set $\mathcal{L} :=[\ ]$, and then handles Adv's oracle queries as follows:

On Adv's call to $\mathcal{O}_{enc\&eval}(\ )$: Sample $c \leftarrow_\$ \mathbb{G}$ compute $z_i \leftarrow \text{Eval}(sk_i, c)$ for $i \in [n]$, and return (c, $\{z_i\}_{i\in[n]\setminus \mathcal{U}}$) to Adv.

On Adv's call to $\mathcal{O}_{eval}(i, C)$: Return Eval($sk_i$, c).

On Adv's call to $\mathcal{H}_1(x, y)$:

If $(x, y) \in \mathcal{L}$, let $h := \mathcal{L}[(x, y)]$.

If $(x, y) \notin \mathcal{L}$ and $y \neq \mathcal{H}_2(x)^{sk}$, then sample $h \leftarrow_\$ \{0,1\}^\kappa$ and set $\mathcal{L}[(x, y)]:=h$.

If $(x, y) \notin \mathcal{L}$ and $y = \mathcal{H}_2(x)^{sk}$ (i.e. (x, y) is a valid pair), call $\mathcal{O}_{guess}(x)$. If the output if 1, then h:=h̃; otherwise sample $h \leftarrow_\$ \{0,1\}^\kappa$. Set $\mathcal{L}[(x, y)]:=h$.

Return h to Adv.

On Adv's call to $\mathcal{H}_2(x)$: Compute $\mathcal{H}_2(x)$ honestly and return the output.

Adv's view in the game Obliviousness$_{TOP,Adv}$($1^\kappa$, n, t) is information theoretically indistinguishable from the view simulated by $\mathcal{B}$ in the random oracle model. This can be proved via a hybrid argument:

Hyb$_0$: The first hybrid is Adv's view in the real-world game Obliviousness$_{Top,Adv}$($1^\kappa$, n, t).

Hyb$_1$: This hybrid is the same as Hyb$_0$ except that in the response to $\mathcal{O}_{enc\&eval}$( ), c is randomly sampled as c $\leftarrow_\$ \mathbb{G}$. This hybrid is information theoretically indistinguishable from Hyb$_0$ because $\mathbb{G}$ is a cyclic group of prime order.

Hyb$_2$: This hybrid is the same as Hyb$_1$ except that the output of $\mathcal{H}_1(\cdot)$ is a truly random string. The indistinguishability of Hyb$_1$ and Hyb$_2$ follows from the random oracle model.

Hyb$_3$: This hybrid is Adv's view simulated by $\mathcal{B}$. It is the same as Hyb$_2$ except that x̃ is not sampled in the game, but sampled in the guessing game Guessing$_B$($1^\kappa$). Since x̃ is randomly sampled as x̃ $\leftarrow_\$ \chi$ in both hybrids, they are indistinguishable.

Therefore, if Adv breaks the game Obliviousness$_{TOP,Adv}$ ($1^\kappa$, n, t), then $\mathcal{B}$ breaks the guessing game:

$$Pr[\text{Guessing}_{\mathcal{B}}(1^\kappa) = 1] \geq$$

$$\frac{\text{MAX}_{|\mathcal{U}|,t}(q_1, \ldots, q_n) + 1}{|\mathcal{X}|} + non - negl(\kappa) \geq \frac{k+1}{|\mathcal{X}|} + non - negl(\kappa).$$

This is information theoretically impossible, leading to a contradiction, and hence concludes the proof.

C. PASTA—Password Safety

The password safety of PASTA primarily relies on the obliviousness of TOP. Intuitively, if a TOPRF is used on clients' passwords, then the obliviousness of TOPRF would make it hard to guess the passwords. However, there are several different ways a PbTA scheme can be attacked. For example, the randomness used for encoding passwords could be leaked in some manner (compromising the security of TOPRF). An adversary, Adv, could replay messages between clients and servers, send false requests to servers, provide false responses to clients, etc. It could also exploit a loophole in the threshold authentication scheme to attack the TOPRF.

An adversary $\mathcal{B}$ can be constructed that can translate an adversary Adv's advantage in the password-safety game into a similar advantage in the TOPRF obliviousness game Obliviousness (FIG. 6). $\mathcal{B}$ will run Adv internally simulating the password-safety for it, while playing the role of adversary externally in Obliviousness.

$\mathcal{B}$ can implicitly set the targeted client $C^{\text{å}}$'s password to be the random value chosen in Obliviousness. If Adv guesses the password, $\mathcal{B}$ can output the same guess. However, to simulate SecGame properly for Adv, $\mathcal{B}$ needs to run the oracles in a way that Adv cannot tell the difference. In particular, $\mathcal{B}$ needs partial TOPRF evaluations $z_i$ on the password for $\mathcal{O}_{resp}$, the final TOPRF value for $\mathcal{O}_{register}$ and the randomness $\rho$ used for encoding for $\mathcal{O}_{final}$. $\mathcal{B}$ can take help of the oracles $\mathcal{O}_{eval}$ and $\mathcal{O}_{enc\&eval}$ provided by Obliviousness to handle the first two problems, but there is no way to get $\rho$ in Obliviousness.

This problem can be addressed using an intermediate hybrid. The oracles of the security game in FIG. 7 can be modified. The original game is referred to as Hyb$_0$ and the new game as Hyb$_1$. Hyb$_0$ basically replaces $\Pi$ in FIG. 7 with PASTA.

Hyb$_0$: SecGame for PASTA is shown below:

SecGame$_{PASTA,Adv}$($1^\kappa$, n, t, P):
- (tsk, tvk, tpp) ← TTG.Setup($1^\kappa$, n, t)
- set sk$_i$: = tsk$_i$ for all i ∈ [n], vk: = tvk and pp : = ($\kappa$, n, t, P, tpp)
- ($\mathcal{U}$, $C^{\text{å}}$, st$_{adv}$) ← Adv(pp)
- V, PwdList, TokList: = Ø, ReqList$_{C,i}$: = Ø for i ∈ [n]
- ct: = 0, LiveSessions = [ ]
- $Q_{C,i}$, $Q_{C,x}$: = 0 for all C, i ∈ [n] and x
- out ← Adv$^{(\mathcal{O})}$({sk$_i$}$_{i \in U}$,{SK$_i$}$_{i \in U}$, st$_{adv}$)

$\mathcal{O}_{corrupt}$(C).
- $\mathcal{V}$: = $\mathcal{V}$ ∪ {C}
- if (C, å) ∈ PwdList, return PwdList[C]

$\mathcal{O}_{register}$(C).
- require: PwdList[C] =⊥
- pwd ←$_\$$ P
- add (C, pwd) to PwdList
- (k, opp) - TOP.Setup($1^\kappa$, n, t)
- h: = TOP(k, pwd) and h$_i$ = $\mathcal{H}$(h ∥ i) for i ∈ [n]
- rec$_{i,C}$ = (k$_i$, h$_i$) for all i ∈ [n]
- add rec$_{i,C}$ to rec$_i$ for all i ∈ [n]

$\mathcal{O}_{req}$(C, x, $\mathcal{T}$)
- if PwdList[C] =⊥ or |$\mathcal{T}$| < t, output ⊥
- c: = TOP.Encode(PwdList[C],$\rho$) for a random $\rho$
- set req$_i$: = c for i ∈ [n]
- LiveSessions [ct] : = (C, PwdList[C],$\rho$,$\mathcal{T}$ )
- add req$_i$ to ReqList$_{C,i}$ for i ∈ $\mathcal{T}$
- increment ct by 1
- return {req$_i$}$_{i \in \mathcal{T}}$ $\mathcal{O}_{resp}$(i, C, x, req$_i$).
- require: i ∈ [n]\$\mathcal{U}$
- if rec$_{i,C}$ ∉ rec$_i$, return ⊥; else, parse rec$_{i,C}$ as (k$_i$, h$_i$)
- if req$_i$ C ReqList$_{C,i}$, increment $Q_{C,i}$ by 1
- $z_i$ = TOP.Eval(k$_i$, req$_i$)
- $y_i$ ← TTG.PartEval(tsk$_i$, C ∥ x)
- set res$_i$: = ($z_i$, SKE.Encrypt(h$_i$, y$_i$))
- increment $Q_{C,x}$ by 1
- return res$_i$ $\mathcal{O}_{final}$(ct,{res$_i$}$_{i \in S}$)
- st : = LiveSessions[ct]
- parse res$_i$ as (z'$_i$, ctxt'$_i$) and st as (C, pwd, $\rho$, $\mathcal{T}$ ).
- if S ≠ $\mathcal{T}$ , output ⊥
- h': = TOP.Combine(pwd,{(i, z'$_i$) }$_{i \in \mathcal{T}}$, $\rho$)
- for i ∈ $\mathcal{T}$ , h'$_i$: = $\mathcal{H}$(h' ∥ i) and y'$_i$ = SKE.Decrypt(h'$_i$, ctx'$_i$)
- set tk: = TTG.Combine({i, y'$_i$}$_{i \in \mathcal{T}}$)
- add tk to TokList
- return tk $\mathcal{O}_{verify}$ (C, x, tk).
- return TTG.Verify(tvk, C ∥ x, tk)

Hybrid Hyb$_1$: SecGame for PASTA is shown below:

SecGame$_{PASTA,Adv}$($1^\kappa$, n, t, P):
Same as Hyb$_0$, except the following oracles behave differently when C = $C^{\text{å}}$. Below, we describe their behavior for this case only, highlighting the differences in red. When C ≠ $C^{\text{å}}$, they behave in the same way as Hyb$_0$.

$\mathcal{O}_{req}$($C^{\text{å}}$,x,$\mathcal{T}$ )
- if PwdList[$C^{\text{å}}$] = ⊥ or |$\mathcal{T}$ | < t, output ⊥
- c: = TOP.Encode(PwdList[$C^{\text{å}}$], $\rho$) for a random $\rho$
- set req$_i$: = c for i ∈ [n] $z_i$:= TOP.Eval(k$_i$, req$_i$) h: = TOP.Combine(PwdList[$C^{\text{å}}$], {(i, $z_i$)}$_{i \in \mathcal{T}}$, $\rho$) LiveSessions[ct] : = ($C^{\text{å}}$, c, {(i,$z_i$)}$_{i \in \mathcal{T}}$, h)
- add req$_i$ to ReqList$_{C^{\text{å}},i}$ for i ∈ $\mathcal{T}$
- increment ct by 1
- return {req$_i$}$_{i \in \mathcal{T}}$ $\mathcal{O}_{resp}$(i, $C^{\text{å}}$ , x, req$_i$).
- require: i ∈ [n]\$\mathcal{U}$
- if rec$_{i,C^{\text{å}}}$ ∉ rec$_i$, return ⊥; else, parse rec$_{i,C^{\text{å}}}$ as (k$_i$, h$_i$)
- if req$_i$ ∉ ReqList$_{C^{\text{å}},i}$, increment $Q_{C^{\text{å}},i}$ by 1 if (req$_i$ ∉ ReqList$_{C^{\text{å}},i}$):
  - $z_i$ = TOP.Eval(k$_i$, req$_i$)

else:
  - let $z_i$ be the value associated with i in the entry ($C^{\text{å}}$, req$_i$, ..., (i,$z_i$) ... ) in LiveSessions
- $y_i$ ← TTG.PartEval(tsk$_i$, $C^{\text{å}}$ ∥ x)
- set res$_i$: = ($z_i$, SKE. Encrypt(h$_i$, y$_i$))
- increment $Q_{C^{\text{å}},i}$ by 1
- return res$_i$ $\mathcal{O}$ final(ct, $\{res_i\}_{i \in S}$)
- ($C^{\mathring{a}}$, c, $\{(i, z_i)\}_{i \in \mathcal{T}}$, h) : = LiveSessions[ct]
- parse, $res_i$ as ($z'_i$, $ctxt'_i$)
- if $S \neq \mathcal{T}$, output $\perp$ if (TOP.PubCombine($\{z_i\}_{i \in \mathcal{T}}$) $\neq$ TOP.PubCombine($\{z'i\}_{i \in \mathcal{T}}$)):
  - return $\perp$
- for $i \in \mathcal{T}$, $h'_i$: = $\mathcal{H}$(redh || i) and $y'_i$: = SKE.Decrypt($h'_i$, $ctxt'_i$)
- set tk: = TTG.Combine($\{i, y'_i\}_{i \in \mathcal{T}}$)
- add tk to TokList
- return tk In $Hyb_1$, several oracles behave differently for the targeted client $C^{\mathring{a}}$. $\mathcal{O}_{req}$ evaluates the TOPRF in advance for $C^{\mathring{a}}$. It stores the partial evaluations $z_i$ and the final result h in LiveSessions itself. Importantly, it does not store $\rho$. When $\mathcal{O}_{resp}$ is invoked, it checks if $C^{\mathring{a}}$ generated $req_i$ for $S_i$ before ($req_i \in ReqList_{C,i}$). If yes, then $z_i$ is picked up from LiveSessions. Now, whether a $z_i$ computed in advance is used in $\mathcal{O}_{resp}$ or not makes no difference from the point of the adversary because $z_i$ is derived deterministically from $k_i$ and $req_i$.

Oracle $\mathcal{O}_{final}$ also behaves differently for $C^{\mathring{a}}$. First, note that if TOP.PubCombine($\{z_i\}_{i \in \mathcal{T}}$) is equal to TOP.PubCombine($\{z'_i\}_{i \in \mathcal{T}}$), then combining either set will lead to the same value. The only difference in $Hyb_1$ is that h was computed beforehand. Once again, for the same reason as above, this makes no difference.

The crucial step where $Hyb_0$ and $Hyb_1$ differ is when the two outputs of PubCombine do not match. While $Hyb_0$ does not do any test of this kind, $Hyb_1$ simply outputs $\perp$. For these hybrids to be indistinguishable, we need to argue that had the outputs of PubCombine not matched in $Hyb_0$, it would have output $\perp$ as well (at least with a high probability).

Note that the right $z_i$ and h are well-defined for $Hyb_0$; they can be derived from pwd and $\rho$. If one were to do the public combine test in this hybrid and it fails, then $h' \neq h$ with high probability. Therefore, using the collision resistance of $\mathcal{H}$, one can argue that $h'_i \neq h_i$. Now, observe that there must be an honest $S_j$ in $\mathcal{T}$, so $ctxt'_j$ could only have been generated by $S_j$ (recall our authenticated channels assumption). When ciphertext $ctxt'_j$, which was encrypted under $h_j$, is decrypted with $h'_j \neq h_j$, decryption fails with high probability due to the key-binding property of SKE. Thus, $Hyb_0$ returns $\perp$ just like $Hyb_1$.

Since the absence of encoding randomness p would not prevent a successful simulation of $\mathcal{O}_{final}$, there remains the task of exploiting TOPRF obliviousness to hide the targeted client's password. Towards this, adversary $\mathcal{B}$ is formally described below:

$\mathcal{B}$ Adv($1^{\kappa}$, n, t, P)
Same as $Hyb_1$, except the following oracles are simulated differently when $C = C^{\mathring{a}}$. Below, these oracles are describedfor this case only, with the differences highlighted in red. Output whatever Adv does.
$\mathcal{O}$ register ($C^{\mathring{a}}$).
- require: PwdList[$C^{\mathring{a}}$] =$\perp$ add ($C^{\mathring{a}}$, unknown) to PwdList output $\mathcal{U}$, get back $\{k_i\}_{i \in \mathcal{U}}$ query $\mathcal{O}_{enc\&eval}$ to get (c, $\{z_i\}_{i \in [n]}$, h) $h_i = \mathcal{H}$(h || i) for $i \in [n] \setminus \mathcal{U}$, $rec_{i,C^{\mathring{a}}}$ := $(0, h_i)$ for $i \in \mathcal{U}$, $rec_{i,C^{\mathring{a}}} = (k_i, h_i)$
- add $rec_{i,C^{\mathring{a}}}$ to $rec_i$ for all $i \in [n]$ $\mathcal{O}_{req}(C^{\mathring{a}}, x, \mathcal{T})$.
- if PwdList[$C^{\mathring{a}}$] =$\perp$ or $|\mathcal{T}| < t$, output $\perp$ query $\mathcal{O}_{enc\&eval}$ to get (c, $\{z_i\}_{i \in [n]}$, h)
- set $req_i$: = c for $i \in [n]$
- LiveSessions[ct] := (C, c, $\{i, zi\}_{i \in \mathcal{T}}$, h)
- add $req_i$ to Req $List_{C^{\mathring{a}},i}$ for $i \in \mathcal{T}$

- increment ct by 1
- return $\{req_i\}_{i \in \mathcal{T}}$ $\mathcal{O}_{resp}(i, C^{\mathring{a}}, x, req_i)$.
- require: $i \in [n] \setminus \mathcal{U}$
- if $rec_{i,C^{\mathring{a}}} \notin rec_i$, return $\perp$; else, parse $rec_{i,C^{\mathring{a}}}$ as $(k_i, h_i)$
- if $req_i \notin ReqList_{C^{\mathring{a}},i}$ increment $Q_{C^{\mathring{a}},i}$ by 1
- if ($req_i \notin ReqList_{C^{\mathring{a}},i}$):
  - query $\mathcal{O}_{eval}(i, req_i)$ to get $z_i$
- else:
  - let $z_i$ be the value associated with i in the entry ($C^{\mathring{a}}$, $req_i$, ..., (i, $z_i$) ... ) in LiveSessions
- $y_i \leftarrow$ TTG.PartEval($tsk_i$, $C^{\mathring{a}} || x$)
- set $res_i$: = ($z_i$, SKE.Encrypt($h_i$, $y_i$))
- increment $Q_{C^{\mathring{a}},x}$ by 1
- return $res_i$ When $\mathcal{B}$ outputs a message, it should be interpreted as sending the message to the obliviousness game. Here are the differences between $Hyb_1$ and $\mathcal{B}$'s simulation of it. Simulation of $\mathcal{O}_{register}$ differs only for $C = C^{\mathring{a}}$. In $Hyb_1$, a randomly chosen password for $C^{\mathring{a}}$ is used to compute h, while in $\mathcal{B}$'s simulation, $C^{\mathring{a}}$'s password is implicitly set to be the random input $\tilde{x}$ chosen by Obliviousness and $\mathcal{O}_{enc\&eval}$ is called to get h. Clearly, this difference does not affect Adv. There is one other difference though: while all of $k_1, \ldots, k_n$ are known in $Hyb_1$, $\mathcal{B}$ knows $k_i$ for corrupt servers only. As a result, $\mathcal{B}$ defines $rec_{i,C^{\mathring{a}}}$ to be (0,$h_i$) for $i \in [n] \setminus \mathcal{U}$.

Like the registration oracle, request oracle behaves differently only when $C = C^{\mathring{a}}$. However, one can easily see that the difference is insignificant: while $Hyb_1$, computes c, $z_i$ and h using PwdList[$C^{\mathring{a}}$], $\mathcal{B}$ invokes $\mathcal{O}_{enc\&eval}$ to get them, which uses $\tilde{x}$.

Finally, $\mathcal{B}$ invokes $\mathcal{O}_{eval}$ to get $z_i$ in the simulation of $\mathcal{O}_{resp}$ (because it does not know $k_i$ for honest servers) but it is computed directly in $Hyb_1$. This does not make any difference either. The important thing to note is that the counter $Q_{C^{\mathring{a}},i}$ is incremented if and only if the counter $q_i$ of Obliviousness is incremented. As a result, the final value of $Q_{C^{\mathring{a}},i}$ will be the same as $q_i$. Therefore, $\mathcal{B}$ will successfully translate Adv's probability of guessing $C^{\mathring{a}}$'s password to guessing $\tilde{x}$.

D. PASTA—Unforgeability

In this section, the unforgeability of PASTA is proven. Consider the case of $Q_{C^{\mathring{a}},x^{\mathring{a}}} \leq t - |\mathcal{U}|$. Here $C^{\mathring{a}}$ could even be corrupt, so Adv may know its password. Note that $Q_{C^{\mathring{a}},x^{\mathring{a}}}$ is incremented on every invocation of $\mathcal{O}_{resp}$ (i, $C^{\mathring{a}}$, $x^{\mathring{a}}$, $req_i$) irrespective of the value of i and whether or not $req_i \in ReqList_{i,C^{\mathring{a}}}$. So if $Q_{C^{\mathring{a}},x^{\mathring{a}}} < t - |\mathcal{U}|$, Adv simply doesn't have enough shares to generate a valid token, irrespective of whether $C^{\mathring{a}}$ is corrupt or not. One can formally prove unforgeability in this case by invoking the unforgeability of the threshold token generation scheme TTG.

When $Q_{C^{\mathring{a}},x^{\mathring{a}}} \geq t - |\mathcal{U}|$, unforgeability can only be expected when $C^{\mathring{a}}$ is never corrupted. We need to show that generating a valid token for ($C^{\mathring{a}}$, $x^{\mathring{a}}$) for any $x^{\mathring{a}}$ effectively amounts to guessing $C^{\mathring{a}}$'s password. Indistinguishability of $Hyb_0$ still holds because it just relies on the properties of PubCombine and authenticated channels.

An adversary $\mathcal{B}'$ may be constructed that can use an adversary Adv who breaks the unforgeability guarantee of PASTA to break the unpredictability of TOPRF. The first natural question to ask is whether $\mathcal{B}'$ can break unpredictability of TOPRF in the same way as $\mathcal{B}$ broke obliviousness. Not quite, because there are some key differences in the two settings: Even though both $\mathcal{B}$ and $\mathcal{B}'$ get access to an oracle $\mathcal{O}_{enc\&eval}$ that both encodes and evaluates, $\mathcal{B}$'s oracle returns the final TOPRF output h while $\mathcal{B}$''s oracle doesn't. So it is not clear how $h_i$ will be generated by $\mathcal{O}_{register}$ and $\mathcal{O}_{final}$ for $C^{\tilde{a}}$.

$\mathcal{B}$ was able to use the output of Adv for the password-safety game directly into the obliviousness game, but $\mathcal{B}'$ cannot. Adv now outputs a token for the authentication scheme while $\mathcal{B}'$ is supposed to guess the TOPRF output h on the (hidden) password of $C^{\tilde{a}}$.

As a result, $\mathcal{B}$''s behavior differs from $\mathcal{B}$ in the following manner. At the start of the simulation, $\mathcal{B}'$ picks random numbers $r_1, \ldots, r_n$ and will use them instead of $h_1, \ldots, h_n$, in the registration oracle. LiveSessions cannot contain h anymore, so when it is needed in the finalize oracle, $r_1, \ldots, r_n$ will be used once again. If Adv queries $\mathcal{H}$ on h' || i at any time, $\mathcal{B}'$ will query $\mathcal{O}_{check}$ on h' to check if h'=h or not. If $\mathcal{O}_{check}$ returns 1, then $\mathcal{B}'$ sends $r_i$ to Adv.

This also gives a way for $\mathcal{B}'$ to guess h. If Adv queries $\mathcal{H}$ for some h' || i and $\mathcal{O}_{check}$ returns 1 on h', then $\mathcal{B}'$ just outputs h' in the unpredictability game. However, there is no guarantee that Adv will make such a query. All we know is that Adv can produce a valid token. Hence, Adv can produce a valid token only if it queries $\mathcal{H}$ on h.

Any token share sent by the i-th server is encrypted with $h_i$. At a high level, Adv can decrypt at least one token share from an honest server, say j-th, to construct a token. One way to get this key is by querying $\mathcal{H}$ on h|| j.

VII. Description of Threshold Authentication Schemes

In this section, the implemented threshold authentication schemes (e.g., as discussed in the performance evaluation section) are described:

The DDH-based DPRF scheme of Naor, Pinkas and Reingold [61] as a public-key threshold MAC The PRF-only DPRF scheme of Naor, Pinkas and Reingold [61] as a symmetric-key MAC The threshold RSA-signature scheme of Shoup [65] as a threshold signature scheme based on RSA assumption The pairing-based signature scheme of Boldyreva [25] as a threshold signature scheme based on the gap-DDH assumption The DDH-based DPRF scheme of Naor, Pinkas and Reingold [61] as a public-key threshold MAC is described below:

Ingredients: Let $\mathbb{G} = \langle g \rangle$ be a multiplicative cyclic group of prime order p in which the DDH assumption holds and $\mathcal{H}: \{0,1\}^* \to \mathbb{G}$ be a hash function modeled as a random oracle. Let GenShare be Shamir's secret sharing scheme.

Setup($1^\kappa$, n, t)→(sk, vk, pp). Sample $s \leftarrow_\$ \mathbb{Z}_p$ and get (s, $s_1, \ldots, s_n$)←GenShare(n, t, p, (0, s)). Set pp:=(p, g, $\mathbb{G}$), $sk_i:=s_i$ and vk:=s. Give ($sk_i$, pp) to party i. (pp will be an implicit input in the algorithms below.).

PartEval($sk_i$, x)→$y_i$. Compute $w := \mathcal{H}(x)$, $h_i := w^{sk_i}$ and output $h_i$.

Combine($\{i, y_i\}_{i \in S}$)=: tk/⊥. If |S|<t output ⊥. Otherwise parse $y_i$ as $h_i$ for i∈ S and output $\Pi_{i \in S} h_i^{\lambda_{i,S}}$ Verify(vk, x, tk)=: 1/0. Return 1 if and only if $\mathcal{H}(x)^{vk}$=tk.

The PRF-only DPRF scheme of Naor, Pinkas and Reingold [61] as a symmetric-key MAC is described below:

Ingredients: Let f: $\{0,1\}^\kappa \times \{0,1\}^* \to \{0,1\}^*$ be a pseudo-random function.

Setup($1^\kappa$, n, t)→(sk, vk, pp). Pick $$d := \binom{n}{n-t+1} \text{ keys } k_1, \ldots, k_d \leftarrow_\$ \{0, 1\}^\kappa$$

for f. Let $D_1, \ldots, D_d$ be the d distinct (n−t+1)-sized subsets of [n]. For i∈[n], let $sk_i := \{k_j | i \in D_j \text{ for all } j \in [d]\}$ and vk:= $(k_1, \ldots, k_d)$. Set pp:=f and give ($sk_i$, pp) to party i.

PartEval($sk_i$, x)→$y_i$. Compute $h_{i,k} := f_k(x)$ for all k∈ $sk_i$ and output $\{h_{i,k}\}_{k \in sk_i}$ Combine($\{i, y_i\} i \in S$)=: tk/⊥. If |S|<t output ⊥. Otherwise parse $y_i$ as $\{h_{i,k}\}_{k \in sk_i}$ for i∈ S. Let $\{sk'_i\}_{i \in S}$ be mutually disjoint sets such that $U_{i \in S} sk'_i = \{k_1, \ldots, k_d\}$ and $sk'_i \subseteq sk_i$ for every i. Output $\oplus_{k \in sk'_i, i \in S}(h_{i,k})$ Verify(vk, x, tk)=: 1/0. Return 1 if and only if $\oplus_{i \in [d]} (f_{ki}(x))$=tk where vk=$\{k_1, \ldots, k_d\}$.

The threshold RSA-signature scheme of Shoup [65] as a threshold signature scheme based on RSA assumption is described below: Ingredients: Let GenShare be a Shamir's secret sharing scheme and $\mathcal{H}: \{0,1\}^* \to \mathbb{Z}^*_N$ (be a hash function modeled as a random oracle.

Setup($1^\kappa$, n, t)→(sk, vk, pp). Let p', q' be two randomly chosen large primes of equal length and set p:=2p'+1 and q=2q'+1. Set N:=pq. Choose another large prime e at random and compute $d \equiv e^{-1} \mod \Phi(N)$ where $\Phi(\cdot): \mathbb{N} \to \mathbb{N}$ is the Euler's totient function. Then (d, $d_1, \ldots, d_n$)←GenShare(n, t, $\Phi(N)$, (0, d)). Let $sk_i := d_i$ and vk:=(N, e). Set pp:=Δ where Δ:=n!. Give (pp, vk, $sk_i$) to party i.

PartEval($sk_i$, x)→$y_i$. Output $y_i := \mathcal{H}(x)^{2\Delta d_i}$.

Combine($\{i, y_i\}_{i \in S}$)=: tk/⊥. If |S|<t output ⊥, otherwise compute $z := \Pi_{i \in S} y_i^{2\lambda'_{i,S}} \mod N$ where $\lambda'_{i,S} := \lambda_{i,S} \Delta \in \mathbb{Z}$. Find integer (a, b) by Extended Euclidean GCD algorithm such that $4\Delta^2 a + eb = 1$. Then compute tk:=$z^a$. $\mathcal{H}(x)^b \mod N$. Output tk.

Verify(vk, x, tk)=1/0. Return 1 if and only if $tk^e = \mathcal{H}(x) \mod N$.

The pairing-based signature scheme of Boldyreva [25] as a threshold signature scheme based on the gap-DDH assumption is described below:

Ingredients: Let $\mathbb{G} = \langle g \rangle$ be a multiplicative cyclic group of prime order p that supports pairing and in which CDH is hard. In particular, there is an efficient algorithm VerDDH($g^a$, $g^b$, $g^c$, g) that returns 1 if and only if c=abmodp for any a, b, c∈ $\mathbb{Z}^*_p$ and 0 otherwise. Let $\mathcal{H}: \{0,1\}^* \to \mathbb{G}$ be a hash function modeled as a random oracle. Let GenShare be the Shamir's secret sharing scheme.

Setup ($1^\kappa$, n, t)→(sk, vk, pp). Sample $s \leftarrow_\$ \mathbb{Z}^*_p$ and get (s, $s_1, \ldots, s_n$)←GenShare(n, t, p, (0,s)). Set pp:=(p, g, $\mathbb{G}$), $sk_i := s_i$ and vk:=$g^s$. Give ($sk_i$,pp) to party i.

PartEval($sk_i$, x)→$y_i$. Compute $w := \mathcal{H}(x)$, $h_i := w^{ski}$ and output $h_i$.

Combine($\{i, y_i\}_{i \in S}$)=: tk/⊥. If |S|<t output ⊥. Otherwise parse $y_i$ as $h_i$ for i∈ S and output $\Pi_{i \in S} h_i^{\lambda_{i,S} \mod p}$ Verify(vk, x, tk)=: 1/0. Return 1 if and only if VerDDH($\mathcal{H}(x)$, vk, tk, g)=1.

VIII. Necessity of Public-Key Operations for Pasta

In PASTA, clients use public-key encryption in the registration phase to encrypt the messages they send to servers, but there are no public-key operations in the sign-on phase. However, the TOPRF component of PASTA may be instantiated with the 2HashTDH protocol of Jarecki et al. [53] which uses public-key operations. In such embodiments, the instantiations of PASTA use public-key operations in the sign-on phase as well, even if the threshold authentication method is purely symmetric-key. This could become a significant overhead in some cases compared to the naïve insecure solutions. A natural question is whether public-key operations can be avoided in the sign-on phase (even if they are used during the one-time registration), or put differently, is it just an artifact of PASTA and its instantiations!

In this section, it is proven that public-key operations are indeed necessary in the sign-on phase, to construct any secure PbTA scheme. In particular, it is proven that if one can construct PbTA that, apart from using PKE to encrypt/decrypt messages in the registration process, only makes black-box use of one-way functions, then a secure two-party key agreement protocol can also be constructed by only making black-box use of one-way functions. Impagliazzo and Rudich [50] showed that a secure two-party key agreement protocol that only makes black-box use of one-way functions would imply P, NP. Hence this provides evidence that it is unlikely to construct PbTA using only symmetric-key operations in the sign-on phase. In other words, other types of public-key operations are necessary.

To prove this, a special type of PbTA scheme called symmetric-key PbTA is first defined, which, apart from encryption/decryption in the registration process only makes black-box use of one-way functions. Then, a secure key-agreement protocol may be constructed from symmetric-key PbTA in a black-box way. This results in a secure key-agreement protocol that only makes black-box use of one-way functions, thereby contradicting with the impossibility result of Impagliazzo and Rudich [50].

To construct the secure key-agreement protocol, think of the two parties $P_1$, $P_2$ in the key-agreement protocol as a single client C and the set of all servers in the PbTA protocol, respectively. The password space is set to contain only one password pwd, which means the password of C is known to both parties. Since $P_2$ represents the set of all servers, it can run GlobalSetup and the registration phase of C on its own. Then the two parties run the sign-on phase so that $P_1$ obtains a token for x=0. Since both parties know the password, $P_2$ can emulate the sign-on phase on its own to generate a token for x=0. The resulting token is the agreed key by both parties.

Notice that the generated token might not be a valid output for the key agreement protocol, but the two parties can apply randomness extractor to the token and obtain randomness to generate a valid key.

The security of the key-agreement protocol relies on the unforgeability of the symmetric-key PbTA scheme. Intuitively speaking, if there exists a PPT adversary that outputs the agreed token by $P_1$ and $P_2$ with non-negligible probability, then the adversary is able to generate a valid token in the symmetric-key PbTA scheme where $Q_{c,i}=0$ for all i with non-negligible probability, contradicting the unforgeability property.

Next, formal definitions and proofs of symmetric-key PbTA schemes and secure two-party key agreement protocols are provided.

FIG. 14 illustrates definitions associated with a symmetric-key PbTA scheme. A symmetric-key password-based threshold authentication (PbTA) scheme $\Pi_{sym}$ may be formally defined as a tuple of six PPT algorithms (GlobalSetup, SignUp, Request, Respond, Finalize, Verify) that only involve black-box usage of one-way functions and can be used to construct a PbTA scheme to meet the requirements laid out in FIG. 14.

FIG. 15 illustrates descriptions and requirements associated with a secure two-party key agreement protocol.

Based on the definition of a symmetric-key PbTA scheme in FIG. 14, it can be shown that a secure two-party key agreement protocol, as defined in FIG. 15, can be constructed from any symmetric-key PbTA scheme in a black-box way.

Let $\Pi_{sym}$=(GlobalSetup, SignUp, Request, Respond, Finalize, Verify) be a symmetric-key PbTA scheme. As shown in the protocol, it only uses symmetric-key PbTA in a black-box way. Since the tokens tk, tk' are generated using the same C, x, and secret key, they are equivalent. Hence the two parties agree on a token (which can be used to extract randomness to generate a key). Now if there exists a PPT adversary Adv that outputs the agreed token by $P_1$, $P_2$ in the key-agreement protocol, then another adversary $\mathcal{B}$ can be constructed that breaks unforgeability of the symmetric-key PbTA scheme.

The adversary $\mathcal{B}$ first parses pp as $(\overline{pp}, \{PK_1, \ldots, PK_n\})$. It does not corrupt any server or client. It then calls $\mathcal{O}_{signup}$(C) to obtain $\{msg_i\}_{i \in [n]}$, and calls $\mathcal{O}_{server}$(i, store, $msg_i$) to register C for all $i \in \mathcal{T}$. Then it calls $\mathcal{O}_{req}$(C, pwd, 0, $\mathcal{T}$) to obtain $\{req_i\}_{i \in \mathcal{T}}$, and calls $\mathcal{O}_{server}$(i, respond, $req_i$) to obtain $res_i$ for all $i \in \mathcal{T}$. $\mathcal{B}$ runs Adv with input being the transcript of the key-agreement protocol, consisting of $\{(\overline{pp}, C), \{req_i\}_{i \in \mathcal{T}}, \{res_i\}_{i \in \mathcal{T}}\}$, and obtains an output $\widetilde{tk}$ from Adv. Then $\mathcal{B}$ simply outputs (C,0,$\widetilde{tk}$).

In the security game SecGame$_{\Pi, Ad}$($1^\kappa$, n, t, P) (FIG. 7) for $\mathcal{B}$, we have $Q_{C,i}=0$ for all i. By the unforgeability definition, there exists a negligible function negl such that $$Pr[\text{Verify}(vk, C, 0, \widetilde{tk})=1] \leq negl(\kappa).$$

However, since Adv outputs tk with non-negligible probability, the token $\widetilde{tk}$ is valid with non-negligible probability, leading to a contradiction.

Combining the above theorem with the result of Impagliazzo and Rudich [25], results in the following corollary: if there exists a symmetric-key PbTA scheme, then P≠NP.

This corollary provides evidence that it is unlikely to construct symmetric-key PbTA schemes.

IX. Flow Diagrams

Embodiments of the token authentication schemes described herein are now summarized through the use of flow diagrams.

A. Client-side

Figure 16:
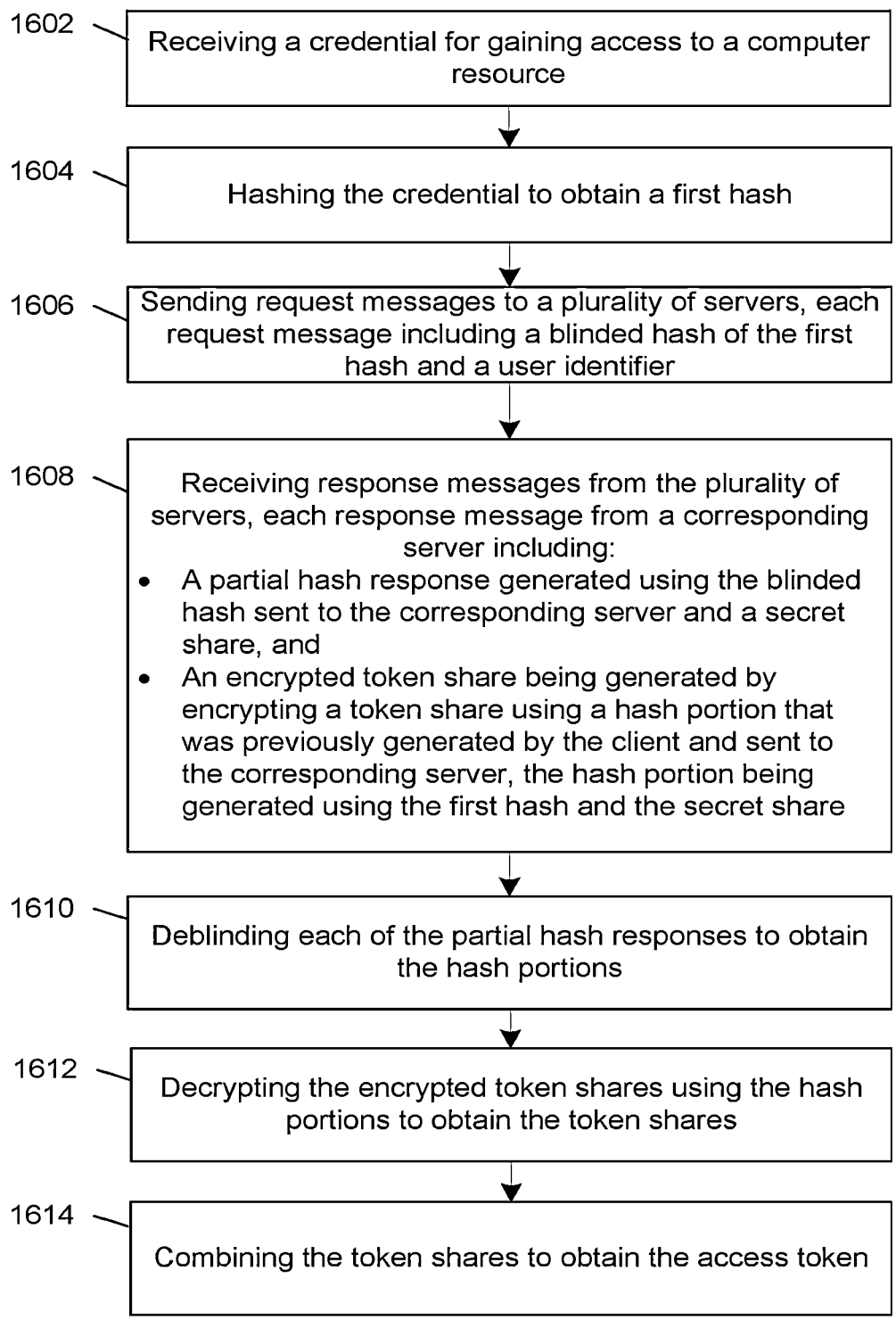
FIG. 16 illustrates a flow diagram describing a client obtaining a token according to embodiments of the present invention.

Turning now to FIG. 16, the figure illustrates a flow diagram of a client obtaining a token according to embodiments of the present invention.

In a previous registration phase, each of n servers (5 in this example; servers 1112, 1114, 1116, 1118, and 1120), may have received and stored a secret share ($sk_i$) and a hash portion ($h_i$) that corresponds with a user identifier (e.g., username) from the registration phase. This may have been stored in a unique record associated with the user.

Client 1105 may then send a token request message 1101 to each of the multiple servers (there are five shown in the figure, including servers 1112, 1114, 1116, 1118, and 1120). Each request 1101 may include the blinded hash of the password, data x to be signed (e.g., the username), and username if not included in x. Each server may use the username to identify the hash portion, $h_i$, and secret share corresponding to the username that the server was issued during the registration process.

The server may generate a token share using the data x to be signed and the secret share. This token share can be encrypted using the stored hash portion, $h_i$, tied to the username that was received during the registration process. At the same time, the server may also compute a partial answer (e.g., partial hash response) using the server's secret share tied to the username and the blinded hash provided in the token request message 1101, using the same algorithm as was used in the registration phase. For example, if during the registration process, the blinded hash was raised to the power of the server's secret share, the partial answer will again be computed by raising the blinded hash provided in the token request message 1101 by the server's secret share.

Each server may then send a message 1102 back to the client 1105 that can include the partial answer and the encrypted token share that corresponding server has generated.

The client 1105 can then generate the corresponding hash portion, $h_i$ for each server by deblinding the received partial answer. The blinding/deblinding process used in the registration phase can be different from the blinding/deblinding used in this request phase, as each deblinding would provide the hash portion. The hash portion obtained should be the same as the corresponding hash portion from the registration process if the passwords are the same. In other words, if the user used the right password in the request message, then client 1105 would be able to reconstruct all of the hash portions corresponding to all the servers (e.g., $h_1$, $h_2$, $h_3$, $h_4$, $h_5$). These hash portions can be used to decrypt all the corresponding encrypted token shares received from the servers (e.g., if a server used it's stored copy of $h_i$ to encrypt a token share, then the client can decrypt it using the reconstructed $h_i$ from the partial answer received in the same message as the encrypted token share). With all the token shares decrypted, the client 1105 may be able to combine them to generate token 1110, which can then be used to obtain access to a protected resource.

In this manner, the servers do not actually learn the hash of the password, as they only get the blinded hash. Furthermore, each server could even receive a different blinded hash. And, the blinded hash may change each time the client makes a request. And, each server stores a different hash portion, i.e., result of secret share and hash. Thus, even if an attacker compromises a server, they cannot perform a dictionary attack anymore because the secret is shared among the servers and not one of them knows the actual key. If for instance, as shown in the figure, servers 1114 and 1116 have been compromised, the attacker would only be able to obtain two partial answers (e.g., associated with hash portions $h_2$ and $h_3$) and only decrypt two of the five total token shares. All five servers 1112, 1114, 1116, 1118, and 1120 would need to be compromised in order to produce the token 1110 or obtain the password through a dictionary attack.

At block 1602, the client may receive a credential (e.g., a password) for gaining access to a computer resource. This credential should be received along with a user identifier or a client identifier, which corresponds to the credential (e.g., they were registered together during a registration process). For instance, the credential and user identifier may be received from a user input entered by the user desiring access to a protected resource.

At block 1604, the client may hash the credential to obtain a first hash (h). In some embodiments, any hashing function may be used. In some embodiments, the hashing may be performed using a threshold oblivious pseudorandom function (TOPRF). In some embodiments, the client may blind the first hash to generate a blinded hash. For example, the first hash may be raised to the power of R, selected at random. In some embodiments, multiple blinded hashes may be generated from the first hash, with each blinded hash being distinct and intended to be distributed to a different authentication server.

At block 1606, the client may send request messages (e.g., requesting token shares) to a plurality of servers (e.g., authentication servers), with each request message including the blinded hash and a user identifier. The user identifier may be the username that became associated with the credential during an initial registration process. Thus, the client does not need to send the first hash (h) directly. In the embodiments that utilize multiple blinded hashes, each request message may contain the blinded hash intended for a particular server.

The servers may receive the request messages and utilize the user identifier to look up information stored and linked to that user identifier from the registration process, such as a shared secret for that user identifier and/or hash portion for that user identifier received during the registration process. Each server may encrypt a token share using that stored hash portion that was previously received during the registration process. Each server may also calculate a partial hash response generated by applying the shared secret (for that user identifier, as received during registration) to the blinded hash received in the request message.

At block 1608, the client may receive response messages from the plurality of servers. The response message from each server may include the partial hash response generated using both the blinded hash provided to the corresponding server in the request message and the secret share provided to the corresponding server during a previous registration process. Each response message may also include an encrypted token share from the corresponding server, the encrypted token share being generated by encrypting a token share using a hash portion that was previously generated by the client and sent to that corresponding server (e.g., during the registration process). This hash portion may have been generated by the client by deblinding a partial answer received from the server, with the partial answer generated by applying the server's secret share to the blinded hash (or, more specifically, the blinded hash of the password provided during registration).

At block 1610, the client may deblind each of the partial hash responses from all the response messages to obtain a hash portion from each partial hash response. In other words, from each response message received from a server, the client may be able to reconstruct a hash portion from the partial hash response received from that server by deblinding the partial hash response in a manner that counteracts the blinding process used in generating the blinded hash sent in the request message.

At block 1612, the client may decrypt each of the encrypted token shares using the corresponding reconstructed hash portions, in order to obtain the various token shares. Since each server encrypted its token share with its hash portion stored during registration, then assuming that the corresponding reconstructed hash portion is the same as the previously-stored hash portion (e.g., the password supplied by the user is the same as the registered password), the reconstructed hash portion associated with a particular server may be used to decrypt the corresponding encrypted token share (e.g., from the response message) received from that server. The resulting number of token shares should be equivalent to the number of servers in the plurality of servers.

At block 1614, the client may combine all of the token shares to obtain the access token. This can be done using a combine algorithm, which combines all the token shares to generate the token (e.g., based on Shamir's secret sharing). As only t servers are needed to provide a response, the registration can include sending one or more additional hash portions to one or more additional servers. Only a portion of all servers are required to provide a response message to obtain the access token.

A. Server-Side

Figure 17:
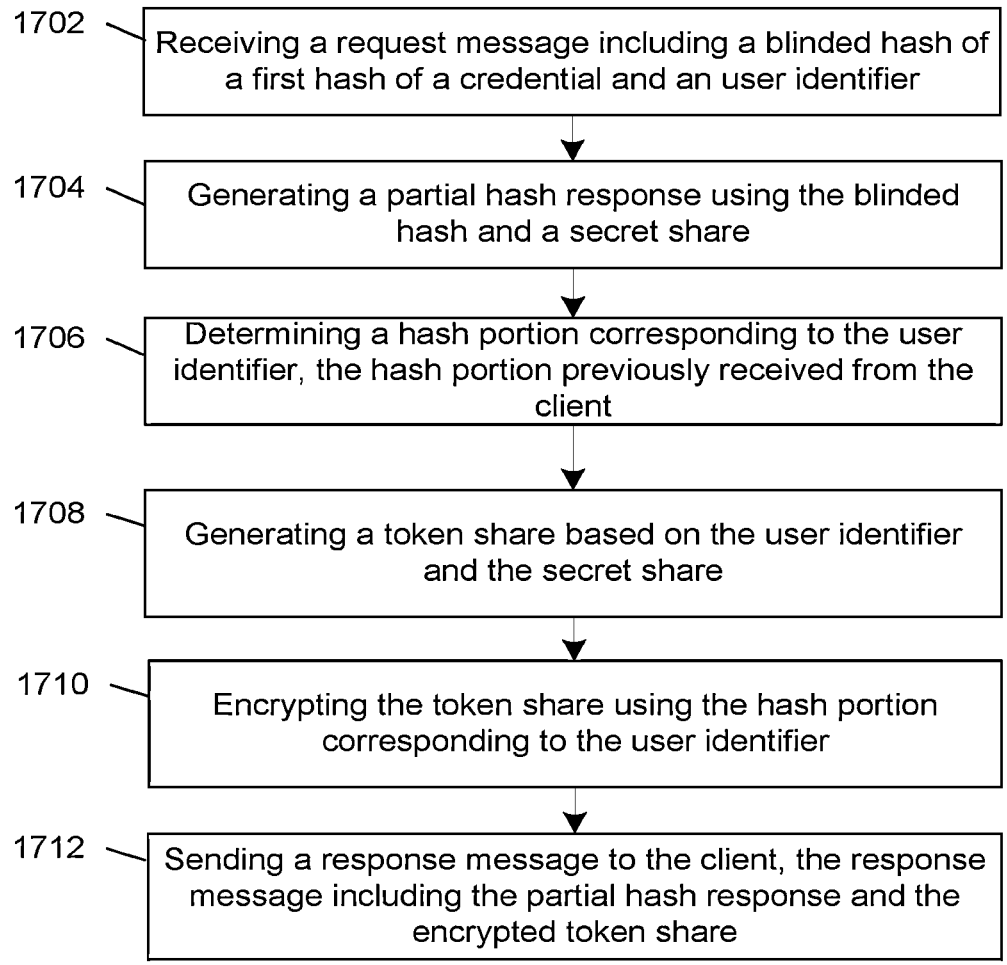
FIG. 17 illustrates a flow diagram describing a server, in a plurality of servers, providing a token share according to embodiments of the present invention.

FIG. 17 illustrates a flow diagram describing a server, in a plurality of servers, providing a token share according to embodiments of the present invention.

At block 1702, a server, in a plurality of servers, may receive a request message from a client. This request message may include a blinded hash of a first hash of a credential, along with a user identifier. The user identifier (e.g., username) may have been entered by a user at the client, along with a credential that was registered with that username during the registration process. The client may hash the credential to obtain a first hash (h), and then blind the first hash to generate a blinded hash. For example, the first hash may be raised to the power of R, selected at random. The server will only receive this blinded hash and will not be aware of the value of the credential, the value of the first hash, or the hashing algorithm used.

At block 1704, the server may generate a partial hash response using the blinded hash and a secret share. In particular, the server may utilize the user identifier from the request message to look up information stored and linked to that user identifier from the registration process, such as a shared secret for that user identifier and/or hash portion for that user identifier received during the registration process. The server can take this shared secret and apply it to the blinded hash received in the request message in order to generate a partial hash response (e.g., in a similar manner that the server did during the registration process).

At block 1706, the server may also determine a hash portion corresponding to the user identifier, such as a hash portion for that user identifier received during the registration process. During the registration process, the client will have generated this hash portion and provided it to the server (e.g., by deblinding a partial answer received from the server, with that partial answer generated by applying the server's secret share to the blinded hash, or more specifically, the blinded hash of the password credential provided by the client during registration), which the server will have stored tied to the user identifier.

At block 1708, the server may generate a token share based on the user identifier and the secret share.

At block 1710, the server may encrypt this token share using the previously-stored hash portion corresponding to the user identifier.

At block 1712, the server may send a response message back to the client. The response message may include the calculated partial hash response and the encrypted token share. When the client receives a response message from all the servers in the plurality of servers, the client may be able to use the contents of these response messages in order to reconstruct the hash portions provided to each of the servers, decrypt all of the encrypted token shares, and then combine the token shares to generate an authentication token. This process was previously described in regards to FIG. 16.

X. Implementation

Figure 18:
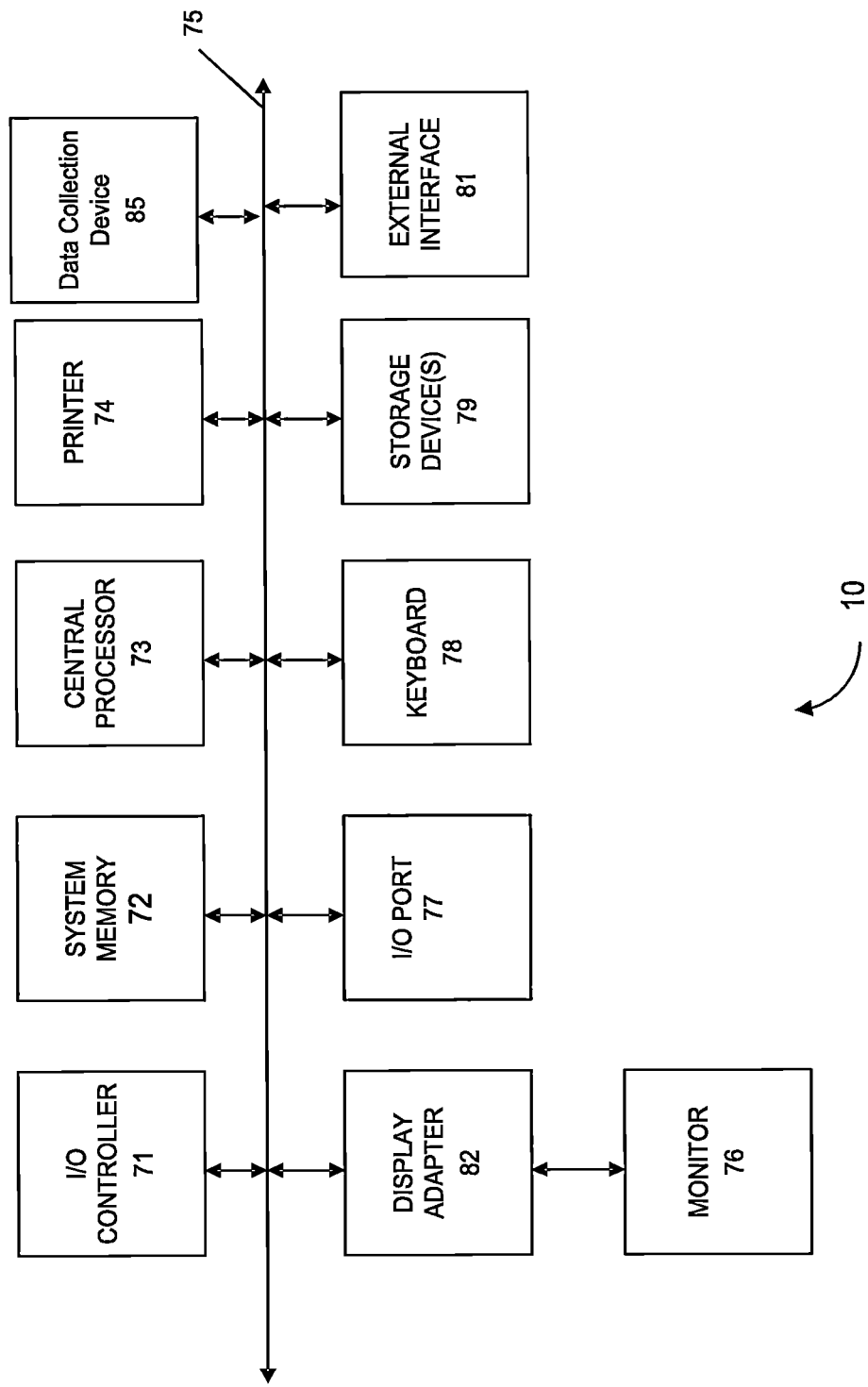
FIG. 18 illustrates a block diagram of an example computer system usable with systems and methods according to embodiments of the present invention.

Any of the computer systems mentioned herein may utilize any suitable number of subsystems. Examples of such subsystems are shown in FIG. 18 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 18 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

XI. REFERENCES

[1] Amazon OpenID. does.aws.amazon.com/cognito/latest/developerguide/open-id.html. Accessed on May 9, 2018.
[2] BLAKE2-fast secure hashing. blake2.net/. Accessed on May 9, 2018.
[3] Facebook Login. developers.facebook.com/docs/facebook-login. Accessed on May 9, 2018.
[4] Google Identity Platform—OpenID Connect. developers.google.com/identity/protocols/OpenIDConnect. Accessed on May 9, 2018.
[5] JSON Web Tokens. jwt.io/. Accessed on May 9, 2018.
[6] Kerberos: The Network Authentication Protocol. web.mit.edu/kerberos/. Accessed on May 9, 2018.
[7] Password Hashing Competition. password-hashing.net/. Accessed on May 9, 2018.
[8] SAML Toolkits. developers.onelogin.com/saml. Accessed on May 9, 2018.
[9] The OAuth 2.0 Authorization Framework: Bearer Token Usage. tools.ietf.org/html/rfc6750. Accessed on May 9, 2018.
[10] The OpenID Connect. openid.net/connect/.
[11] Vault by Hashicorp. www.vaultproject.io/docs/internals/token.html. Accessed on May 9, 2018.
[12] M. Abdalla, O. Chevassut, P. A. Fouque, and D. Pointcheval. A simple threshold authenticated key exchange from short secrets. In B. K. Roy, editor, ASIACRYPT 2005, volume 3788 of LNCS, pages 566-584. Springer, Heidelberg, December 2005.
[13] M. Abdalla, M. Cornejo, A. Nitulescu, and D. Pointcheval. Robust password protected secret sharing. In I. G. Askoxylakis, S. Ioannidis, S. K. Katsikas, and C. A. Meadows, editors, ESORICS 2016, Part II, volume 9879 of LNCS, pages 61-79. Springer, Heidelberg, September 2016.
[14] M. Abdalla, P. A. Fouque, and D. Pointcheval. Password-based authenticated key exchange in the three-party setting. In S. Vaudenay, editor, PKC 2005, volume 3386 of LNCS, pages 65-84. Springer, Heidelberg, January 2005.
[15] M. Abdalla, S. Miner, and C. Namprempre. Forward-secure threshold signature schemes. In Cryptographers Track at the RSA Conference, pages 441-456. Springer, 2001.
[16] J. Alwen, B. Chen, C. Kamath, V. Kolmogorov, K. Pietrzak, and S. Tessaro. On the complexity of scrypt and proofs of space in the parallel random oracle model. In M. Fischlin and J. S. Coron, editors, EUROCRYPT 2016, Part II, volume 9666 of LNCS, pages 358-387. Springer, Heidelberg, May 2016.
[17] J. Alwen, B. Chen, K. Pietrzak, L. Reyzin, and S. Tessaro. Scrypt is maximally memory-hard. In J. Coron and J. B. Nielsen, editors, EUROCRYPT 2017, Part II, volume 10211 of LNCS, pages 33-62. Springer, Heidelberg, May 2017.
[18] D. F. Aranha and C. P. L. Gouvea. RELIC is an Efficient LIbrary for Cryptography. github.com/relic-toolkit/relic.
[19] A. Bagherzandi, S. Jarecki, N. Saxena, and Y. Lu. Password-protected secret sharing. In Y. Chen, G. Danezis, and V. Shmatikov, editors, ACM CCS 11, pages 433-444. ACM Press, October 2011.
[20] P. S. L. M. Barreto and M. Naehrig. Pairing-friendly elliptic curves of prime order. In B. Preneel and S. Tavares, editors, SAC 2005, volume 3897 of LNCS, pages 319-331. Springer, Heidelberg, August 2006.
[21] M. Bellare, D. Pointcheval, and P. Rogaway. Authenticated key exchange secure against dictionary attacks. In B. Preneel, editor, EUROCRYPT 2000, volume 1807 of LNCS, pages 139-155. Springer, Heidelberg, May 2000.
[22] M. Bellare and R. Sandhu. The security of practical two-party RSA signature schemes. Cryptology ePrint Archive, Report 2001/060, 2001. eprint. iacr.org/2001/060.
[23] J. Blocki and A. Datta. CASH: A cost asymmetric secure hash algorithm for optimal password protection. In IEEE 29th Computer Security Foundations Symposium, CSF 2016, Lisbon, Portugal, June 27-Jul. 1, 2016, pages 371-386, 2016.
[24] J. Blocki and S. Zhou. On the depth-robustness and cumulative pebbling cost of Argon2i. In Y. Kalai and L. Reyzin, editors, TCC 2017, Part I, volume 10677 of LNCS, pages 445-465. Springer, Heidelberg, November 2017.

[25] A. Boldyreva. Threshold signatures, multisignatures and blind signatures based on the gap-Diffie-Hellman-group signature scheme. In Y. Desmedt, editor, PKC 2003, volume 2567 of LNCS, pages 31-46. Springer, Heidelberg, January 2003.

[26] D. Boneh, K. Lewi, H. W. Montgomery, and A. Raghunathan. Key homomorphic PRFs and their applications. In R. Canetti and J. A. Garay, editors, CRYPTO 2013, Part I, volume 8042 of LNCS, pages 410-428. Springer, Heidelberg, August 2013.

[27] V. Boyko, P. D. MacKenzie, and S. Patel. Provably secure password-authenticated key exchange using Diffie-Hellman. In B. Preneel, editor, EUROCRYPT 2000, volume 1807 of LNCS, pages 156-171. Springer, Heidelberg, May 2000.

[28] J. Camenisch, R. R. Enderlein, and G. Neven. Two-server password-authenticated secret sharing UC-secure against transient corruptions. In J. Katz, editor, PKC 2015, volume 9020 of LNCS, pages 283-307. Springer, Heidelberg, March/April 2015.

[29] J. Camenisch, A. Lehmann, A. Lysyanskaya, and G. Neven. Memento: How to reconstruct your secrets from a single password in a hostile environment. In J. A. Garay and R. Gennaro, editors, CRYPTO 2014, Part II, volume 8617 of LNCS, pages 256-275. Springer, Heidelberg, August 2014.

[30] J. Camenisch, A. Lehmann, and G. Neven. Optimal distributed password verification. In I. Ray, N. Li, and C. Kruegel: editors, ACM CCS 15, pages 182-194. ACM Press, October 2015.

[31] J. Camenisch, A. Lehmann, G. Neven, and K. Samelin. Virtual smart cards: How to sign with a password and a server. In V. Zikas and R. De Prisco, editors, SCN 16, volume 9841 of LNCS, pages 353-371. Springer, Heidelberg, August/September 2016.

[32] J. Camenisch, A. Lysyanskaya, and G. Neven. Practical yet universally composable two-server password-authenticated secret sharing. In T. Yu, G. Danezis, and V. D. Gligor, editors, ACM CCS 12, pages 525-536. ACM Press, October 2012.

[33] R. Canetti. Universally composable security: A new paradigm for cryptographic protocols. In 42nd FOCS, pages 136-145. IEEE Computer Society Press, October 2001.

[34] R. Canetti, S. Halevi, J. Katz, Y. Lindell, and P. D. MacKenzie. Universally composable password-based key exchange. In R. Cramer, editor, EUROCRYPT 2005, volume 3494 of LNCS, pages 404-421. Springer, Heidelberg, May 2005.

[35] I. Damgård and M. Koprowski. Practical threshold RSA signatures without a trusted dealer. In B. Pfitzmann, editor, EUROCRYPT 2001, volume 2045 of LNCS, pages 152-165. Springer, Heidelberg, May 2001.

[36] Daniel Sewell. Offline Password Cracking: The Attack and the Best Defense Against It. www.alpinesecurity.com/blog/offline-password-cracking-the-attack-and-the-best-defense-against-it. Accessed on May 9, 2018.

[37] A. De Santis, Y. Desmedt, Y. Frankel, and M. Yung. How to share a function securely. In 26th ACM STOC, pages 522-533. ACM Press, May 1994.

[38] Y. Desmedt and Y. Frankel. Threshold cryptosystems. In G. Brassard, editor, CRYPTO'89, volume 435 of LNCS, pages 307-315. Springer, Heidelberg, August 1990.

[39] M. Di Raimondo and R. Gennaro. Provably secure threshold passwordauthenticated key exchange. In E. Biham, editor, EUROCRYPT 2003, volume 2656 of LNCS, pages 507-523. Springer, Heidelberg, May 2003.

[40] D. Dinu, D. Khovratovich, J. P. Aumasson, and S. Neves. Argon2. github.com/P-H-C/phc-winner-argon2. Github Repository: Accessed on May 9, 2018.

[41] N. FIPS. 198: The keyed-hash message authentication code (hmac). National Institute of Standards and Technology, Federal Information Processing Standards, page 29, 2002.

[42] M. J. Freedman, Y. Ishai, B. Pinkas, and O. Reingold. Keyword search and oblivious pseudorandom functions. In J. Kilian, editor, TCC 2005, volume 3378 of LNCS, pages 303-324. Springer, Heidelberg, February 2005.

[43] R. Ganesan. Yaksha: augmenting kerberos with public key cryptography. In 1995 Symposium on Network and Distributed System Security, (S)NDSS'95, San Diego, Calif., Feb. 16-17, 1995, pages 132-143, 1995.

[44] R. Gennaro, S. Goldfeder, and A. Narayanan. Threshold-optimal DSA/ECDSA signatures and an application to bitcoin wallet security. In M. Manulis, A. R. Sadeghi, and S. Schneider, editors, ACNS 16, volume 9696 of LNCS, pages 156-174. Springer, Heidelberg, June 2016.

[45] R. Gennaro, S. Halevi, H. Krawczyk, and T. Rabin. Threshold RSA for dynamic and ad-hoc groups. In N. P. Smart, editor, EUROCRYPT 2008, volume 4965 of LNCS, pages 88-107. Springer, Heidelberg, April 2008.

[46] R. Gennaro, S. Jarecki, H. Krawczyk, and T. Rabin. Robust threshold DSS signatures. In U. M. Maurer, editor, EUROCRYPT'96, volume 1070 of LNCS, pages 354-371. Springer, Heidelberg, May 1996.

[47] K. Gjosteen and O. Thuen. Password-based signatures. In Public Key Infrastructures, Services and Applications—8th European Workshop, EuroPKI 2011, Leuven, Belgium, Sep. 15-16, 2011, Revised Selected Papers, pages 17-33, 2011.

[48] A. Groce and J. Katz. A new framework for efficient password-based authenticated key exchange. In E. Al-Shaer, A. D. Keromytis, and V. Shmatikov, editors, ACM CCS 10, pages 516-525. ACM Press, October 2010.

[49] Y. Harchol, I. Abraham, and B. Pinkas. Distributed ssh key management with proactive rsa threshold signatures. Cryptology ePrint Archive, Report 2018/389, 2018. eprint.iacr.org/2018/389.

[50] R. Impagliazzo and S. Rudich. Limits on the provable consequences of one-way permutations. In S. Goldwasser, editor, CRYPTO'88, volume 403 of LNCS, pages 8-26. Springer, Heidelberg, August 1990.

[51] S. Jarecki, A. Kiayias, and H. Krawczyk. Round-optimal password-protected secret sharing and T-PAKE in the password-only model. In P. Sarkar and T. Iwata, editors, ASIACRYPT 2014, Part II, volume 8874 of LNCS, pages 233-253. Springer, Heidelberg, December 2014.

[52] S. Jarecki, A. Kiayias, H. Krawczyk, and J. Xu. Highly-efficient and composable password-protected secret sharing (or: How to protect your bitcoin wallet online). In IEEE European Symposium on Security and Privacy, EuroS&P 2016, Saarbrucken, Germany, Mar. 21-24, 2016, pages 276-291, 2016.

[53] S. Jarecki, A. Kiayias, H. Krawczyk, and J. Xu. TOPPSS: Cost-minimal passwordprotected secret sharing based on threshold OPRF. In D. Gollmann, A. Miyaji, and H. Kikuchi, editors, ACNS 17, volume 10355 of LNCS, pages 39-58. Springer, Heidelberg, July 2017.

[54] J. Katz, P. MacKenzie, G. Taban, and V. Gligor. Two-server password-only authenticated key exchange. In J. Ioannidis, A. Keromytis, and M. Yung, editors, Applied Cryptography and Network Security, pages 1-16, Berlin, Heidelberg, 2005. Springer Berlin Heidelberg.

[55] J. Katz, R. Ostrovsky, and M. Yung. Efficient password-authenticated key exchange using human-memorable passwords. In B. Pfitzmann, editor, EUROCRYPT 2001, volume 2045 of LNCS, pages 475-494. Springer, Heidelberg, May 2001.

[56] J. Katz, R. Ostrovsky, and M. Yung. Forward secrecy in password-only key exchange protocols. In S. Cimato, C. Galdi, and G. Persiano, editors, SCN 02, volume 2576 of LNCS, pages 29-44. Springer, Heidelberg, September 2003.

[57] J. Katz and V. Vaikuntanathan. Round-optimal password-based authenticated key exchange. In Y. Ishai, editor, TCC 2011, volume 6597 of LNCS, pages 293-310. Springer, Heidelberg, March 2011.

[58] P. MacKenzie and M. K. Reiter. Networked cryptographic devices resilient to capture. International Journal of Information Security, 2(1):1-20, 2003.

[59] P. D. MacKenzie, T. Shrimpton, and M. Jakobsson. Threshold passwordauthenticated key exchange. In M. Yung, editor, CRYPTO 2002, volume 2442 of LNCS, pages 385-400. Springer, Heidelberg, August 2002.

[60] K. M. Martin, J. Pieprzyk, R. Safavi-Naini, H. Wang, and P. R. Wild. Threshold macs. In P. J. Lee and C. H. Lim, editors, Information Security and Cryptology ICISC 2002, pages 237-252, Berlin, Heidelberg, 2003. Springer Berlin Heidelberg.

[61] M. Naor, B. Pinkas, and O. Reingold. Distributed pseudo-random functions and KDCs. In J. Stern, editor, EUROCRYPT'99, volume 1592 of LNCS, pages 327-346. Springer, Heidelberg, May 1999.

[62] K. G. Paterson and D. Stebila. One-time-password-authenticated key exchange. In R. Steinfeld and P. Hawkes, editors, ACISP 10, volume 6168 of LNCS, pages 264-281. Springer, Heidelberg, July 2010.

[63] Raluca Ada Popa. CS-161: Computer Security Password hashing.www-inst.cs.berkeley.edu/-cs161/sp16/slides/3.11.password.pdf. Lecture Notes (UC Berkeley); Accessed on May 9, 2018.

[64] D. Security. Salted Password Hashing—Doing it Right. crackstation.net/hashing-security.htm?=rd. Accessed on May 9, 2018.

[65] V. Shoup. Practical threshold signatures. In B. Preneel, editor, EUROCRYPT 2000, volume 1807 of LNCS, pages 207-220. Springer, Heidelberg, May 2000.

[66] Tarsnap. Scrypt. github.com/Tarsnap/scrypt. Github Repository: Accessed on May 9, 2018.

[67] Thycotic Team. How to Use Passwords for Better Cyber Security. thycotic.com/company/blog/2015/05/12/how-to-use-passwords/. Accessed on May 9, 2018.

[68] D. Wang and P. Wang. Offline dictionary attack on password authentication schemes using smart cards. 2014:1-16, 01 2013.

[69] S. Xu and R. S. Sandhu. Two efficient and provably secure schemes for serverassisted threshold signatures. In M. Joye, editor, CT-RSA 2003, volume 2612 of LNCS, pages 355-372. Springer, Heidelberg, April 2003.

[70] X. Yi, F. Hao, L. Chen, and J. K. Liu. Practical threshold password-authenticated secret sharing protocol. In G. Pernul, P. Y. A. Ryan, and E. R. Weippl, editors, ESORICS 2015, Part I, volume 9326 of LNCS, pages 347-365. Springer, Heidelberg, September 2015.

What is claimed is:

1. A method for obtaining an access token by a client, the method comprising:
    sending request messages to a plurality of servers, respectively, each of the request messages including a user identifier and a blinded hash of a hashed credential;
    receiving response messages from the plurality of servers, wherein each of the response messages is received from a corresponding server among the plurality of servers, and includes:
        a blinded partial hash response generated by applying a secret share stored in the corresponding server to the blinded hash sent to the corresponding server, and
        an encrypted token share generated by encrypting a token share of the corresponding server using a hash portion that was previously generated by the client using the hashed credential and the secret share and sent to the corresponding server;
    deblinding each of the blinded partial hash responses of the plurality of servers, to obtain hash portions corresponding to the plurality of servers, respectively;
    decrypting the encrypted token shares using the hash portions to obtain token shares of the plurality of servers, respectively; and
    combining the obtained token shares to acquire the access token.

2. The method of claim 1, further comprising:
    prior to the sending the request messages, performing a registration with the plurality of servers, the performing the registration comprising:
        sending registration requests to the plurality of servers, respectively, each of the registration requests including a blinded hash of a registration credential provided for the registration by a user;
        receiving registration responses from the plurality of servers, respectively, wherein each of the registration responses is received from the corresponding server and includes a corresponding blinded partial hash response generated by applying the secret share to the blinded hash of the registration credential that is sent to the corresponding server in a corresponding registration request;
        deblinding the corresponding blinded partial hash responses received from the plurality of servers, to obtain registration hash portions for the registration with the plurality of servers, respectively; and
        sending the registration hash portions to the plurality of servers, respectively, to be stored,
    wherein the hash portion used to encrypt the token share of the corresponding server is one of the registration hash portions sent to the plurality of servers.

3. The method of claim 2, further comprising:
    generating a plurality of secret shares; and
    sending the plurality of secret shares to the plurality of servers, respectively,
    wherein the secret share is one of the plurality of secret shares.

4. The method of claim 3, wherein the plurality of secret shares differ from each other.

5. The method of claim 2, wherein the performing the registration includes sending one or more additional registration hash portions to one or more additional servers, and
    wherein only a portion of all servers is required to provide the response messages to obtain the access token.

6. The method of claim 1, wherein the blinded hash is the same for each of the plurality of servers.

7. The method of claim 1, wherein the blinded hash is different for each of the plurality of servers.

8. The method of claim 1, wherein the token shares and the access token are generated using a non-interactive threshold token generation scheme.

9. The method of claim 8, wherein the non-interactive threshold token generation scheme comprises one from among symmetric key based message authentication code (MAC), public key based MAC, secret sharing (Shamir) RSA based digital signature, and pairing based digital signature.

10. The method of claim 8, wherein the response messages from the plurality of servers are received without any further interaction after sending the request messages to the plurality of servers.

11. The method of claim 1, wherein the request messages to the plurality of servers are sent in parallel.

12. A system comprising a server computer comprising a processor and a non-transitory computer-readable medium storing one or more instructions that, when executed by the processor, cause the processor to execute a method including:
receiving a request message from a client, the request message including a user identifier and a blinded hash of a hashed credential;
generating a blinded partial hash response by applying a secret share of the server computer to the blinded hash sent to the server computer;
identifying a hash portion corresponding to the user identifier, wherein the hash portion was previously received by the server computer from the client and was generated by the client using the hashed credential and the secret share;
generating a token share of the server computer based on the user identifier and the secret share;
encrypting the token share using the hash portion identified as corresponding to the user identifier; and
sending a response message to the client, the response message including the blinded partial hash response and the encrypted token share.

13. The system of claim 12, wherein the method further includes:
prior to the receiving the request message, performing a registration with the client, wherein the performing the registration includes:
receiving a registration request from the client, the registration request including the user identifier and a blinded hash of a registration credential provided for the registration by a user;
sending a registration response to the client, the registration response including a first blinded partial hash response generated by applying the secret share of the server computer to the blinded hash of the registration credential that is received in the registration request;
receiving a registration hash portion from the client, wherein the registration hash portion is generated by the client by deblinding the first blinded partial hash response received from the server computer; and
storing the registration hash portion in association with the user identifier,
wherein the hash portion used to encrypt the token share of the server computer is the registration hash portion.

14. The system of claim 12, wherein the secret share is received from the client.

15. The system of claim 12, wherein the token share is generated using a non-interactive threshold token generation scheme.

16. The system of claim 15, wherein the non-interactive threshold token generation scheme comprises one from among symmetric key based message authentication code (MAC), public key based MAC, secret sharing (Shamir) RSA based digital signature, and pairing based digital signature.

17. The system of claim 15, wherein the response message is sent to the client by the server computer without any further interaction from the client after receiving the request message from the client.

18. A system comprising:
one or more processors; and
a non-transitory computer-readable memory storing instructions that, when executed by the one or more processors, cause the one or more processors to perform a method for obtaining an access token by a client, the method including:
sending request messages to a plurality of servers, respectively, each of the request messages including a user identifier and a blinded hash of a hashed credential;
receiving response messages from the plurality of servers, wherein each of the response messages is received from a corresponding server among the plurality of servers, and includes:
a blinded partial hash response generated by applying a secret share stored in the corresponding server to the blinded hash sent to the corresponding server, and
an encrypted token share generated by encrypting a token share of the corresponding server using a hash portion that was previously generated by the client using the hashed credential and the secret share and sent to the corresponding server;
deblinding each of the blinded partial hash responses to obtain hash portions corresponding the plurality of servers, respectively;
decrypting the encrypted token shares using the hash portions to obtain token shares of the plurality of servers, respectively; and
combining the obtained token shares to acquire the access token.

19. The system of claim 18, wherein the method further includes:
prior to the sending the request messages, performing a registration with the plurality of servers, the performing the registration including:
sending registration requests to the plurality of servers, respectively, each of the registration requests including the user identifier and a blinded hash of a registration credential provided for the registration by a user;
receiving registration responses from the plurality of servers, respectively, wherein each of the registration responses is received from the corresponding server and includes a corresponding blinded partial hash response generated by applying the secret share to the blinded hash of the registration credential that is sent to the corresponding server in a corresponding registration request;
deblinding each of the corresponding blinded partial hash responses received from the plurality of servers to obtain registration hash portions, respectively; and sending the registration hash portions to the plurality of servers, respectively, to be stored,
wherein the hash portion used to encrypt the token share of the corresponding server is one of the registration hash portions sent to the plurality of servers.

20. The system of claim 19, wherein the method further includes:
generating a plurality of secret shares; and
sending the plurality of secret shares to the plurality of servers, respectively,
wherein the secret share is one of the plurality of secret shares.

* * * * *